US012586244B2

(12) United States Patent
Aphek

(10) Patent No.: US 12,586,244 B2
(45) Date of Patent: Mar. 24, 2026

(54) COMPOSITE IMAGE CAPTURE WITH TWO DEGREES OF FREEDOM CAMERA CAPTURING OVERLAPPING IMAGE FRAMES

(71) Applicant: SiteAware Systems Ltd, Tel Aviv (IL)

(72) Inventor: Ori Benjamin Aphek, Ramat Gan (IL)

(73) Assignee: SITEAWARE SYSTEMS LTD, Tel Aviv (IL)

( * ) Notice: Subject to any disclaimer, the term of this patent is extended or adjusted under 35 U.S.C. 154(b) by 677 days.

(21) Appl. No.: 17/821,908

(22) Filed: Aug. 24, 2022

(65) Prior Publication Data

US 2024/0078705 A1     Mar. 7, 2024

(51) Int. Cl.
    *G06T 7/80*       (2017.01)
    *G06T 7/174*      (2017.01)

(52) U.S. Cl.
    CPC ................ *G06T 7/80* (2017.01); *G06T 7/174* (2017.01); *G06T 2207/30184* (2013.01); *G06T 2207/30252* (2013.01)

(58) Field of Classification Search
    CPC . G06T 7/80; G06T 7/174; G06T 2207/30184; G06T 3/4038; G06T 2207/30252; G06T 7/33; G03B 17/561; H04N 23/695
    See application file for complete search history.

(56) References Cited

U.S. PATENT DOCUMENTS

| | | | |
|---|---|---|---|
| 5,752,113 A | 5/1998 | Borden | |
| 8,077,213 B2 | 12/2011 | Gulliksson | |
| 9,131,152 B2 | 9/2015 | Arai et al. | |

(Continued)

FOREIGN PATENT DOCUMENTS

| | | | | |
|---|---|---|---|---|
| CN | 101427155 B | * | 9/2011 | ........... G01B 11/002 |
| CN | 111810786 A | | 10/2020 | |

(Continued)

OTHER PUBLICATIONS

Xie et al., , "Automatic multi-image stitching for concrete bridge inspection by combining point and line features" pub. Mar. 14, 2018, (Year: 2018).*

(Continued)

*Primary Examiner* — Mekonen T Bekele
(74) *Attorney, Agent, or Firm* — Whitestone Law, PLLC

(57) ABSTRACT
An image capture system comprises: (a) a camera; (b) a camera mounting, configured to provide the camera with at least two angular degrees of freedom; (c) a mount base, configured to enable a base of the camera mounting to be stationary during performance of imaging; and (d) a movement controller, operatively coupled to the camera mounting and configured to repeatedly instruct the mounting to move the camera to a next imaging position. These instructions comprise a first instruction comprising movement in at least a first angular DOF and a second instruction comprising movement in at least a second angular DOF. These move the camera to orientations which enable a capture of a 2-D set of still image frames of a body surface. Still frames, and at least some corresponding adjacent frames, have an overlap amount of more than 50% of an image frame dimension.

18 Claims, 25 Drawing Sheets

(56)            References Cited

U.S. PATENT DOCUMENTS

| | | | |
|---|---|---|---|
| 9,458,963 B1 | 10/2016 | Choi et al. | |
| 9,898,821 B2 | 2/2018 | Metzler et al. | |
| 9,958,269 B2 | 5/2018 | Metzler et al. | |
| 2006/0064273 A1 | 3/2006 | Sugiura et al. | |
| 2012/0062691 A1 | 3/2012 | Fowler et al. | |
| 2012/0293607 A1 | 11/2012 | Bhogal et al. | |
| 2013/0064476 A1* | 3/2013 | Cohen | G06F 16/447 |
| | | | 382/305 |
| 2015/0312478 A1 | 10/2015 | Barcovschi et al. | |
| 2017/0057662 A1* | 3/2017 | Gerwe | B64G 1/1021 |
| 2017/0124745 A1* | 5/2017 | Christ | G06T 7/11 |
| 2021/0018447 A1 | 1/2021 | Kikuchi | |

FOREIGN PATENT DOCUMENTS

| | | | | |
|---|---|---|---|---|
| EP | 2164244 A1 | 3/2010 | | |
| JP | 3902222 B2 * | 4/2007 | | H04N 5/232 |
| WO | WO-2013020143 A1 * | 2/2013 | | G06K 9/0062 |
| WO | WO-2021195641 A1 * | 9/2021 | | F16M 11/048 |

OTHER PUBLICATIONS

Xie et al., "Automatic multi-image stitching for concrete bridge inspection by combining point and line features" pub. Mar. 14, 2018, pub. Mar. 14, 2018, (Year: 2018).*

EarthCam.Net Apr. 2021. GigapixelCam X80. 3 pages. found online at—https://www.earthcam.net/products/gigapixelcamx80.php.

Xie et al., Automatic multi-image stitching for concrete bridge inspection by combining point and line features. Automation in Construction (2018) 90:265-280, (in two segments due to size).

* cited by examiner

Azimuth (Pan) [degrees]

Elevation (tilt) [degrees]

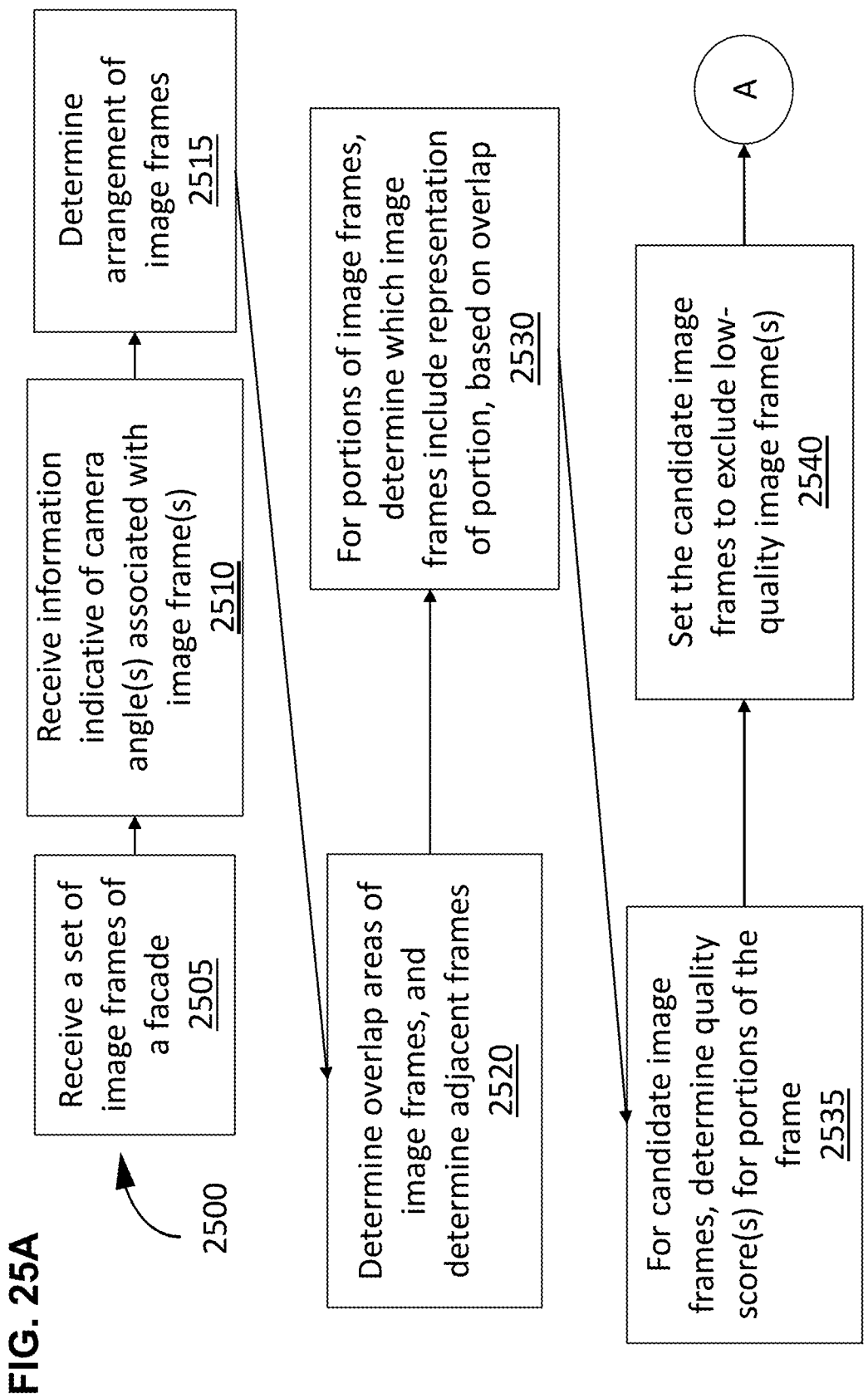

Receive a set of image frames of a facade
2505

Receive information indicative of camera angle(s) associated with image frame(s)
2510

Determine arrangement of image frames
2515

Determine overlap areas of image frames, and determine adjacent frames
2520

For portions of image frames, determine which image frames include representation of portion, based on overlap
2530

For candidate image frames, determine quality score(s) for portions of the frame
2535

Set the candidate image frames to exclude low-quality image frame(s)
2540

Figure 25B:
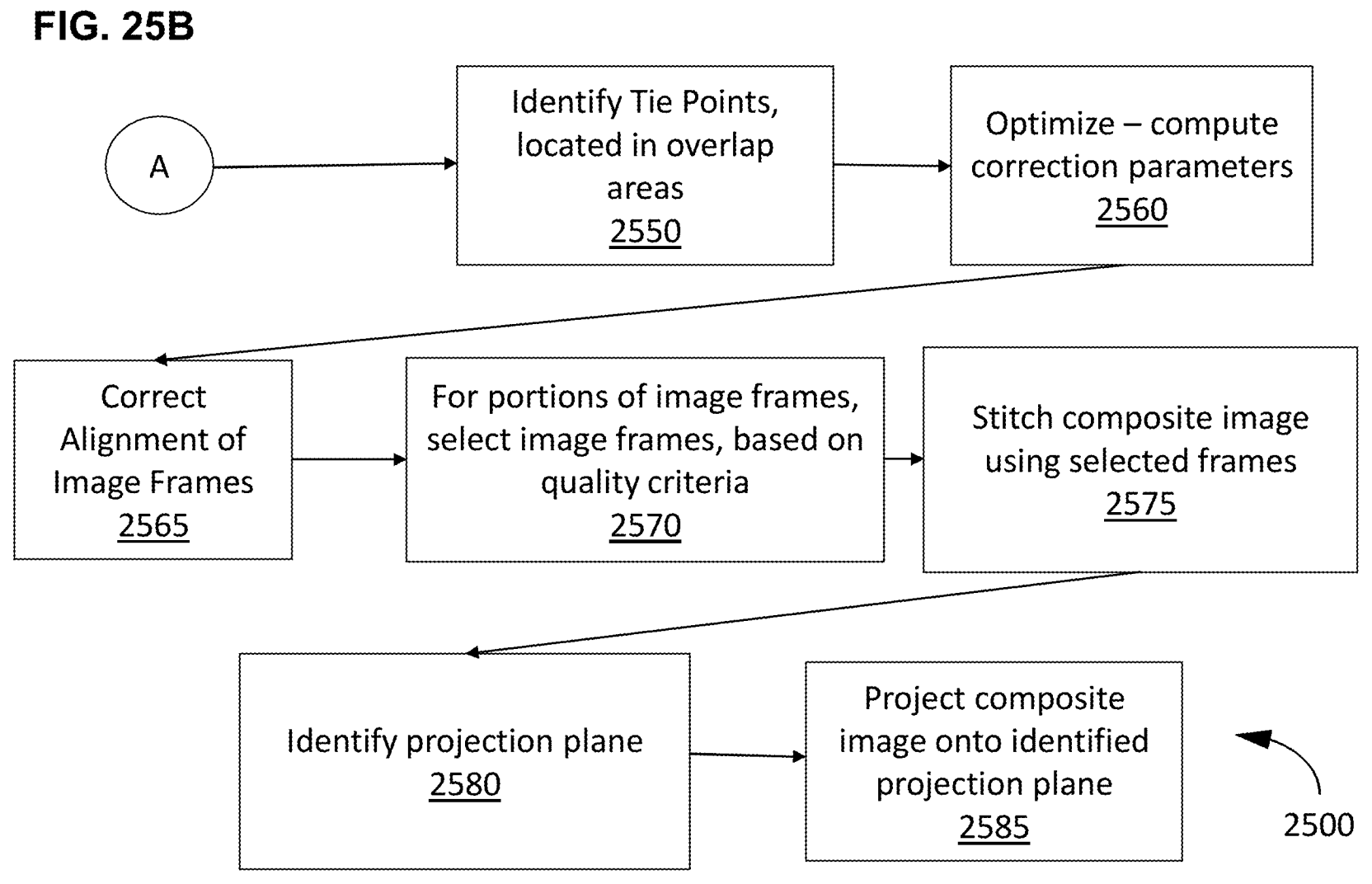

Optimize – compute correction parameters
2560

Identify Tie Points, located in overlap areas
2550

A

Correct Alignment of Image Frames
2565

Stitch composite image using selected frames
2575

For portions of image frames, select image frames, based on quality criteria
2570

Identify projection plane
2580

Project composite image onto identified projection plane
2585

2500

COMPOSITE IMAGE CAPTURE WITH TWO DEGREES OF FREEDOM CAMERA CAPTURING OVERLAPPING IMAGE FRAMES

TECHNICAL FIELD

The presently disclosed subject matter relates to imaging of large structures such as buildings for purposes such as inspection.

BACKGROUND

Imaging of building facades uses several techniques, both manual and automatic. In many cases, automated techniques utilize drones, e.g. Simultaneous Localization And Mapping (SLAM) drones. Structure From Motion Photogrammetry (SFMP) is one technique used to calculate location and orientation of the images captured. Stitched Panorama Imagery (SPI) is one photography and processing technique which is utilized.

GENERAL DESCRIPTION

According to a first aspect of the presently disclosed subject matter there is presented an image capture system, comprising:
  a. a camera;
  b. a camera mounting, configured to provide the camera with at least two angular degrees of freedom (DOF);
  c. a mount base, configured to enable a base of the camera mounting to be substantially stationary during performance of imaging; and
  d. a movement controller, comprising a first processing circuitry, the first processing circuitry operatively coupled to the camera mounting and configured to repeatedly instruct the camera mounting to move the camera from a current imaging position to a next imaging position,
    wherein the repeated instructions comprise a first instruction of the repeated instructions comprising movement in at least a first angular degree of freedom and a second instruction of the repeated instructions comprising movement in at least a second angular degree of freedom,
    wherein the repeated instructions to move are configured to move the camera to a set of camera orientations which enable a capture of a corresponding two-dimensional set of still image frames of a surface of a body,
    wherein still image frames, of the two-dimensional set of still image frames, and at least some corresponding adjacent still image frames, of the two-dimensional set of still image frames, have an overlap amount of more than 50% of an image frame dimension,
    wherein the image frame dimension is one of an image frame width and an image frame height,
    wherein the two-dimensional set of still image frames comprises perimeter image frames and at least one non-perimeter image frame,
    the perimeter image frames lacking an adjacent image frame in at least one direction,
    the at least one non-perimeter image frame having at least one adjacent image frame in each corresponding direction;

thereby facilitating capture of each point in the at least one non-perimeter image frame also in at least one adjacent captured image frame along a direction corresponding to the image frame dimension.

In addition to the above features, the method according to this aspect of the presently disclosed subject matter can include one or more of features (i) to (xv) listed below, in any desired combination or permutation which is technically possible:
  (i) the still image frames, of the two-dimensional set of still image frames, and the at least some corresponding adjacent still image frames, of the two-dimensional set of still image frames, have a second overlap amount of more than 50% of a second image frame dimension.
  (ii) a majority of non-perimeter image frames, of the two-dimensional set of still image frames, and corresponding adjacent still image frames, of the two-dimensional set of still image frames, have the overlap amount of more than 50% in the image frame dimension and in the second image frame dimension.
  (iii) mount base is a person-transportable mount base, configured to enable transport of the image capture system by a person.
  (iv) the person-transportable mount base comprises a tripod.
  (v) the camera mounting comprises a pan-tilt gimbal.
  (vi) the enabling the base of the camera mounting to be stationary, during the performance of the imaging, comprises enabling the base of the camera mounting to move less than 10 centimeters (cm).
  (vii) The image capture system of claim 1, wherein the movement controller operates in an automated manner.
  (viii) the overlap amount is 55% of the image frame dimension.
  (ix) the overlap amount and the second overlap amount are the same.
  (x) the instructed movement comprises movement by an angular increment.
  (xi) the repeated instruction to the camera mounting comprises instructions to move the camera in equally spaced increments in at least one of the first angular degree of freedom and the second angular degree of freedom.
  (xii) the repeated instruction to the camera mounting comprises instructions to move the camera to capture an image array.
  (xiii) the body comprises a stationary artificial structure of a large size.
  (xiv) a pixel instantaneous field of view (iFOV), associated with an imaging sensor of the camera, is less than 15 micro-radians.
  (xv) the camera comprises an autofocus mechanism, configured to perform autofocus before the capture of each image,
    wherein the camera is configured to capture a still image frame also in a case of non-convergence of the autofocus mechanism.

According to a second aspect of the presently disclosed subject matter there is presented a computerized method for capturing a set of image frames of a scene, the method performed by a processing circuitry of an image capture system, the method comprising:
  a. providing the image capture system, the image capture system comprising:
    i. a camera;

ii. a camera mounting, configured to provide the camera with at least two angular degrees of freedom (DOF);

iii. a mount base, configured to enable a base of the camera mounting to be substantially stationary during performance of imaging; and iv. a movement controller, comprising a first processing circuitry, the first processing circuitry operatively coupled to the camera mounting and configured to repeatedly instruct the camera mounting to move the camera from a current imaging position to a next imaging position, wherein the repeated instructions comprise a first instruction of the repeated instructions comprising movement in at least a first angular degree of freedom and a second instruction of the repeated instructions comprising movement in at least a second angular degree of freedom, wherein the repeated instructions to move are configured to capture of a corresponding two-dimensional set of still image frames of a surface of a body, wherein still image frames, of the two-dimensional set of still image frames, and at least some corresponding adjacent still image frames, of the two-dimensional set of still image frames, have an overlap amount of more than 50% of an image frame dimension, wherein the image frame dimension is one of an image frame width and an image frame height, wherein the two-dimensional set of still image frames comprises perimeter image frames and at least one non-perimeter image frame, the perimeter image frames lacking an adjacent image frame in at least one direction, the at least one non-perimeter image frame having at least one adjacent image frame in each corresponding direction;

b. receiving information indicative of a focal length of the camera;

c. receiving the overlap amount;

d. receiving an indication of the boundaries of the scene;

e. calculating the two-dimensional set of still images, based at least on information indicative of the focal length, on the overlap amount and on the indication of the boundaries of the scene; and f. capturing the set of images, thereby facilitating capture of each point in the at least one non-perimeter image frame also in at least one adjacent captured image frame along a direction corresponding to the image frame dimension.

In addition to the above features, the method according to this aspect of the presently disclosed subject matter can include optionally further comprise one or more of features (i) to (xv) listed above, mutatis mutandis, in any technically possible combination or permutation.

In addition to the above features, the method according to this aspect of the presently disclosed subject matter can include features (xvi) listed below, in any desired combination or permutation which is technically possible:

(xvi) the camera comprises an autofocus mechanism, configured to perform autofocus, wherein said step (F) comprises capturing a still image frame also in a case of non-convergence of the autofocus mechanism.

According to a third aspect of the presently disclosed subject matter there is presented an image capture system, comprising:

a. a camera, where the pixel instantaneous field of view (iFOV), associated with an imaging sensor of the camera, is less than 15 micro-radians;

b. a camera mounting, configured to provide the camera with at least two angular degrees of freedom (DOF);

c. a mount base, configured to enable a base of the camera mounting to be stationary during performance of imaging; and d. a movement controller, comprising a first processing circuitry, the first processing circuitry operatively coupled to the camera mounting and configured to repeatedly instruct the camera mounting to move the camera from a current imaging position to a next imaging position, wherein the repeated instructions comprise a first instruction of the repeated instructions comprising movement in at least a first angular degree of freedom, and a second instruction of the repeated instructions comprising movement in at least a second angular degree of freedom, wherein the repeated instructions to move are configured to capture a corresponding two-dimensional set of still image frames of a a surface of a body.

According to a fourth aspect of the presently disclosed subject matter there is presented an image capture system, comprising:

a. a camera, comprising an autofocus mechanism, configured to perform autofocus. It is configured to capture an image frame also in a case of non-convergence of the autofocus mechanism for that image frame;

b. a camera mounting, configured to provide the camera with at least two angular degrees of freedom (DOF);

c. a mount base, configured to enable a base of the camera mounting to be stationary during performance of imaging; and d. a movement controller, comprising a first processing circuitry, the first processing circuitry operatively coupled to the camera mounting and configured to repeatedly instruct the camera mounting to move the camera from a current imaging position to a next imaging position, wherein the repeated instructions comprise a first instruction of the repeated instructions comprising movement in at least a first angular degree of freedom, and a second instruction of the repeated instructions comprising movement in at least a second angular degree of freedom, wherein the repeated instructions to move are configured to capture a corresponding two-dimensional set of still image frames of a surface of a body.

In addition to the above features, the method according to the third and fourth aspects of the presently disclosed subject matter can include optionally further comprise one or more of features (i) to (xvi) listed above, mutatis mutandis, in any technically possible combination or permutation.

According to a fifth aspect of the presently disclosed subject matter there is presented a computerized method of image construction, capable of being performed by a processing circuitry, the method comprising:

a. receiving a two-dimensional set of still image frames of a surface of a body, that were captured by a camera without the camera moving in translation during the capture;

b. for image frames in the two-dimensional set, performing the following:

i. identifying at least one image frame overlap area, with at least one corresponding other still image frame of the two-dimensional set of still image frames, an area of overlap of the image frames constituting an overlap area; and ii. identifying at least two tie points in at least one overlap area of the at least one identified image frame overlap areas, thereby giving rise to a set of tie points associated with the two-dimensional set of still image frames; and c. stitching still image frames of the two-dimensional set, thereby generating a composite image, wherein the stitching comprises performing:

i. aligning still image frames of the two-dimensional set based at least on a subset of the set of tie points; and ii. selecting still image frames of the two-dimensional set to be utilized to compose regions of the composite image, based on at least a quality criterion of the selected still image frames.

In addition to the above features, the method according to this aspect of the presently disclosed subject matter can include one or more of features (xvii) to (xxviii) listed below, in any desired combination or permutation which is technically possible:

(xvii) the overlap area is associated with at least one of an image frame width and an image frame height.

(xviii) the selecting of the still image frames in said step (ii) comprises:

1) identifying at least two still image frames having respective overlapping areas that include an image representation of at least one element of interest;

2) obtaining at least one quality score associated with still image frames of the identified at least two still image frames;

3) selecting, for the composition of the regions, a still image frame of said identified at least two still image frames, based on at least respective quality scores of the at least two still image frames, thereby facilitating a representation of the at least one element of interest in the composite image;

4) repeat the performance of said steps (1) to (3) for a different at least two still image frames, thereby facilitating a second representation of at least one different element of interest in the composite image.

(xix) the at least two corresponding tie points being located substantially in the overlap area comprises the at least two corresponding tie points being located less than 5% of an image frame dimension outside of the overlap area.

(xx) the at least one element of interest comprises one of an entire image frame, an image frame region and a pixel.

(xxi) the plurality of still image frames constitute candidate still image frames associated with the at least one element of interest, (xxii) the selecting of the selected still image frame, based on at least one quality criterion, comprises ranking the candidate still image frames.

(xxiii) the at least one quality criterion comprises at least one of a focus criterion, an exposure criterion, or a blocked-view criterion.

(xxiv) the still image frames of the two-dimensional set of still image frames having overlap in the image frame dimension comprises adjacent still image frames of the two-dimensional set of still image frames having an overlap amount of more than 50% in the image frame dimension, wherein the including, in the at least one portion, the corresponding portion of the selected image frame of the two-dimensional set of still image frames, comprises including, in each portion of the at least one composite image, the corresponding portion.

(xxv) the plurality of still image frames constituting candidate still image frames associated with the at least one element of interest, wherein the stitching comprises, responsive to determining that at least one second still image frame, of the two-dimensional set of still image frames, fails at least one frame-quality criterion, the at least one second still image frame constituting at least one low-quality still image frame, setting the candidate still image frames to exclude the at least one low-quality still image frame.

(xxvi) the adjacent still image frames of the two-dimensional set of still image frames have a second overlap amount of more than 50% of a second image frame dimension.

(xxvii) the two-dimensional set of still image frames comprise an image array.

(xxviii) the step (a) comprises receiving information indicative of at least one camera angle associated with at least one captured still image frame of the two-dimensional set of still image frames, wherein the stitching is performed at least based on the information indicative of at least one camera angle.

According to a sixth aspect of the presently disclosed subject matter there is presented a computerized method of image construction, capable of being performed by a processing circuitry, the method comprising:

A. receiving a two-dimensional set of image frames of a surface of a body, that were captured by a camera without the camera moving in translation during the capture, wherein image frames of the set of image frames have an overlap area with at least one other image frame in an image frame dimension, an area of overlap of the image frames constituting an overlap area;

B. identifying at least two corresponding tie points in respective pairs of the image frames having overlap, of the set of image frames, wherein the at least two corresponding tie points are located in the overlap area, thereby generating a set of tie points associated with the set of image frames; and C. stitching the image frames of the set, based at least on the set of tie points, thereby generating at least one composite image, wherein the stitching comprises the step of:

(i) including, in at least one portion of the at least one composite image, a corresponding portion of a selected image frame of the set of image frames, wherein the selected image frame is selected from a plurality of image frames that include image representations of the at least one portion, wherein the selected image frame is selected based on at least one quality criterion.

According to a seventh aspect of the presently disclosed subject matter there is presented a computerized method of image construction, capable of being performed by a processing circuitry, the method comprising:

A. receiving a two-dimensional set of image frames of a surface of a body, that were captured by a camera without the camera moving in translation during the capture, wherein image frames of the set of image frames have an overlap area with at least one other image frame in an image frame dimension, an area of overlap of the image frames constituting an overlap area;

B. identifying at least two corresponding tie points in respective pairs of the image frames having overlap, of the set of image frames, wherein the at least two corresponding tie points are located in the overlap area, thereby generating a set of tie points associated with the set of image frames; and C. stitching the image frames of the set, based at least on the set of tie points, thereby generating at least one composite image, wherein, for at least one portion of the at least one composite image, a plurality of candidate image frames include a plurality of depictions of the at least one portion, each candidate image frame of the plurality of candidate image frames having a corresponding depiction of the plurality of depictions, wherein the stitching comprises the steps of:

(a) selecting a corresponding depiction of the plurality of depictions, based on at least one quality criterion; and (b) utilizing the selected corresponding depiction to construct the at least one portion.

According to an eighth aspect of the presently disclosed subject matter there is presented a computerized method of image construction, capable of being performed by to the processing circuitry of a computerized image construction system, the method comprising:

A. receive a two-dimensional set of still image frames of a surface of a body, that were captured by a camera without the camera moving in translation during the capture, wherein adjacent image frames of the two-dimensional set of still image frames have an overlap amount of more than 50% of an image frame dimension, B. for still image frames in the two-dimensional set, performing the following:

(i) identifying at least one image frame overlap area, with at least one corresponding other still image frame of the set; and (ii) identifying tie points in at least one overlap area of said the at least one identified still image frame overlap areas, thereby giving rise to a set of tie points associated with the two-dimensional set of still image frames; and C. stitching still image frames of the two-dimensional set, thereby generating a composite image, wherein the stitching comprises performing:

i. aligning still image frames of the two-dimensional set based at least on a subset of the set of tie points; and ii. selecting still image frames of the set to be utilized to compose regions of the composite image, based on at least a quality criterion of the selected still image frames.

In addition to the above features, the method according to the sixth, seventh and eighth aspects of the presently disclosed subject matter can include optionally further comprise one or more of features (xvii) to (xxviii) listed above, mutatis mutandis, in any technically possible combination or permutation.

According to a ninth aspect of the presently disclosed subject matter there is presented a computerized non-transitory computer readable storage medium tangibly embodying a program of instructions that, when executed by a processing circuitry of an image capture system, cause the processing circuitry to perform the method of the second aspect of the presently disclosed subject matter.

According to a tenth aspect of the presently disclosed subject matter there is presented a computerized non-transitory computer readable storage medium tangibly embodying a program of instructions that, when executed by a processing circuitry of an image capture system, cause the processing circuitry to perform the method of any one of the fifth through eighth aspects of the presently disclosed subject matter.

According to an eleventh aspect of the presently disclosed subject matter there is presented computerized image construction system, comprising a processing circuitry, the processing circuitry configured to perform the of any one of the fifth through eighth aspects of the presently disclosed subject matter. The computerized systems and the non-transitory computer readable storage media, disclosed herein according to various aspects, can optionally further comprise one or more of features (i) to (xxviii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 15-18 schematically illustrate one example generalized view of image capture, in accordance with some embodiments of the presently disclosed subject matter;

FIGS. 25A-25B schematically illustrate a generalized flow chart diagram, of a flow of a process or method, for image construction, in accordance with some embodiments of the presently disclosed subject matter.

DETAILED DESCRIPTION

Figure 1:
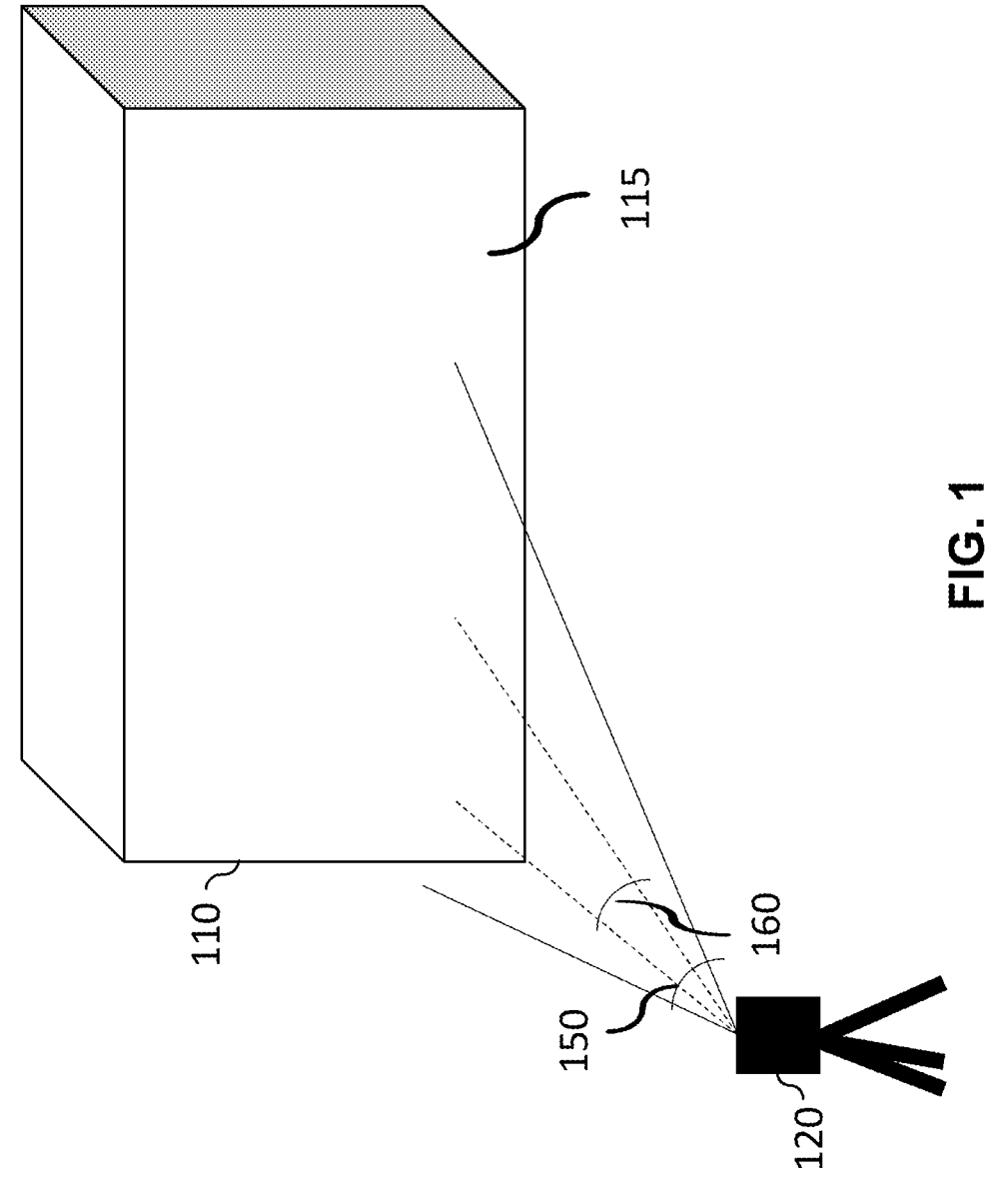
FIG. 1 illustrates schematically an example generalized view of a scene comprising a structure, in accordance with some embodiments of the presently disclosed subject matter.
Figure 1:

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

Unless specifically stated otherwise, as apparent from the following discussions, it is appreciated that throughout the specification discussions utilizing terms such as "providing", "enabling", "receiving", "moving", "capturing", "recording", "triggering", "calculating", "performing", "identifying", "generating", "stitching", "aligning", "selecting", "setting" or the like, refer to the action(s) and/or process(es) of a computer that manipulate and/or transform data into other data, said data represented as physical, e.g. such as electronic or mechanical quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, computerized systems or devices 120, 2105 and processing circuitries such as e.g. 2110 disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples", or variants thereof, means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof, should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that the teachings of the presently disclosed subject matter are not bound by what is described with reference to any of the figures or described in other documents referenced in this application.

Bearing this in mind, attention is drawn to FIG. 1, schematically illustrating an example generalized view of imaging of a scene comprising a structure, in accordance with some embodiments of the presently disclosed subject matter. Example scenario 100 depicts an image capture system 120 capturing images of a scene, e.g. a two-dimensional (2-D) scene. The captured scene includes a façade 115 of a building or other structure 110.

Inspection of facades of buildings, and of other large structures, is a major challenge, both during and after building construction. For example, most mid-rise and high-rise buildings do not utilize fixed scaffolds, which makes access for quality inspection a challenge. Inspectors are typically highly qualified personnel, which are scarce. Self-locating (knowing where the camera is when the image is captured, and the portion of the façade which is captured) is a challenge when performing the inspection. In some cases, the issues are marked on the wall itself, and are documented manually on an elevation map (the vertical facade plan).

In some cases, the inspection is done from the ground. This only enables detection of issues with the low resolution of the human eye, which depends on the distance from the building. In some cases, a camera with a Telephoto lens or binoculars is used to view suspicious items (e.g. suspected flaws or cracks). Such methodologies are manual, and they lack consistency and accuracy. They rely on the human user to identify the defects etc. on the building, and they, at least in some cases, cannot enable systematic inspection of the building.

In many cases, attempts to automated facade processing, while attempting to provide consistent image capture of a building façade, cases use drones (not shown in the figure). Drones can be flown manually or autonomously. Limitations of the use of drones include at least the following:

a. Reception of Global Position System (GPS), or of other Global Navigation Satellite Systems (GNSS) may be problematic when flying between buildings. The multipath effect, for example, can be dangerous, and can lead to drone crashes. See for example: https://sanfrancisco.cbslocal.com/2018/09/08/drone-crashes-cracked-window-sinking-millennium-tower/b.
 b. Identifying the location of a picture or a frame of a video on a building can be challenging in high rise buildings, and it is done manually in many cases. Even if capture location is taken from the (usually inaccurate) GPS, in many cases it still does not enable locating each pixel within the image in the facade elevation map. A reason for this is that, when stitching is not used, the drone captures images, and the inspection is done directly on the individual drone images. Thus, the location of façade errors/defects/problems found remains in the individual image, and is not associated with a particular location on the façade of the building. Another disadvantage is that in case of overlapping images, the same error can be identified more than once, and time is wasted on inspecting the overlapping area multiple times.
 c. Regulations limit the use of drones in dense urban areas, and particularly limit flying above passers-by and vehicles.

Attempts to overcome the first limitation include Simultaneous Localization And Mapping (SLAM) drones, that can navigate without GPS. However, these drones tend in some cases to fail due to reflections from reflective facades (such as curtain walls) and due to repeating shapes in the facades.

Attempts to overcome the second limitation (identify the location of each pixel) include the use of Structure From Motion Photogrammetry (SFMP) to more precisely calculate back the location and orientation of the images captured. This approach is taken, for example, by DroneDeploy.com, which also creates a 3D model (Mesh) of the building from SFMP, and is then able to identify each pixel on this 3D model. Such a method captures images of an area on the façade, taken when the camera is located at two or more different points in space. However, SFMP algorithms frequently fail in modern facades such as curtainwall, because of lack of features that the algorithm can identify, and a multitude of repeating elements (e.g. glass walls and windows). In some cases, these lack of features and repeating elements confuse the algorithm. In addition, reflections that appear in the images tend to generate tie points which confuse the algorithm, because if the camera position moves, the reflection changes its location, and creates a false signal. In addition, the complexity of the algorithm is high, because for each image it needs to calculate the values of six degrees of freedom (DOF) (x, y, z, yaw, pitch, roll). For at least these reasons, such algorithms in some cases work reasonably well with old buildings facades, which consist of many distinguished visual features (e.g. stone and brick facings, with varying visual features, and visually complex older windows), but often fail with modern building facades. In addition, in the case of a large number of captured images, the processing time can be long, at least due to the calculation for 6 DOF. These issues are in addition to the general limitations disclosed above regarding the use of drones.

Stitched Panorama Imagery (SPI) is a photography and processing technique which is based on capturing multiple images (or video) from a single location (so no parallax is created), and using algorithms to stitch them. This technique is widely used in smartphones in one axis. In a niche use case, professional photographers use SPI when they want to obtain a higher resolution than their camera provides. SPI is can be used to stitch the images into a single high-resolution image. Usually, the images need to be properly positioned with respect to each other, and their distortion needs to be corrected. This is required, for example, when the capture angles are not precisely recorded. (In some cases, these angles are not recorded at all, and in others, the mechanical tolerance or the measurement tolerance are not accurate enough for stitching). Lens distortions may also prevent stitching in such a way that creates a smooth stitch between images.

At least to address such technical problems and disadvantages, there is disclosed herein an image capture system 120, for example with reference to FIGS. 2-5, comprising:

a. a camera 250;
 b. a camera mounting 215, e.g. comprising a gimbal, configured to provide the camera with at least two angular degrees of freedom (DOF); (camera mounting 215 comprises references 220, 230 and 240)

c. a mount base 210, configured to enable a base 220 of the camera mounting to be stationary during performance of imaging; and d. a movement controller 270, comprising a first processing circuitry. The first processing circuitry is operatively coupled to the camera mounting, and it is configured to repeatedly instruct the camera mounting to move the camera from a current imaging position to a next imaging position.

The repeated instructions comprise a first instruction, comprising movement in at least a first angular degree of freedom, and a second instruction, comprising movement in at least a second angular degree of freedom. That is, in some examples there is at least one instruction for movement in each of the two DOFs.

The repeated instructions to move are configured to capture a corresponding two-dimensional (2-D) set of still image frames of a scene, e.g. a two-dimensional scene showing the surface of a body (e.g. a building façade 115). The repeated instructions to move are configured to move the camera to a set of camera orientations which enable this capture of the 2-D set of image frames.

The set of images is referred to herein as a two-dimensional (2-D) set, at least in that it not all of the captured images are in one row or column. Examples of this are disclosed herein with reference to the image arrays/grids/matrices of FIGS. 6, 19, 20 and with reference to the set of images of FIG. 7. This 2-D set is distinguished, for example, from a panorama image captured by a smartphone, in which all of the images are essentially in one row.

Note that at least in many cases, a smartphone is not relevant for façade imaging, since it captures a "strip" of images, e.g. in a row—which is not good enough for an application of e.g. inspecting an entire building façade. In addition, even if a series of smartphone image strips were captured (e.g. capturing a row of images, and then pointing the camera higher to capture the next "row" up, and so on), a smartphone camera does not typically capture at sufficient quality and resolution for inspection uses. In addition, the typical stitching algorithm used for a smartphone for a linear (one-dimensional or 1-D) panorama, is not constructed for 2-D uses—such a "1-D" algorithm typically does not optimize positioning of a particular image, within the composite image, based on image frames above and below, as well as to the left and right of, the particular image.

This 2-D set of images is referred to as a set of still image frames, at least in the sense that it is distinguished from a set of video image frames captured by e.g. a video camera. Each image of the set is captured only after the motor(s) of the gimbals stop(s), to ensure the required high resolution. Example methods of capturing images using such an image capture system 120 are disclosed further herein.

Image frames, of the 2-D set, and at least some corresponding adjacent still image frames, of the set, have an overlap amount of more than 50% of an image frame dimension. The image frame dimension is one of an image frame width and an image frame height. In some examples, this overlap amount, of more than 50%, is in both image frame dimensions (e.g. width and height). Example advantages of such an overlap are disclosed further herein, e.g. with reference to FIGS. 6-18.

The 2-D set of captured image frames can be stitched together, to generate a composite image, covering features captured in multiple captured image frames. Examples of such methods, and of systems to perform them, are disclosed further herein, e.g. with reference to FIGS. 21-25B. Thus, this composite image is in some examples referred to herein also as a composite multi-frame image, a gigapixel image or a hyper-pixel image. In some examples, this composite image is referred to herein also as a panorama, in that it is a large image comprising a very large number pixels, one that is based on multiple captured images, each comprising a relatively smaller number of pixels, that are captured when the mount base 210 is at one position coordinate x, y, z, e.g. within a defined tolerance (see additional disclosure below).

This term "panorama", as used herein, should be distinguished from e.g. a panorama image captured e.g. by a smartphone camera. Note that in some prior art, the term "panorama" has different meanings—for example, an image that is much wider than it is tall/high, in some cases constructed from multiple images—independent of the method of capture and the position of the capturing camera.

Examples of image capture system 120 construction, and of the at least two degrees of freedom, are disclosed with reference to FIGS. 2-5. Examples of sets of captured image frames are disclosed with reference to FIGS. 6-7, 19-20. Illustrative examples of stitching in the prior art are disclosed with reference to FIGS. 11-14. Illustrations of example advantages over the prior art are disclosed with reference to FIGS. 15-18.

The image capture system 120, comprising the camera, is placed in a single position, e.g. on the ground. The camera is aimed or pointed, at a particular set of angles, towards the façade 115. When the camera is aimed at the particular set of angles, it has a camera angular field of view (FOV) 150. Each pixel on the camera has an instantaneous Field of View (iFOV) 160 (usually symmetric between Horizontal and Vertical). The FOV is a function of the focal length and of the sensor size.

Note that, for ease of exposition, only one angle 150 and one angle 160 are shown in the figure—horizontal FOV and horizontal FOV. In some examples, these fields of view can each be expressed in terms of two angles, e.g. one in the up-down/vertical/elevation/tilt direction, and the other in the left-right/horizontal/azimuth/pan direction.

Figure 2:
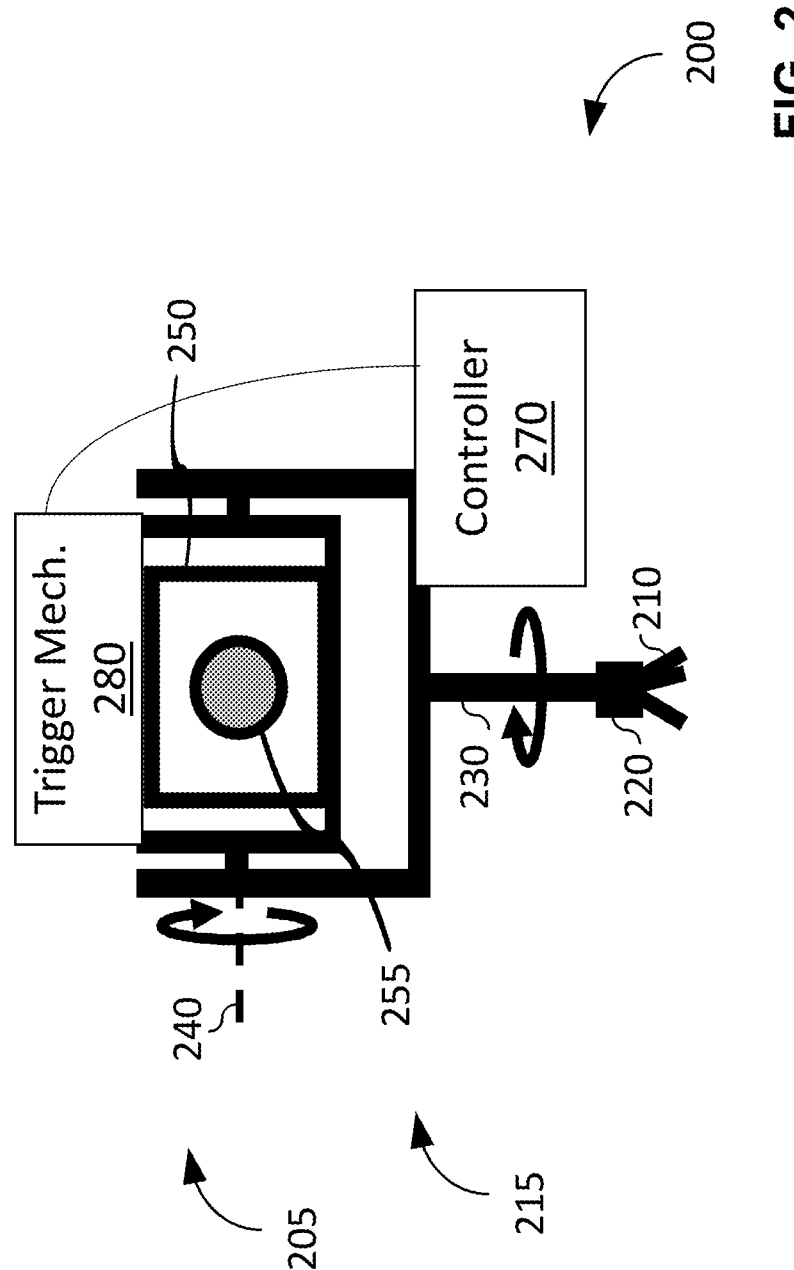
FIG. 2 illustrates schematically an example generalized schematic diagram of an image capture system, in accordance with some embodiments of the presently disclosed subject matter.

Attention is now drawn to FIG. 2, schematically illustrating an example generalized schematic diagram of an image capture system 205, in accordance with some embodiments of the presently disclosed subject matter. The view 200 illustrates the example of a pan over tilt gimbal configuration. In some examples, this can be the most common or standard gimbal configuration.

In some examples, image capture system 205 corresponds to the system of reference 120, representing one example implementation of it. In some examples, image capture system 205 comprises camera or other imaging device 250. In some cases, this is a digital camera 250. In some examples, the camera 250 comprises a lens 255 and an imaging sensor (not shown). In some examples, imaging sensor comprises an array of pixels (not shown), e.g. a two-dimensional array. Each pixel has a corresponding iFOV 160. In some examples, the imaging sensor is a charged-coupled device (CCD) sensor or a Complementary Metal-Oxide-Semiconductor (CMOS) sensor or a back illuminated CMOS sensor. The lens has a particular focal distance or focal length. In a case of a zoom lens, the particular lens has a range of options for focal length. The chosen focal distance should remain substantially the same throughout for the set of images to be stitched into a single composite image. The zoom setting will in some cases be a function of at least the camera distance from the façade, and the desired resolution on the façade. The imaging sensor and the focal distance are not shown in the drawing, for simplicity of exposition.

In some examples, image capture device 120 comprises a mount base 210. In the non-limiting example of the drawing, mount base 210 comprises a person-transportable mount base, e.g. a tripod. In some other non-limiting examples, mount base 210 comprises a monopod.

In still other examples, the image capture system 120 is comprised e.g. on a Real-Time Kinematic (RTK) drone, which is configured to keep its x, y, z position still and fixed, within the defined tolerance.

The use of e.g. a tripod or RTK drone (which can keep the drone stationary during the image capture) facilitates, in some implementations, capture of image frames of a panorama of e.g. the façade, from a single location, and can facilitate generation of high-resolution panoramas, as will be disclosed further herein.

In some examples, image capture device 120 comprises a camera mounting or camera holder 215. In some examples, the camera mounting comprises a pedestal. In some examples, the camera mounting 215 comprises one or more gimbals. In the non-limiting example of FIG. 2, the camera mounting comprises pan gimbal 230 and tilt gimbal 240. These gimbals are configured to provide the camera with at least two angular degrees of freedom (DOF), in this case pan and tilt. The figure discloses the non-limiting example of a camera mounting comprising a pan-tilt gimbal or pan-tilt pedestal. See FIGS. 3-5 for other non-limiting examples of a camera mounting. The camera mounting 215 further comprises camera mounting base 220, configured to connect the mount base 210 to the rest of the camera mounting, e.g. to the gimbal(s). Thus, in some cases, the pedestal or gimbal is mounted on a tripod. Other parts of the gimbal rotate relative to the base 220.

In some examples, image capture device 120 comprises a movement controller 270. In some examples, the movement controller 270 includes a computer. It may, by way of non-limiting example, comprise a first processing circuitry (not shown, for simplicity). This term is used herein to distinguish the processing circuitry from other processing circuitries disclosed herein, e.g. the second processing circuitry of trigger mechanism 280, and the processing circuitry 2110 disclosed further herein with reference to FIG. 21. This first processing circuitry in some examples comprises a processor and a memory (not shown).

This first processing circuitry may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, this processing circuitry may be a computer(s) specially constructed for the desired purposes.

The movement controller is operatively coupled to the camera mounting 215 (e.g. via wireless or wired connection). In some examples, the processor is configured to repeatedly instruct the camera mounting to move the camera, e.g. in pan and/or in tilt, from a current imaging position to a next imaging position. Thus, in one non-limiting example, the camera mounting is instructed to rotate the camera in panning, e.g. from left to right, pointing from one end of the building façade to the other, each time capturing an image. The camera mounting is then instructed to rotate the camera up, in tilt, and then again pan across, and again to capture images, e.g. rotating left to right or right to left. When the camera points to the façade at a particular angle, it captures an image. In some other examples, the instruction is to move in both pan and tilt from the current imaging position to a next imaging position.

Non-limiting examples of such resultant imaging angles include sets of angles that result in a rectangular array of images (an example of a two-dimensional array or grid of images or photographs), or in a diagonal array of images. That is, wherein the repeated instruction to the camera mounting comprises instructions to move the camera for capture of an image array/matrix/grid. In another example, the sets of imaging angles result in a non-array set of images. These sets of images are exemplified further herein with reference to FIGS. 6, 20, 19 and 7.

Note that, in the sense of the presently disclosed subject matter, the terms pan, azimuth and yaw can be used interchangeably. Similarly, the terms tilt, elevation and pitch can be used interchangeably. Thus, for example, the pan-tilt gimbals can be referred to also as azimuth-elevation gimbals.

In some examples, the movement controller 270 operates in an automated manner, for example programmed to scan the façade in a defined manner. In such examples, no manual intervention by the human user is required to move the camera from one imaging position to the next, within one image set. In some examples, the automation provides at least certain technical advantages. For example, it is in some cases difficult to move the camera angles so as to create an array of captured image frames, while controlling the amount of frame overlaps, in a manual manner.

In some examples, mount base 210 is configured to enable the base 220 of the camera mounting to be stationary during performance of imaging. That is, the configuration of the mount base enables the camera mounting base 220 to not move substantially in translation during imaging, e.g. more than a defined amount. The positional coordinates x, y and z of the camera mounting base 220 are kept the same during the imaging process, and thus there is no movement of the positional coordinates.

As indicated above, in the presently disclosed subject matter, the base of the camera mounting being "stationary" allows for a certain amount of translation, within a defined amount. In some examples, the enabling the base of the camera mounting to be stationary, during the performance of the imaging, comprises enabling the base of the camera mounting to move less than 10 centimeters (cm). In some examples, the mount base 210 is configured to keep the camera mounting base 220 stationary within 5 cm. In some examples, the mount base 210 is configured to keep the camera mounting base 220 stationary within 1 cm. In some examples, the mount base 210 is configured to keep the camera mounting base 220 stationary within 2 millimeters (mm). In some non-limiting examples, movement of the camera mounting base 220 by 1 cm, during the exposure, can be too much. In some examples, the translational movement of the camera, during the entire imaging scan, is more than an order of magnitude smaller than a size or dimension of the structure or other object 110 captured. In some examples, the translational movement of the camera, during the entire imaging scan, is more than two orders of magnitude smaller than a size or dimension of the structure or other object 110 captured—for example less than 10 cm when imaging a 10 m high and wide building façade 115. Thus, in some examples, the permitted translation of the camera mounting base 220 is considered "negligible", compared to the dimension(s) of the façade.

Thus, in some examples, the 2-D set of still image frames is captured by a camera 250 that is positioned at a single point in space, within a defined tolerance amount. For example, only that translation of camera 250 which is associated the gimbal rotations occurs, during capture.

In some examples, the permitted translation movement of the camera mounting base 220 during capture is the small amount (e.g. exemplified above) caused by the wind or breeze, e.g. if the mountings are not fully rigid, or perhaps a technician bumping into it an moving it a couple of mm or cm. In some implementations, the protocol for image capture is for the technician to not lift the system 120, 205 and move it to another location during capture, at least not by more than a few cm. Another reason not to move the system is that the angular position of the base, i.e. its orientation, will change. Thus, arrays captured before and after the movement will be captured at different angles, and the assumptions used in the initial alignment of the captured frames (see block 2515 in FIG. 25A) might be compromised.

Thus, in some examples the mount base 210 and the camera mounting are configured to, in combination, allow the camera 250 two or three angular degrees of freedom, but to substantially not have degrees of freedom in translation. This relatively tight control over the translation of the camera mounting base 220 thus can ensure that movement of the camera is primarily in 2-3 degrees of freedom, rather than e.g in 6 DOF.

This is in contrast to an image capture system such as a drone-based system, in which the drone flies to different points in the air from which it captures images of the façade. Similarly, this contrasts with e.g. a smartphone that is carried around from spot to post on the ground, capturing images of the façade. Such other systems have up to three DOF in translation movement, in addition to possibly having DOF of movement in rotation as well. They do not capture images which create a "panorama", in the sense described above.

Translational or unintentional angular movement of system 120, due to e.g. wind, during capture of an image (exposure), can cause motion blur, thus causing defocus of the particular image frame. However, motion blur due to intermittent events such as wind blowing happens only occasionally, and thus typically decreases the quality of only a small portion of the captured frames. As disclosed further herein, the presently disclosed subject matter enables compensation for these lower-quality frames.

As will be disclosed further herein, in some examples a building inspection application requires distinguishing features of size 1-2 mm on the façade. In such a case, where there is no wind during image capture, such resolutions are achievable. Also in such a case, if the wind causes translational movement of no more than 1-2 mm, and an angular movement of less than the iFOV, during the image exposure, the resolution of the images will not be impacted.

In some examples, stitching images to a large composite/ panorama image, using e.g. a camera system 120 with two or three degrees of freedom, has some additional advantages over e.g. Structure From Motion Photogrammetry (SFMP) of a structure. Using system 120, there is a need, in the stitching process, to compensate for only two degrees of freedom, e.g. yaw and pitch. All photos are captured from the same XYZ coordinates position (assuming that parallax is negated), and in some also roll variation between images need not be considered. This in at least some cases leaves much fewer sources for positioning, alignment and stitching error—particularly important in cases where the object does not allow for identifying the large number of tie points which are required for SFMP, such as in the case of smooth surfaces or repetitive elements. Therefore, even relatively difficult panoramas can be stitched. In some examples, there is an additional factor, in 2- or 3-DOF camera systems, that helps panorama stitching, as compared to stitching for e.g.

6-DOF systems. With no parallax—the reflections from a reflective surface such as glass curtain walls are stationary. These stationary reflections in some cases help stitching, because the reflected objects may enable generating helpful tie points. This is unlike the case of SFMP, where reflections change their location with the change of the image capture location, and therefore their respective tie points can be deceiving. Note that more on tie points and the stitching process is disclosed with reference to FIGS. 21-25, further herein.

In some examples, in order to facilitate the image capture at the required angular position, the image capture system comprises, in some examples, a triggering control mechanism 280. In some examples, control mechanism 280 includes a computer. It may, by way of non-limiting example, comprise a second processing circuitry (not shown, for simplicity). This second processing circuitry in some examples comprises a processor and a memory (not shown).

This second processing circuitry may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, this second processing circuitry may be a computer(s) specially constructed for the desired purposes.

In some examples, this second processing circuitry is operatively coupled to the camera 250 and to the movement controller 270, e.g. via wireless or wired connection. In some examples, the second processing circuitry, of the trigger mechanism 280, is configured to enable triggering of the camera 250 to perform a capture of a next image frame.

In some examples, triggering control mechanism 280 operates in an automated manner. In such examples, no manual intervention by the human user is required trigger each (or some) image captures, after completion of the camera movement between image capture positions for a particular image set. This can have at least certain technical advantages. For example, a solution in which, responsive to receipt of the indication of completion, the triggering mechanism alerts a human user to press the "capture" button, rather than automated capture, can in some cases not be feasible, e.g. for cases of capture of a large number of image frames.

As indicated before, in some examples the mount base 210 comprises a person-transportable mount base, which is configured to enable transport of the image capture system by a person. A non-limiting example of this is a tripod-mounted imaging capture system, which a technician or photographer can carry to a certain spot, set up so that the base 220 is stationary, perform image capture of all or some of the façade, and then move on to another spot or to another imaging job. This has at least the advantage of comparative portability.

In some other examples, the mount base 210 comprises a vehicle, e.g. a car or truck, which is driven to a particular spot and then stops. Imaging of the façade is performed while the vehicle is stopped, and then the vehicle drives on.

In some examples, camera 250 is a mirrorless or Digital Single-Lens Reflex (DSLR) camera.

Regarding the imaging sensor (not shown) of camera 250, recall that one application for imaging of the façade is to inspect it for construction imperfections and/or damage. In some example, it is desired that the composite image of the façade have a resolution of e.g. approximately 1 mm, in order to identify minute discrepancies or deviations such as cracks in stone and missing gaskets. In some examples, the façade is of a building of 30-40 floors, having a total building height of e.g. 35×4 meters (m)=140 m. In some examples, it is advantageous to limit the camera angle to 45 degrees maximum in both pan and tilt, to prevent e.g. loss of detail in the image, or to miss submerged elements that may not be visible from steep angles, the capture of which is desired. For example, there are two bricks separated by caulking. The caulking is somewhat recessed relative to the bricks. Therefore, when photographing from steep angles, the caulking might not appear in the image, and it will not be possible to inspect the caulking for defects.

Assume, for example, that the distance from the image capture system 120, 205 to the top of the building is e.g. approximately 200 m (=140 m/sin (45 degrees)). In such an example case, the desired instantaneous field of view (iFOV) is iFOV=1 mm/200 m=5 micro-radians (urad). Assuming for example that each pixel on the image sensors is of size 3 micron (um), the required focal length of the lens 255=3 um/5 urad=600 mm.

A 3-micron pixel is provided in the above example, as being typical of high-quality cameras. In some examples, a pixel size that is smaller than 3 um will suffer from dynamic range issues, and will enable the use of lenses with a small aperture that will reduce the amount light collected, thus increasing either noise or motion blur.

In some examples, the pixel iFOV, associated with an imaging sensor of the camera, is less than 15 micro-radians. In some examples, the pixel instantaneous iFOV is less than10 micro-radians. In some examples, the pixel instantaneous iFOV is less than 5 micro-radians. Thus, assuming a 3 um pixel size, in some examples the focal distance of camera lens 255 is greater than 200 mm, e.g. corresponding to an iFOV of 15 urad. In some examples, assuming a 3 um pixel size, the focal distance of camera lens 255 is greater than 400 mm. In some examples, assuming a 3 um pixel size, the focal distance of camera lens 255 is greater than 600 mm, e.g. corresponding to an iFOV of 5 urad. In some other examples, the focal distance of camera lens 255 is greater than 50 mm.

Thus, in some implementations a comparatively long focal length is used to capture the panorama/composite, while maintaining a high definition of around 1 mm façade coverage per pixel.

Thus, there is disclosed herein an image capture system 120, for example with reference to FIGS. 2-5, comprising:

a. a camera 250, where the pixel instantaneous field of view (iFOV), associated with an imaging sensor of the camera, is less than 15 micro-radians;

b. a camera mounting, e.g. a gimbal, configured to provide the camera with at least two angular degrees of freedom (DOF), c. a mount base 210, configured to enable a base 220 of the camera mounting to be stationary during performance of imaging; and d. a movement controller 270, comprising a first processing circuitry. The first processing circuitry is operatively coupled to the camera mounting, and it is configured to repeatedly instruct the camera mounting to move the camera from a current imaging position to a next imaging position, where the repeated instructions comprise a first instruction comprising movement in at least a first angular degree of freedom and a second instruction comprising movement in at least a second angular degree of freedom.

The repeated instructions to move are configured to capture of a corresponding two-dimensional set of still image frames of e.g. the surface of a body. The repeated instructions to move are configured to move the camera to a set of camera orientations which enable this capture of the set of image frames.

Thus, assuming a 3 um pixel size, in some examples the focal distance of the above-disclosed camera lens 255 is greater than 200 mm.

The set of captured image frames can be stitched together, to generate a composite image, covering features captured in multiple captured image frames.

FIG. 1 can be seen, more generally as being configured for capture of scenes of the surface of a body. In some examples, the body comprises a stationary artificial structure of a large size, e.g. the surface/façade of a building. Other examples of such stationary artificial structure include an ocean liner ship in dry dock, or a train that is stationary. Still other non-limiting examples of such a structure include a bridge or a sports stadium.

In some examples the large size of the stationary artificial structure comprises a structure dimension (e.g. height, width or length) of at least 10 meters, 30 meters, 50 meters, 100 meters, 200 meters, or even 400 meters.

One non-limiting example panorama consists of 15×30 images, captured with a mirrorless or DSLR camera (e.g. 3-4 um/pixel) and a lens with focal length of 100 mm-600 mm, with 50% overlap between adjacent images and −1 mm per pixel on the façade (depending on camera angle). Assuming use of a 6000×4000 pixels camera, such a panorama covers about 45 m×60 m of façade. In some other cases the façade is larger, and pixel coverage for this example camera is larger than 1 mm.

Note also that in some examples, the panorama composite image captured is of part of the façade, e.g. the top 10 floors of a 20-story building, or the left half of the building, rather than all of it.

Note that in at least some prior art, camera setups for generating large panoramas, typically landscape panoramas, and sometimes indoors panoramas, use a lens with focal length of 200 mm or less, thus providing an iFOV of 15 urad or more for 3 um pixels. Such cameras would thus be able to scan only buildings of about ten (10) floors height, in a case where the camera is at a distance from the building exemplified above, thus not being able to handle the many buildings which are taller than ten floors. For at least such reasons, they cannot serve for façade inspection, because their focal length does not provide the adequate resolution for inspection at least of particularly large buildings.

The presently disclosed subject matter discloses comparatively long (typically zoom) focal length lens (200 mm-600 mm), facilitating capture of a panorama composite image of even larger buildings, with the requisite image resolution for inspection needs.

Note also, that some cameras on pedestals, which are used to generate panoramas of buildings, such as https://www.earthcam.net/products/gigapixelcamx80.php, are fixed cameras, which cannot be transported to from one place to another. Much less are they person-transportable. They thus are not usable for imaging of multiple buildings, for purposes e.g. of inspection. Also, the focal length of such solutions is also limited to 200 mm.

In some examples the camera 250 has an imaging sensor of more than 20 megapixels (MPixel).

In some examples the camera 250 comprises an autofocus mechanism (not shown), configured to perform autofocus. In some cases this configuration has at least the example advantage of capturing images of an entire large-size structure by a camera positioned at a substantially fixed position x, y, z, where the captured region of the façade is at varying distances from the camera. In such cases, a telephoto lens 255 can be utilized. This can be advantageous, for example, when imaging curtain walls.

In some examples, the image capture system 120 (e.g. the camera) is configured to capture an image frame also in a case of non-convergence of the autofocus mechanism for that image frame. That is, even in a case where the autofocus mechanism tries various focus positions, and it is unable to find focus for that particular viewed image, in some examples the camera will anyway capture the frame. One reason for such a configuration is to make sure that all images are available, to enable organization of the array of images for purposes of stitching. Similarly, since all pictures are captured from one x, y, z position, the distance of the camera pixels from the different parts of the façade change, and thus the focus cannot be same for all images.

This is contrast to at least some prior art cameras for façade capture, the default configuration of which is to not capture an image when the image is not focused or when illumination is poor. Similarly, prior art cameras often prefer fixed values of parameters such as focus position and exposure parameters. This enables such cameras, when used for e.g. landscape imagery, to mimic a single photo that was by definition captured with the same parameters for the entire image. This enables the different sections of the composite image to not have different levels of e.g. brightness and sharpness, and/or will not appear to be stitched due to e.g. visible seams between regions with e.g. different levels of focus.

Note, however, that in some examples, such a "shoot also when not focused" configuration can result in a larger proportion of captured frames with various degrees of focus problems, as compared e.g. to cases where a façade is not imaged from a camera which is substantially at single position. More disclosure concerning this is presented further herein with reference to FIGS. 22-23, 25A-25B.

Thus, there is disclosed herein an image capture system 120, for example with reference to FIGS. 2-5, comprising:

a. a camera 250, which comprises an autofocus mechanism (not shown), configured to perform autofocus. It is configured to capture an image frame also in a case of non-convergence of the autofocus mechanism for that image frame;

a. a camera mounting, e.g. a gimbal, configured to provide the camera with at least two angular degrees of freedom (DOF);

b. a mount base 210, configured to enable a base 220 of the camera mounting to be stationary during performance of imaging; and c. a movement controller 270, comprising a first processing circuitry. The first processing circuitry is operatively coupled to the camera mounting, and it is configured to repeatedly instruct the camera mounting to move the camera from a current imaging position to a next imaging position, where the repeated instructions comprise a first instruction comprising movement in at least a first angular degree of freedom and a second instruction comprising movement in at least a second angular degree of freedom.

The repeated instructions to move are configured to capture of a corresponding two-dimensional set of still image frames of a scene, e.g. a two-dimensional scene of the surface a body. The repeated instructions to move are configured to move the camera to a set of camera orientations which enable this capture of the set of image frames.

In some examples, the auto exposure control is activated in the camera 250, as well.

Figure 3:
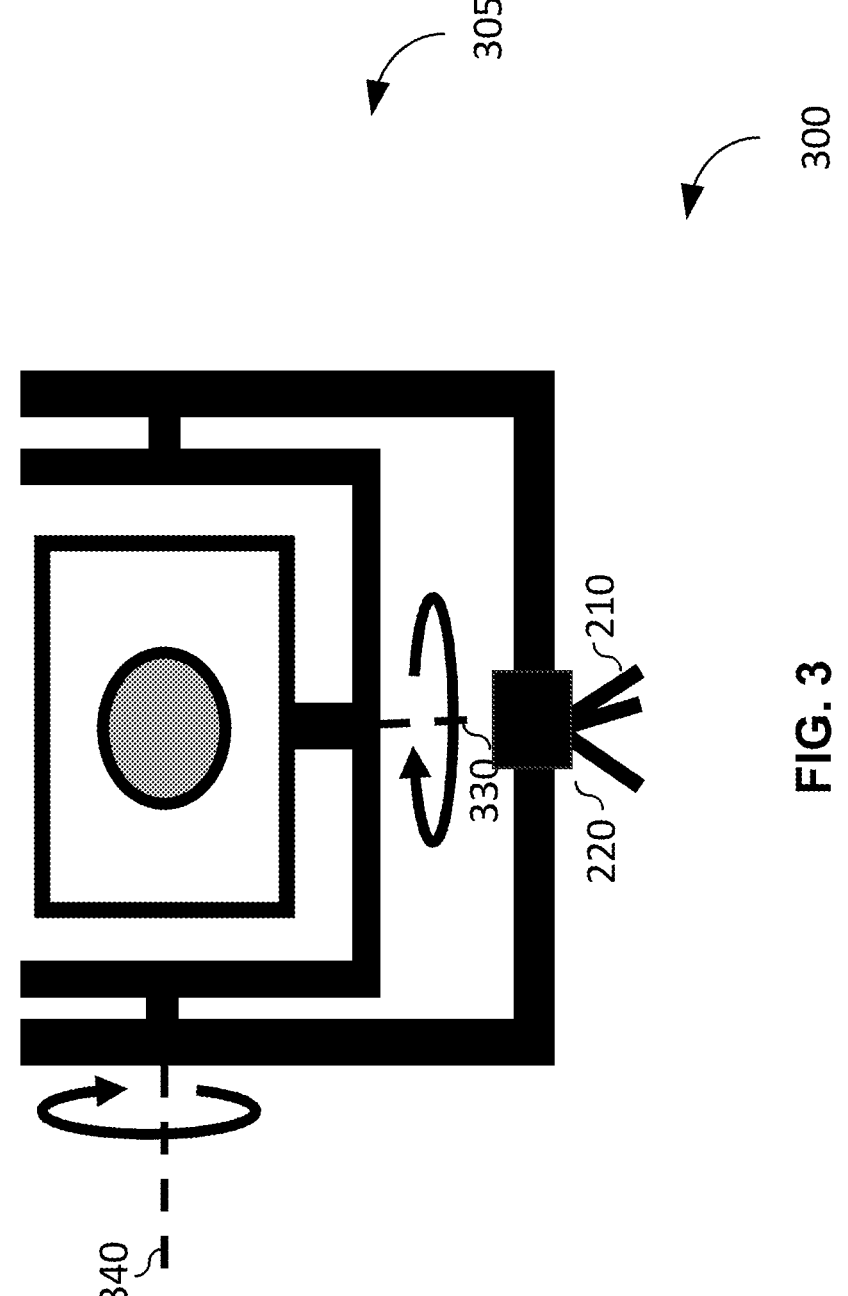
FIG. 3 illustrates schematically an example schematic diagram of an image capture system, in accordance with some embodiments of the presently disclosed subject matter.

Attention is now drawn to FIG. 3, schematically illustrating an example generalized schematic diagram of an image capture system 305, in accordance with some embodiments of the presently disclosed subject matter. The view 300 illustrates the example of a tilt over pan gimbal configuration. In this view, tilt gimbal 340 and pan gimbal 330 are shown. This system 305 is an additional example of image capture system 120.

Figure 4:
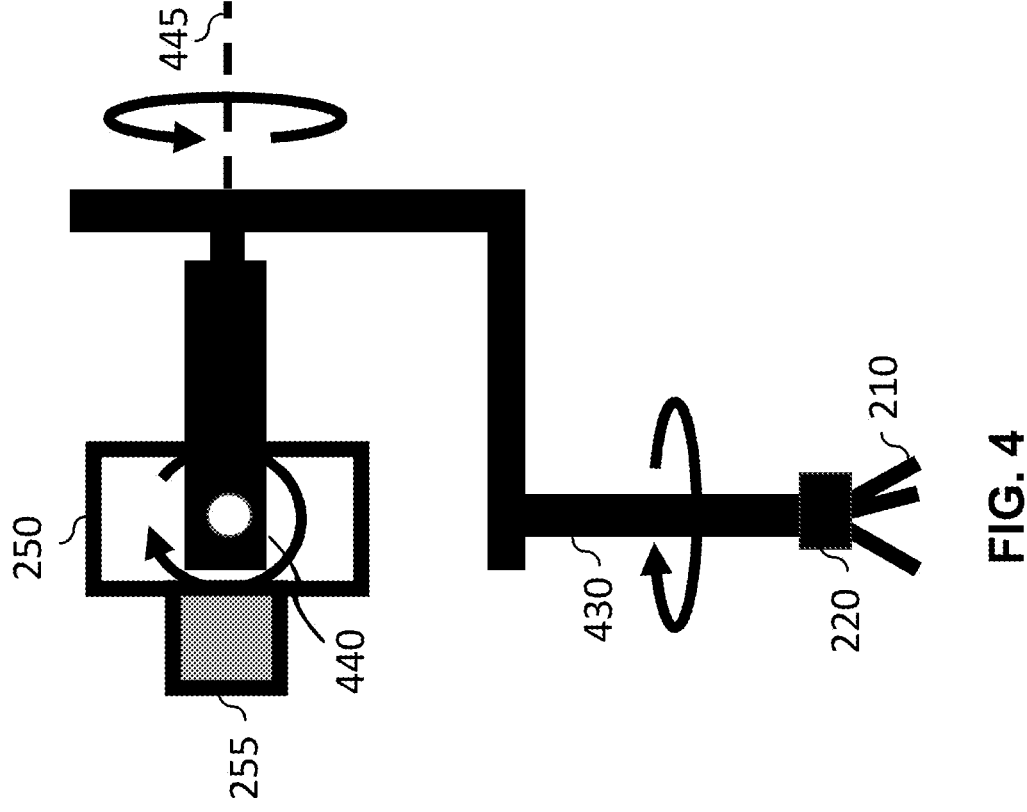
FIG. 4 illustrates schematically an example schematic diagram of an image capture system, in accordance with some embodiments of the presently disclosed subject matter.
Figure 4:

Attention is now drawn to FIG. 4, schematically illustrating an example generalized schematic diagram of an image capture system 405, in accordance with some embodiments of the presently disclosed subject matter. The view 400 illustrates the example of a three-axis system, exemplified in the figure by a pan over roll over tilt configuration. In this view, tilt gimbal 440 and pan gimbal 430 are shown. Also shown is roll gimbal 445. This system 405 is an additional example of image capture system 120.

Figure 5:
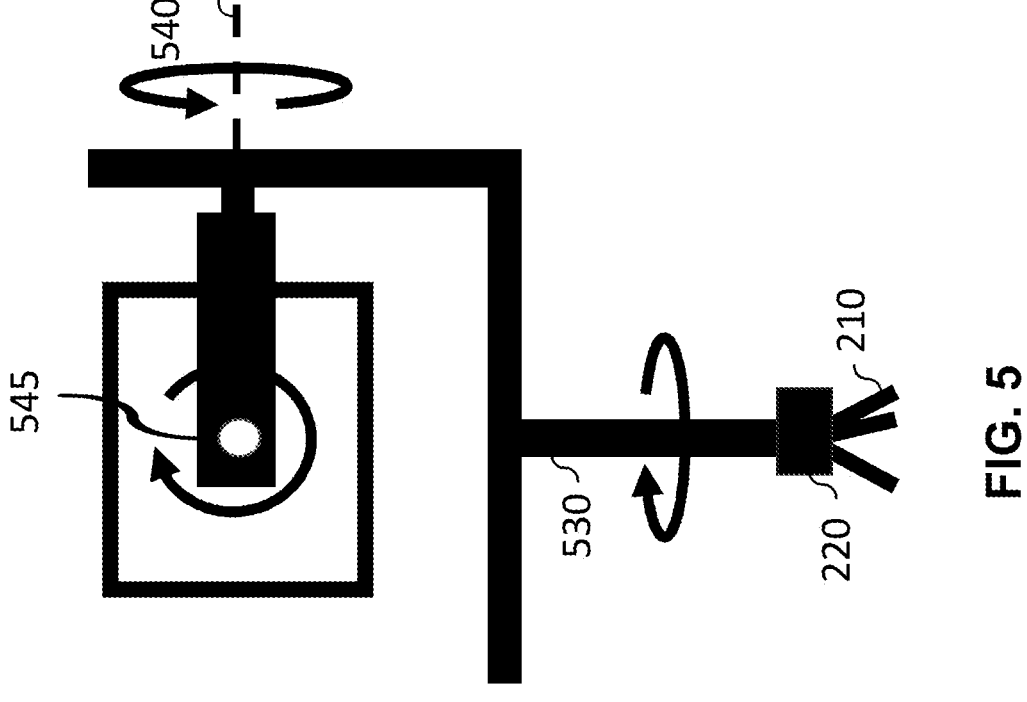
FIG. 5 illustrates schematically an example schematic diagram of an image capture system, in accordance with some embodiments of the presently disclosed subject matter.
Figure 5:

Attention is now drawn to FIG. 5, schematically illustrating an example generalized schematic diagram of an image capture system 505, in accordance with some embodiments of the presently disclosed subject matter. The view 500 illustrates another example of a three-axis system, exemplified in the figure by a pan over tilt over roll configuration. In this view, tilt gimbal 540 and pan gimbal 530 are shown. Also shown is roll gimbal 545. This system 505 is an additional example of image capture system 120.

Thus, in sample examples, the camera mounting comprises a tilt over pan gimbal. In sample examples, the camera mounting comprises a pan over roll over tilt gimbal. In sample examples, the camera mounting comprises a pan over tilt over roll gimbal.

In some examples, such gimbals or camera mountings are referred to herein, for instance, also as pan-tilt-roll or yaw-pitch-roll.

In some examples, image capture systems 305, 405, 505, comprise controller 270 and trigger mechanism 280. However, note that in FIGS. 3-5, the controller 270 and trigger mechanism 280 are not shown, purely for ease of exposition.

Figure 6:
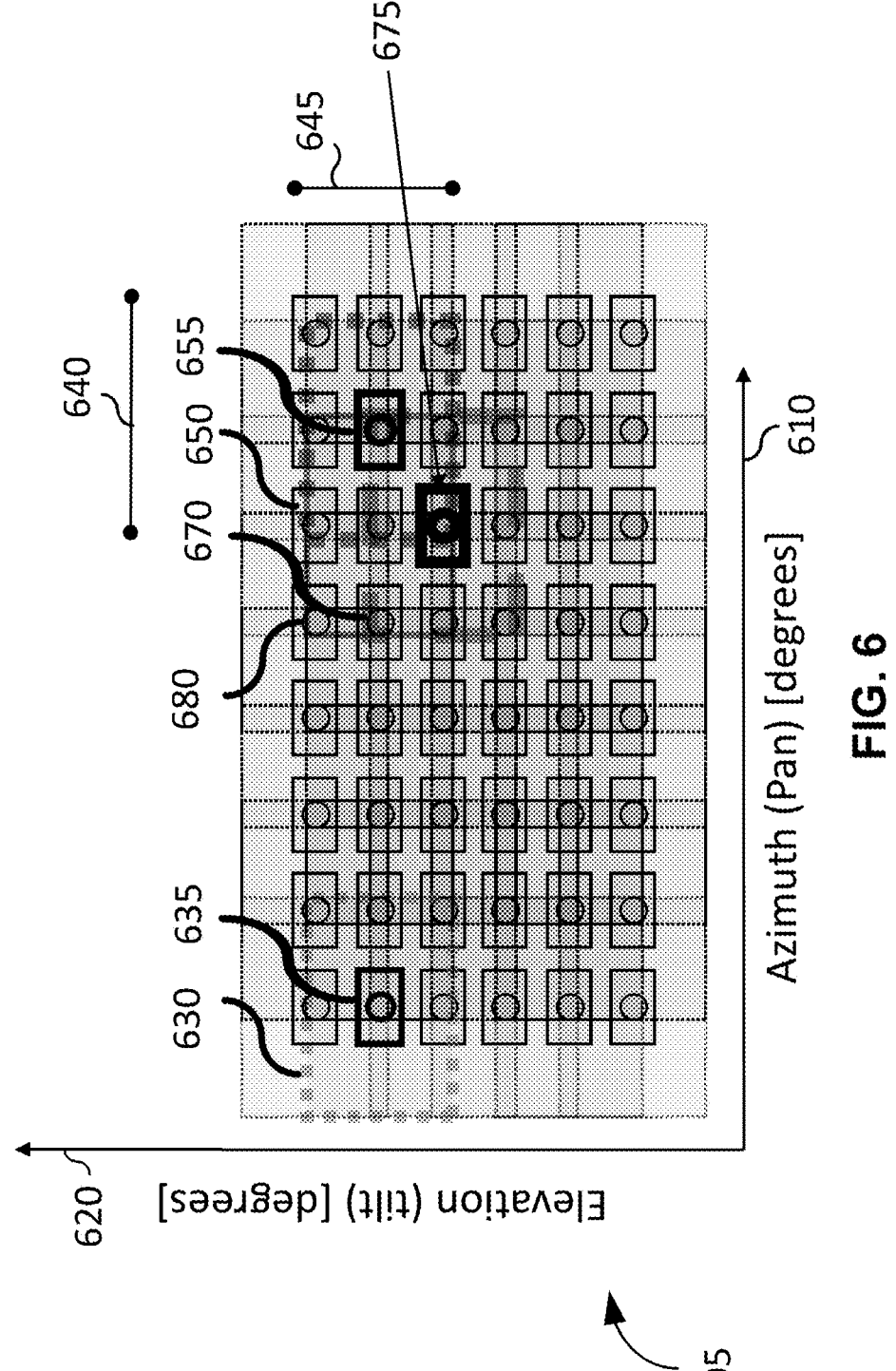
FIG. 6 illustrates schematically an example schematic diagram of a rectangular array of images, in accordance with some embodiments of the presently disclosed subject matter.

Attention is now drawn to FIG. 6, schematically illustrating an example generalized schematic diagram of a rectangular array of images, in accordance with some embodiments of the presently disclosed subject matter. The view 605 illustrates a set of captured images which form a rectangular array of images, also referred to herein as a rectangular matrix, or a rectangular grid, of images. This is a non-limiting of a set of images generated by using image capture system 120, 205, 305, 405, 505.

The example array is shown in two dimensions—azimuth/pan/X 610 and elevation/tilt/Y 620. The example of the figure is of an eight by six (8×6) array/matrix, shown for ease of exposition. The non-limiting example is of an equally spaced image array. The matrix shown is referred to herein also as a non-limiting example of a two-dimensional angular grid, as each image 630 corresponds to a particular angular position of camera 250.

Purely for ease of exposition, the camera icon (small rectangular with circle inside) represents the center of each captured image. The narrow, dotted, lines mark the angular coverage of each image. For purposes of clarity, three of the images 630, 650, 670, and the respective camera icons 635, 655, 675 of the three, are highlighted. Each image frame is shown with two image frame dimensions: an image frame width 640 and an image frame height 645.

Image frames 650 and 670 can be considered diagonally adjacent to each other. In the particular example of the figure, the images are captured such the adjacent images in each dimension have a 55% overlap. Thus it can be seen that frames 650 and 670 overlap 55% in the X or azimuth direction, and 55% in the Y or elevation direction. Thus, the area overlap of the two frames 650 and 670 is approximately 30%.

It can be seen that e.g. frame 650, and the frame adjacent to it on the left of it (which is not highlighted), have overlap of 55% in the azimuth direction, and 100% in the elevation direction. Thus, the area overlap of these two frames is 55%. It can also be seen that e.g. frame 650, and the frame directly below it (which is not highlighted), have overlap of 100% in the azimuth direction, and 55% in the elevation direction. Thus, also the area overlap of these two frames is 55%.

Note that in some examples, at least some adjacent images are rotated with respect to each other. Non-limiting examples are disclosed further herein, e.g. with reference to FIGS. 22 and 23, regarding image frame alignment using tie points to account for distortions and errors. In such cases, overlap can, for example, be measured or determined with reference to the axes of each of the relevant image frames.

In the example of the figure, the array 605 of images is created by instructing the camera mounting of image capture system 120 to move in e.g. two degrees of freedom, e.g. in pan and tilt.

FIGS. 15-18 disclose an example of images frames overlaid over a view of the building façade.

As disclosed above, the repeated instructions to move are configured to capture a 2-D set of still image frames of a scene. The repeated instructions to move are configured to move the camera to a set of camera orientations which enable this capture of the set of image frames. In the example of FIG. 6, a particular image frame 650, and at least some corresponding adjacent image frames, of the set, have an overlap amount of more than 50% of at least one image frame dimension (image frame width and/or image frame height). Note that the varying degrees of grayness illustrate overlap of different numbers of frames in a particular region of the scene. For example, a relatively darker shade of gray indicates a larger number of frames in which a particular region or portion of the scene appears.

In some examples, the movement controller 270 repeatedly instruct the camera mounting to move the camera 250 from a current imaging position 650 to a next imaging position, where the repeated instructions comprise a first instruction comprising movement in a first angular degree of freedom (e.g. pan or tilt) and a second instruction comprising movement in a second angular degree of freedom (e.g. tilt or pan). In some examples, the instructed movement comprises movement in units of an angular increment, where the angular increment corresponding to less than 50% of an image frame dimension.

Thus, for example, it can be, in one case, that the camera is moved by the camera mounting gimbals from the angular position corresponding to frame 650, to the angular position corresponding to frame 680, one position to the left. In the example, the angular increment of movement corresponds to 45% of image frame width 640, and therefore the overlap between frames 650 and 680 is 55% in the pan/width direction. The same is true for e.g. an instruction to move from the angular position corresponding to frame 680, to the angular position corresponding to frame 670, one position down. In such case, the angular increment of movement corresponds to 45% of image frame height 645, and therefore the overlap between frames 670 and 680 is 55% in the elevation/height direction.

In both of these examples, the movement between the current imaging position and the next imaging position is by one single unit of angular increment.

Note that the term direction, in the presently disclosed subject matter, refers to a direction of movement of the camera (e.g. elevation or azimuth), or a relative direction of two image frames. The term dimension refers to a size (e.g. width/height) of a frame. Thus, in the above example, the 55% overlap in the elevation direction refers to an overlap of 55% of a frame dimension, that is of a frame height. That is, if for example the frame height corresponds to 1 meter of building height, the 55% of the frame dimension indicates that in both frames include visual information corresponding to the same 0.55 m of the building height, e.g. the lower 0.55 m of the sixth floor.

In other examples, the instructed movement, between the current imaging position 680 and the next imaging position 630, can be by a plurality of units of an angular increment. In such a case, the instruction to the camera mounting is to move the camera 250 by six (6) angular increments to the left.

Thus, in some examples, the instructed movement comprises movement by multiples of one or more angular increments, e.g. one times the increment or six times the increment, as exemplified above.

Thus, in some examples the image capture system 120 comprises:
- a. a camera 250;
- b. a camera mounting, configured to provide the camera with at least two angular degrees of freedom (DOF);
- c. a mount base 210, configured to enable a base 220 of the camera mounting to be stationary during performance of imaging; and
- d. a movement controller, comprising a first processing circuitry, the first processing circuitry operatively coupled to the camera mounting and configured to repeatedly instruct the camera mounting to move the camera from a current imaging position 670 to a next imaging position 680. The repeated instructions comprise a first instruction comprising movement in at least a first angular degree of freedom and a second instruction comprising movement in at least a second angular degree of freedom. The instructed movement comprises movement in units of a particular angular increment, i.e. multiples (1x or more) of the angular increment. Each angular increment corresponds to less than 50% of an image frame dimension, wherein the image frame dimension is one of an image frame width and an image frame height.

Non-limiting illustrative examples of the repeated instructions for movement are now disclosed. In one example, the first imaging position corresponds to the bottom left frame of the figure, indicated for example by x, y position (1, 1). The camera is then moved, one angular increment at a time, each time less than 50% of the frame width, from left to right. After imaging the bottom right frame, at position (8, 1), the camera is moved one angular increment up in elevation, to the second row from the bottom, captures image (8, 2), and then moves left one increment at a time, until imaging image (1, 2). The camera is then moved up one row, to capture image (1,3), and so on, moving in a "snake" or "lawnmower" pattern, e.g. left to right followed by right to left.

The rightward movement from (1, 1) to (2, 1) exemplifies an instruction to move in at least a first angular degree of freedom. The upward movement from (8, 1) to (8, 2) exemplifies an instruction to move in at least a second angular degree of freedom.

In another example, the snake pattern moves up and down columns in the array, rather than left and right along rows.

In still another example, after imaging row 1 from (1, 1) to (8, 1), the camera is moved up and then all the way to the left back to (1, 2), and then images again from left to right, imaging row 2 from (1, 2) to (8, 2), in a "typewriter path", and so on.

The above examples start the movement with a left to right movement. Note that in other cases, the movement and capturing can instead be performed starting with the right-to-left direction. In still other cases, they are performed in the up-down or down-up direction, e.g. column by column instead of row by row.

In all of these above examples, the instructed movement is by one angular increment for each image capture, i.e. one frame at a time. These are also non-limiting examples of instructions to move the camera in equally spaced increments (e.g. by 45% of a frame direction for each movement). The movement can be equally spaced for one or both image frame dimensions, i.e. in the horizontal and/or the vertical directions, i. e. in equally spaced increments in one or both of the first angular degree of freedom and the second angular degree of freedom, i.e. the first angular increment and/or the second angular increment are equally spaced. Note that in some cases, the equally spaced increment of movement along rows, for example, is not the same as the equally spaced increment of movement along columns. Note also, that in some other examples, movement in increments that are not equally spaced (e.g. move from position (1, 1) to (2, 1) by 45% of a frame width, but move from (2, 1) to (3, 1) by 40% of a frame or 40% of a frame).

In some examples, the repeated movement is not in units or multiples of a single particular angular increment. One example of such, considering just the azimuth direction, is 5 image frames, numbered 1 to 5, arranged left to right. The first image, number 1, is captured. Movement to the right is then performed, by 2×48%=96% of a frame width, and then frame 3 is captured. Movement to the right is then performed by 2×42%=84% of frame width, and then frame 5 is captured. Movement to the left is then performed, by 1×40%, and frame #4 is captured. Then movement to the left is performed by 2×45%=90%, and frame #2 is captured.

Thus, in some examples, movement between two imaging positions is by multiples of angular increments of varying sizes, that is where the relevant angular increment is not fixed for each camera movement between positions. Also, in some implementations, the multiples of one or more angular increments are not integer multiples.

Note also, that in some examples, the overlap amount and the second overlap amount are the same. For example, the angular increment and the second angular increment are the same. For example, the pan angular increment and the tilt angular increment are both 40%. This results in an overlap amount in the frame width dimension and an overlap amount in the frame height dimension which are both 60%. In other cases, the configuration is to provide a different overlap for the vertical and horizontal axis, e.g. overlapping 55% vertical but 60% horizontal.

In still other examples, at least some the movement is in multiple increments, e.g. 6 increments to the left as disclosed above with reference to 650 and 630. A complex arrangement of movement of the camera between imaging positions, e.g. from (2, 3) to (8, 5) to (8, 1) to (4, 5) to (7, 3) etc. is possible. Such a set of movement instructions, in unordered sequence, and possibly in unequal angular distances, or in unequal numbers of angular increments, can still result, after they are all performed, in a set of images such as those of FIG. 6, where the frame dimension overlap amounts in the relevant directions are more than 50%. One example of this utilizes a diagonal movement, e.g. where image 650 is captured, and the next captured image is 670, located to the lower-left of 650 (or capture 670 and then 650).

The movement from (2, 3) to (8, 5) is a non-limiting example of an instruction for movement simultaneously in both a first angular degree of freedom and a second angular DOF.

In addition, in some examples, the coordinate frame of reference of the camera 250 is not aligned with that of the building elevation and azimuth. An example of such an implementation is disclosed further herein with reference to FIG. 20.

In some examples, the overlap amount is 55% of the image frame dimension. In some examples, the overlap amount is 66.666% of the image frame dimension. In such a case, each point in that dimension appears in three different images.

In some examples, the overlap amount is 70% of the image frame dimension. In some examples, the angular increment corresponds to 45% of the image frame dimension. In some examples, the angular increment corresponds to 40% of the image frame dimension. In some examples, the angular increment corresponds to 30% of the image frame dimension.

As will be disclosed further herein with reference to FIGS. 15-18, such a set of images, with over 50% overlap, can facilitate capture of each point, in non-perimeter image frames of the scene, also in at least one adjacent captured image frame along a direction corresponding to the image frame dimension, along a direction corresponding to the image frame dimension. Advantages of such overlap are disclosed as well.

In some examples, an overlap of exactly 50% is sufficient to enable every point on the scene of the façade to appear in two different frames. If the overlap is exactly 50% in both directions, e.g. in diagonal arrays disclosed with reference to FIG. 19, there will be an area overlap of exactly 25% between two such frames. However, in some cases an overlap of more than 50% is preferred, as this will accommodate movement tolerances and other source of errors. For example, if the camera is instructed to move 50% in azimuth, but due to tolerances it in fact moved 51%, the resulting overlap between adjacent frames will be 49%. This will result in a small region/area, corresponding to 1% of the frame width, which is captured in only one frame in the azimuth direction, and thus lacks frame redundancy.

Note also, that if the overlap is more than 50%, a particular image will overlap also with image frames that are two positions away from it. For example, consider only the azimuth direction. Frame number n has a neighbor to its left, and a neighbor to its right, indicated as frames numbered n−1 and n+1. These two frames n−1 and n+1 are adjacent to the given frame n from opposite sides, in opposite directions. They are neighboring but not adjacent. Also these two frames n−1 and n+1 overlap each other to some degree.

Note that this overlap situation gives additional frame redundancy, in that the particular regions appear in all three of frames n−1, n and n+1. For example, if both frames n−1 and n are of poor quality, the third frame n+1 can still be used to represent the relevant portion 1510 of the composite image. The composite panorama can be complete, without gaps such as 1333, despite the exclusion, and thus loss of one or more frames to e.g. poor quality.

Figure 7:
FIG. 7 schematically illustrates one example generalized schematic diagram of a non-array set of images, in accordance with some embodiments of the presently disclosed subject matter.
Figure 19:
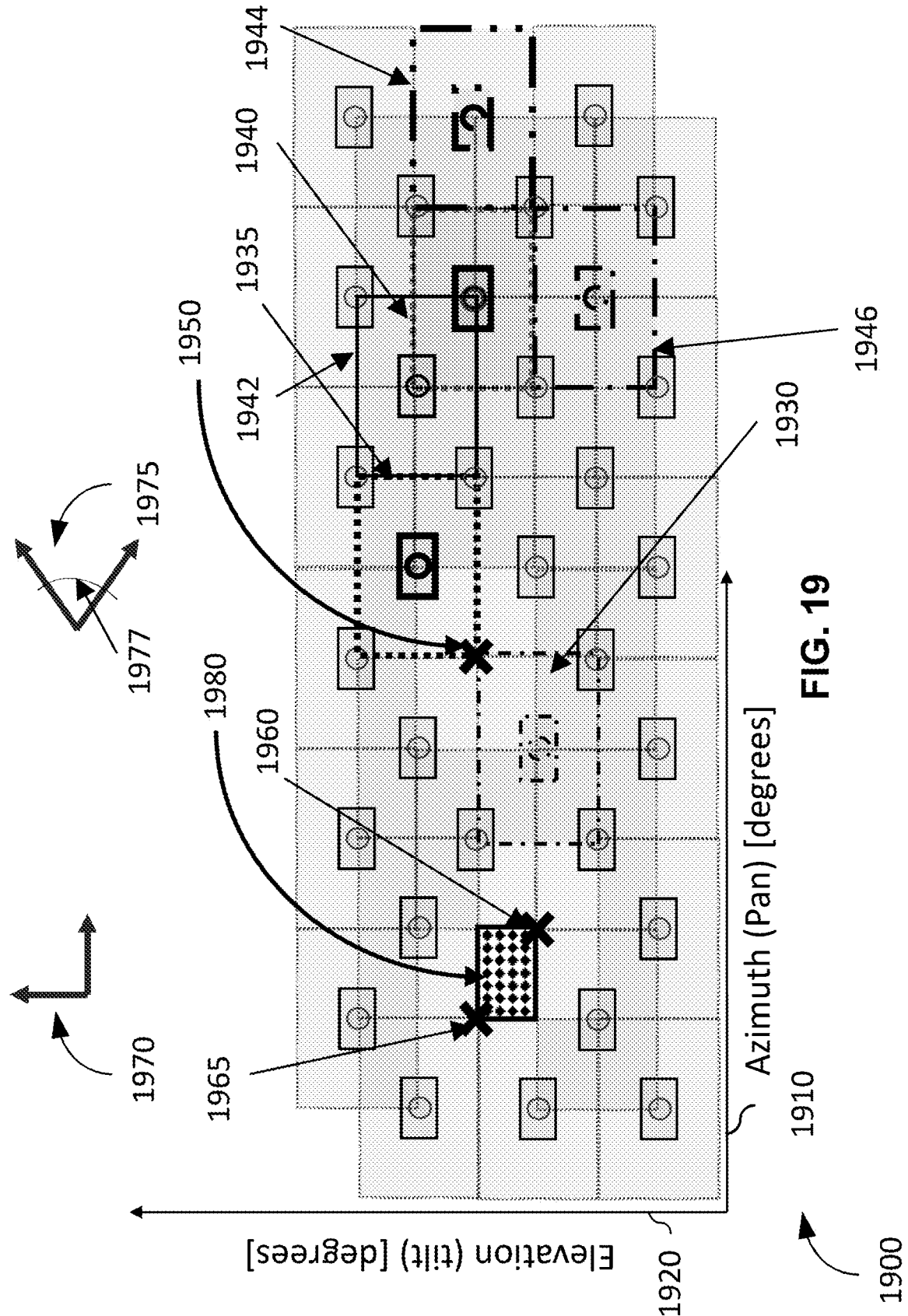
FIG. 19 schematically illustrates an example generalized schematic diagram of a diagonal array of images, in accordance with some embodiments of the presently disclosed subject matter.
Figure 20:
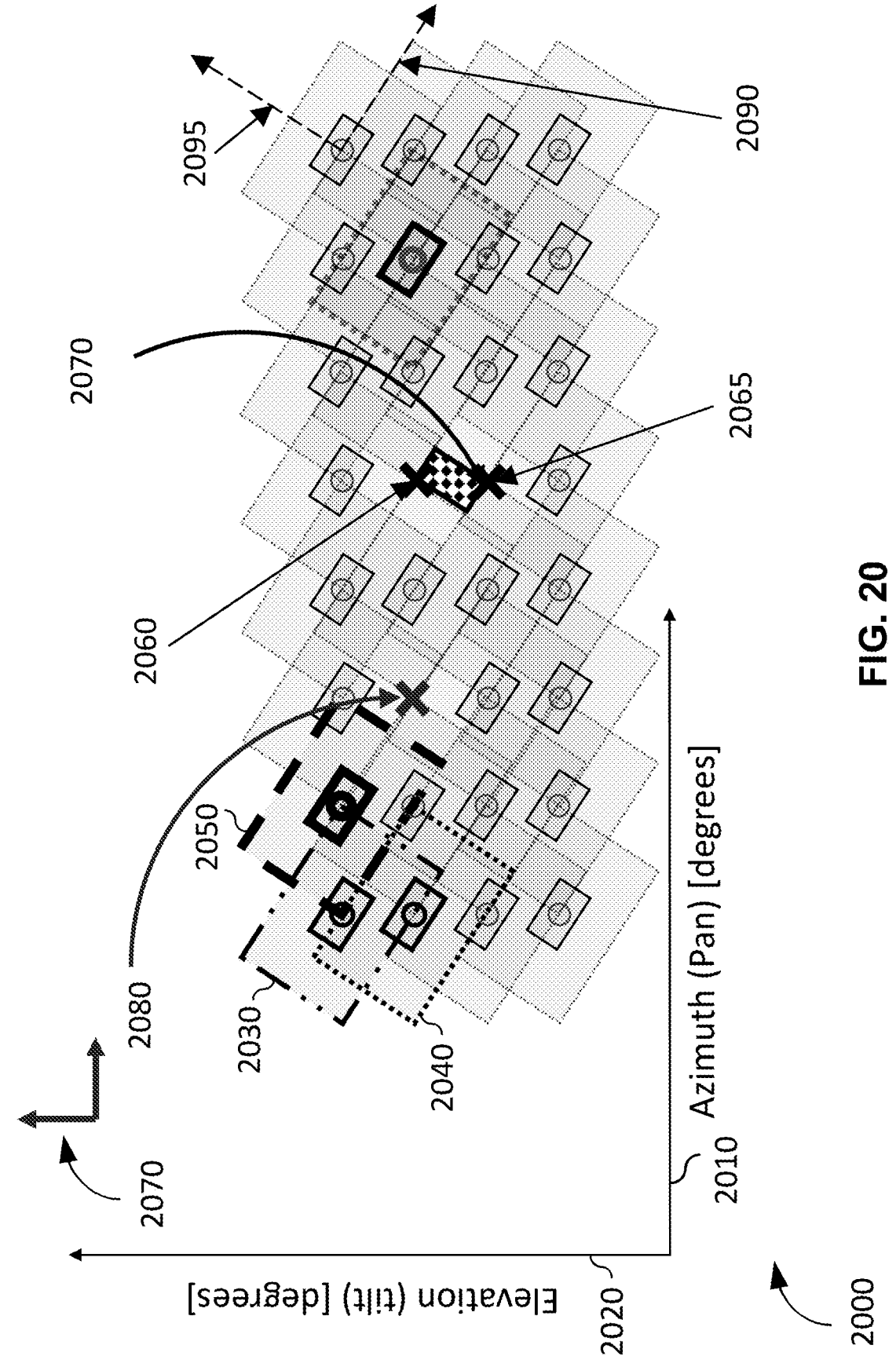
FIG. 20 schematically illustrates an example generalized schematic diagram of an array of images, in accordance with some embodiments of the presently disclosed subject matter.

The various arrays of images, disclosed herein with reference to FIGS. 6, 19, 20, are only non-limiting examples. In other examples, the set of images are not in an array. Attention is now drawn to FIG. 7, schematically illustrating an example generalized schematic diagram of a non-array set of images, in accordance with some embodiments of the presently disclosed subject matter. The view 705 illustrates a set of captured images which do not form an array of images. This is another non-limiting of a set of images generated by using image capture system 120, 205, 305, 405, 505.

The example array is shown in two dimensions—azimuth/pan/X 710 and elevation/tilt/Y 720. The example of the figure is of six rows of captured images, shown for ease of exposition. In the bottom two rows, eight images are captured per row. In the next two rows, seven images are captured per row. In the tow two rows, six images are captured per row. There is no array or matrix of images, no clear grid.

In the particular example of the image, there is equal spacing of images, and of angular increments. They represent 55% overlap. In other examples, the spacings are not equal. Similarly, in other non-limiting examples there are columns of images rather than rows, in the non-array set of images.

In the figure, for clarity of exposition, two of the images 750, 770, and the respective camera icons 755, 775 of the three, are highlighted.

In some examples, image capture system 120 comprises a third processing circuitry, not shown in FIGS. 2-5. This third processing circuitry in some examples comprises a memory and a processor (both not shown). This third processing circuitry in some examples comprises the first processing circuitry of the controller 270, and/or the second processing circuitry of the trigger mechanism 280. In other examples, it is comprised in one of the first or second processing circuitries. In still other examples, there is partially commonality of at least some of the processing circuitries. In still other examples, the third processing circuitry is separate from both the first and second processing circuitries.

In some examples, one or more of these processing circuitries are configured to perform steps of the following example method:

a. providing the image capture system 120, the image capture system comprising:
   i. the camera 250;
   ii. the camera mounting, configured to provide the camera with at least two angular degrees of freedom (DOF);
   iii. the mount base 210, configured to enable the base 220 of the camera mounting to be stationary during performance of imaging; and
   iv. the movement controller 270, comprising the first processing circuitry, the first processing circuitry operatively coupled to the camera mounting and configured to repeatedly instruct the camera mounting to move the camera from a current imaging position to a next imaging position.

These repeated instructions comprise a first instruction comprising movement in at least a first angular degree of freedom and a second instruction comprising movement in at least a second angular degree of freedom. These repeated instructions to move are configured to capture of a corresponding two-dimensional set of image frames of a scene, e.g. of the surface of a body.

Image frames, of the set of image frames, and at least some corresponding adjacent image frames, of the set of image frames, have an overlap amount of more than 50% of both image frame dimensions. The image frame dimension is one of an image frame width and an image frame height.

b. receiving information indicative of a focal length of the lens of camera 250, and/or a pixel iFOV (e.g. performed by the third processing circuitry). In the case of a zoom lens, as opposed to e.g. a fixed focal length lens, this information can comprise the zoom level of the camera;

c. receiving the overlap amount (e.g. performed by the third processing circuitry);

d. receiving an indication of the boundaries of the scene (e.g. opposite corners, such as of a bottom left and upper right edges of a rectangular array, or lines indicating four boundaries—corresponding to the façade) (e.g. performed by the third processing circuitry). In one example, a human user moves a joystick over an image or plan of the façade, and they indicate the corners/boundaries. Other known per se methods exist.

Information about regions to be imaged are thus received. In some examples, information on the start points and end points is received.

e. calculating the set of still images to capture, based at least on the information indicative of the focal length (e.g. zoom level, focal length) and/or FOV, on the overlap amount and on the indication of the boundaries of the array/scene. This includes calculating the number of e.g. horizontal (pan) and vertical (tilt) images, and the corresponding camera angular positions of each image (e.g. performed by the third processing circuitry). In some examples, this set is calculated to facilitate over 50% overlap in one or more image dimensions.

f. capturing the set of images (e.g. performed by controller 270, trigger mechanism 280 and camera 250).

In some examples, calculating the set of images to capture includes also calculating the order of capture, thus yielding e.g. a plan of movement (e.g. "typewriter path starting from bottom left corner" etc.).

Figure 21:
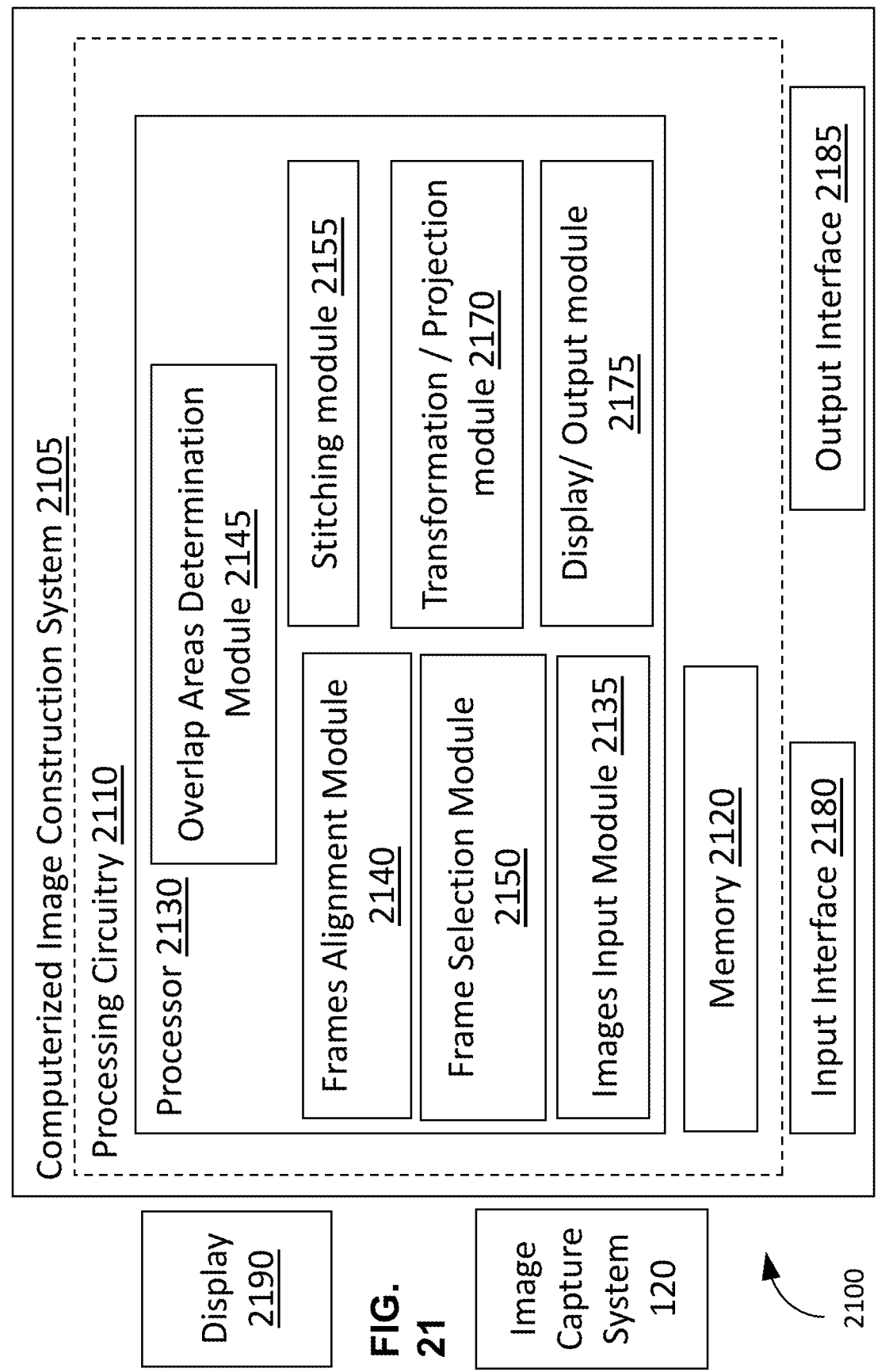
FIG. 21 schematically illustrates a generalized schematic diagram comprising a computerized image construction system, in accordance with some embodiments of the presently disclosed subject matter.

In some examples, the set of images can then be transferred to computerized image construction/stitching system 2105, e.g. as disclosed with reference to FIG. 21, to facilitate construction of the composite images. Examples of this system and the image construction process are disclosed with reference to FIGS. 21-5B.

In other examples, the set of images is uploaded to another storage (not shown), e.g. cloud storage. In some examples, construction system 2105 obtains the set of images from that storage.

In some examples, the image capture system 120 is configured to record the one or more camera 250 angles associated with captured image frames of the 2-D set of still image frames. For example, controller 270 can know this information, and send it to the third processing circuitry for recording, and for storage in a memory or in a separate storage. These recorded camera angles can be utilized during the stitching process, e.g. as disclosed with reference to the flowchart of FIGS. 25A-25B.

In some examples, the camera 250 comprises an autofocus mechanism (not shown), configured to perform autofocus, and the above step (f) comprises capturing an image frame also in a case of non-convergence of the autofocus mechanism.

As indicated above, in some examples, the above steps (b)-(e) are performed by the third processing circuitry.

In some cases where a camera utilizes a zoom lens, the FOV of the camera changes when the zoom level (and thus the focal length) is changed. Nevertheless, in current implementations it is preferable that the zoom level should remain the same for the capture of an entire image set for a given composite image.

Similarly, in some examples, one or more of the above processing circuitries are configured to perform the following method:

a. providing the image capture system, the image capture system comprising:

i. a camera 250, where the pixel instantaneous field of view (iFOV), associated with an imaging sensor of the camera, is less than 15 micro-radians;

ii. a camera mounting, configured to provide the camera with at least two angular degrees of freedom (DOF);

iii. a mount base, configured to enable a base of the camera mounting to be stationary during performance of imaging; and iv. a movement controller, comprising a first processing circuitry, the first processing circuitry operatively coupled to the camera mounting and configured to repeatedly instruct the camera mounting to move the camera from a current imaging position to a next imaging position.

The repeated instructions comprise a first instruction comprising movement in at least a first angular degree of freedom and a second instruction comprising movement in at least a second angular degree of freedom. The repeated instructions to move are configured to capture of a 2-D set of still image frames of a scene.

b. receiving information indicative of a focal length of the camera; lens c. receiving the overlap amount;

d. receiving an indication of the boundaries of the scene;

e. calculating the set of angles of image capture, based at least on the focal length or zoom level, on the overlap amount and on the indication of the boundaries of the scene; and f. capturing the set of images.

Similarly, in some examples, one or more of the above processing circuitries are configured to perform the following method:

a. providing the image capture system, the image capture system comprising:

i. a camera 250, which comprises an autofocus mechanism (not shown), configured to perform autofocus. It is configured to capture a still image frame also in a case of non-convergence of the autofocus mechanism for that image frame.

ii. a camera mounting, configured to provide the camera with at least two angular degrees of freedom (DOF);

iii. a mount base, configured to enable a base of the camera mounting to be stationary during performance of imaging; and iv. a movement controller, comprising a first processing circuitry, the first processing circuitry operatively coupled to the camera mounting and configured to repeatedly instruct the camera mounting to move the camera a current imaging position to a next imaging position.

The repeated instructions comprise a first instruction comprising movement in at least a first angular degree of freedom and a second instruction comprising movement in at least a second angular degree of freedom, The repeated instructions to move are configured to capture of a 2-D set of still image frames of a scene.

b. receiving information indicative of a zoom level (if relevant), or of a focal length, of the camera;

c. receiving the overlap amount;

d. receiving an indication of the boundaries of the scene;

e. calculating the set of still images, based at least on the focal length or zoom level, on the overlap amount and on the indication of the boundaries of the scene; and f. capturing the set of images.

Figure 8:
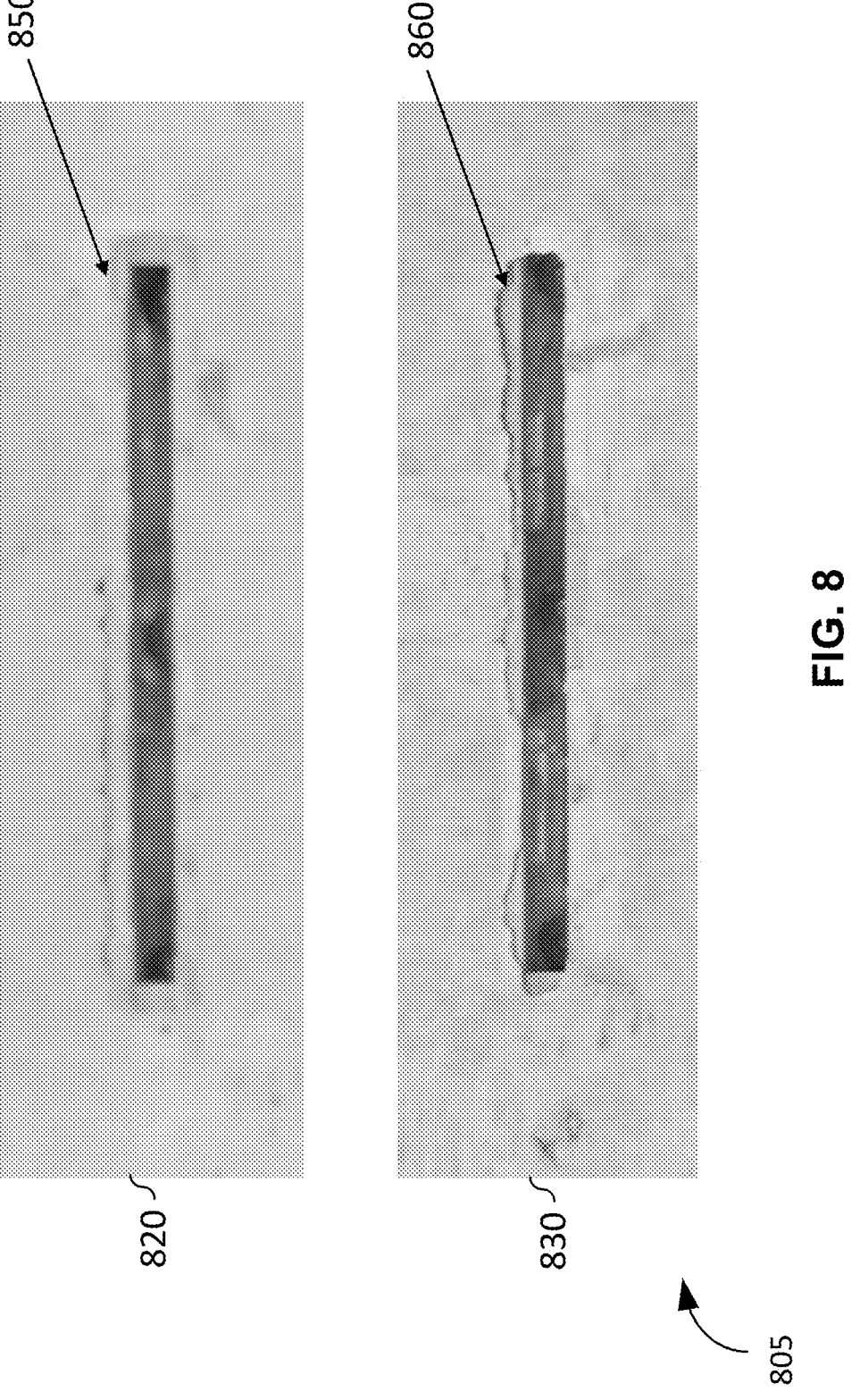
FIG. 8 schematically illustrates one example generalized view of images, in accordance with some embodiments of the presently disclosed subject matter.

As indicated above, there are at least some technical advantages achievable by configuring the camera system to capture the scene using frames which have an overlap amount of more than 50% in one or both image frame dimensions. Attention is now drawn to FIG. 8, illustrating an example generalized view of images, in accordance with some embodiments of the presently disclosed subject matter. The view 805 illustrates the capture of an image of a façade feature (e.g. a side view of a curtainwall anchor embedded in the concrete before the installation of the curtainwall,) in a focused capture case 830 and an unfocused capture case 820. Note that where the camera was in focus during the capture, the slot 860 appears considerably clearer than the slot 850 in the unfocused image 820.

Figures 9, 10:
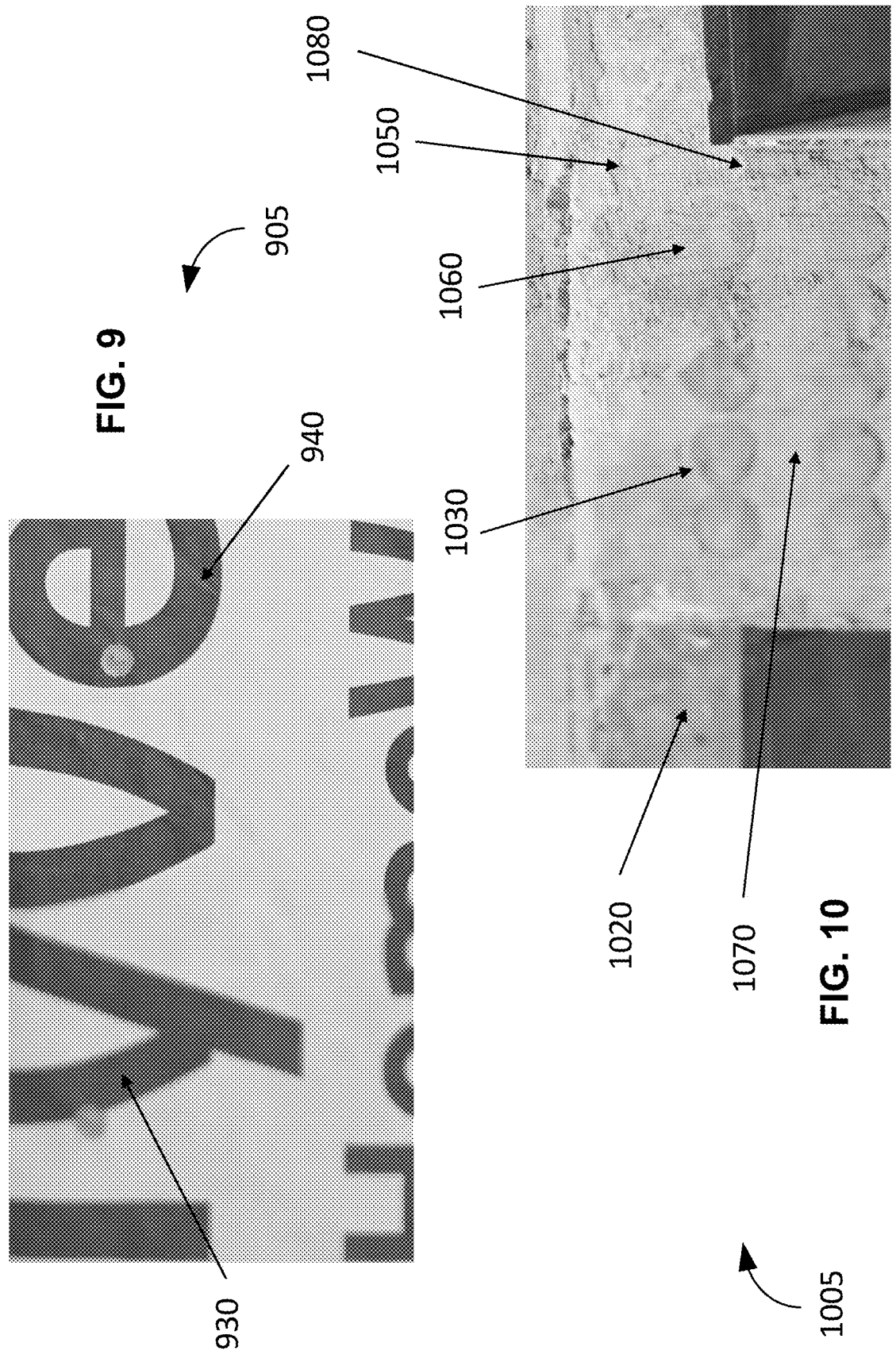
FIG. 9 schematically illustrates one example generalized view of images, in accordance with some embodiments of the presently disclosed subject matter.
FIG. 10 schematically illustrates one example generalized view of images, in accordance with some embodiments of the presently disclosed subject matter.
Figure 11:
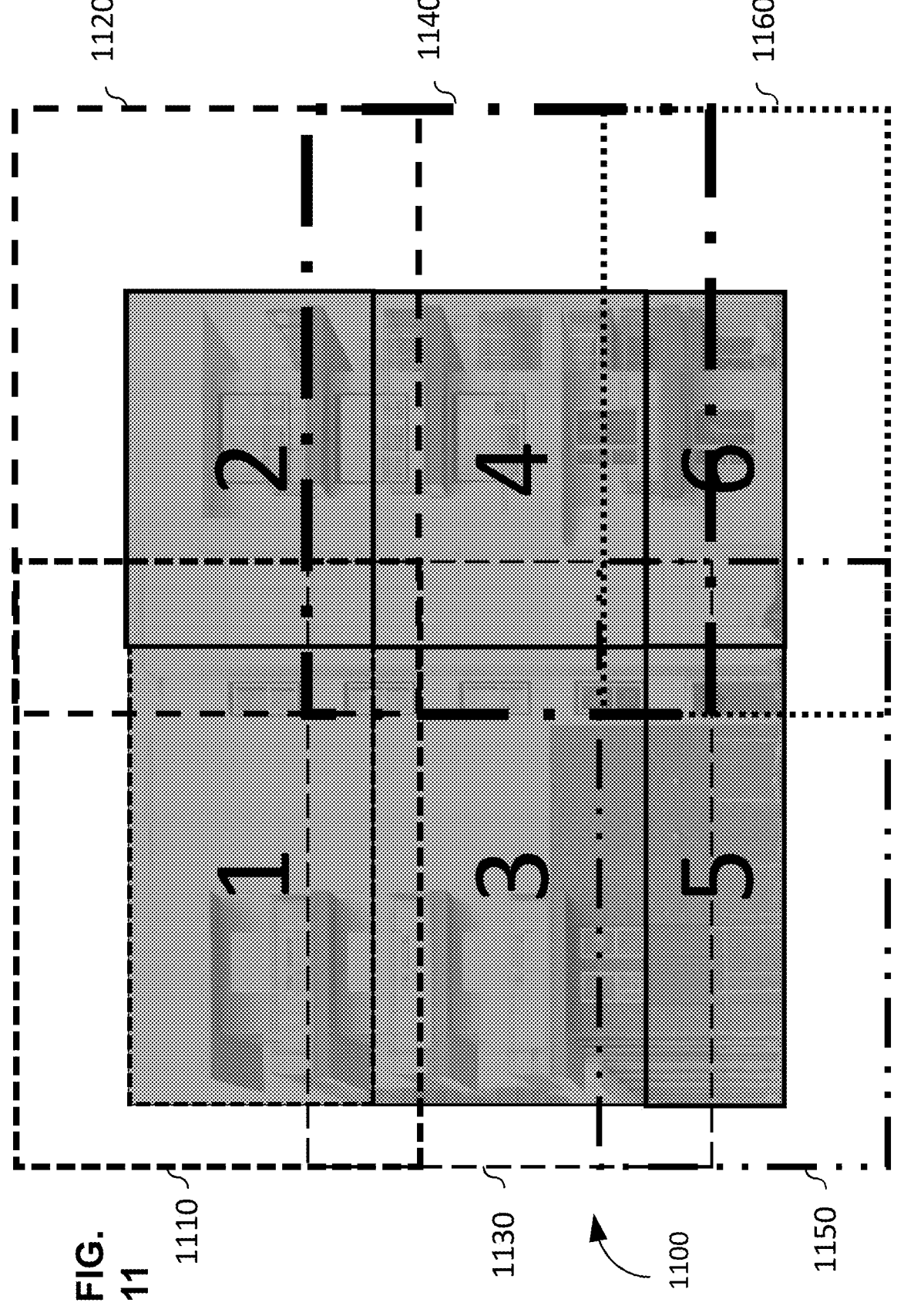
FIGS. 11-14 schematically illustrate one example generalized view of prior art image capture, in accordance with some embodiments of the presently disclosed subject matter.

Attention is now drawn to FIG. 9 illustrating an example generalized view of images, in accordance with some embodiments of the presently disclosed subject matter. The view 905 illustrates a portion of a composite image, in this case text, which was generated by stitching two adjacent images, one focused and the other one blurred. The portion from the blurred image is exemplified by letter 930 and the portion from the focused image is exemplified by letter 940.

Attention is now drawn to FIG. 10, illustrating an example generalized view of a composite image, in accordance with some embodiments of the presently disclosed subject matter. The view 1005 provides another example a composite image which was created using both focused and blurred images. In this case, horizontal beams and some circles representing grouted post tension cables. On the right side of the image, the focus/quality is high (because of the quality of the original captured image used for this portion of the composite image), as exemplified by circle 1060 and by the sharp lines/marks 1050, 1080. On the left side of the image, the focus/quality is relatively low and blurry (because of the quality of the original captured image used for this portion of the composite image), as exemplified by circle 1030, and by the blurry and unclear lines/marks 1020, 1070.

Note that FIGS. 9 and 10 exemplify the case where two image frames, e.g. a high quality one and a low quality one, are stitched together to create a composite image frame. Note that in such a case, the composite image suffers because part of the composite image is of lower quality.

In another example, FIGS. 9 and 10 could illustrate cases where a portion of an image frame, that is a sub-frame, is of poorer quality than another portion of the same frame. FIG. 8 exemplifies the case where an entire image frame is of either relatively good 830 or poor 820 quality.

For applications such as façade inspection, where there is a need to identify e.g. damage, foreign items and specification deviations, at e.g. resolutions of 1 mm, focused images, or in general images of high quality, are important. The fine-resolution details cannot be easily distinguished, or in some cases distinguished at all, if there is e.g. blur.

An example of prior art capture of a composite image is disclosed with reference to FIGS. 11-14. Attention is drawn to FIGS. 11-14, schematically illustrating an example generalized view of prior art image capture, in accordance with some embodiments of the presently disclosed subject matter. View 1100 shows an exemplary set of six image frames of a scene which comprises a building façade. Six images is a very small number of images, one that in real life cases might not require the burden of stitching images. However, it is used to demonstrate some technical issues with the prior art, and to demonstrate the solutions proposed.

The six images are labeled 1-6. The edges of each image frame are labeled 1110, 1120, 1130, 1140, 1150, 1160. Each edge is shown as a line of different weights, and/or patterns (dashed, dotted etc.), to distinguish them. It is immediately evident that several frames have overlap, that is they portray some of the same portions of the façade scene. In prior art capture of images to create a composite, the overlap is less than 50% of a frame dimension. An overlap of 25-30% in frame dimensions is an industry best practice, when stitching images in a two-dimensional array that were captured from substantially the same location.

Note that the lower portion of images 5 and 6 is cut off and not shown, for simplicity of the figure. This is true also for FIGS. 12-14.

Figure 12:
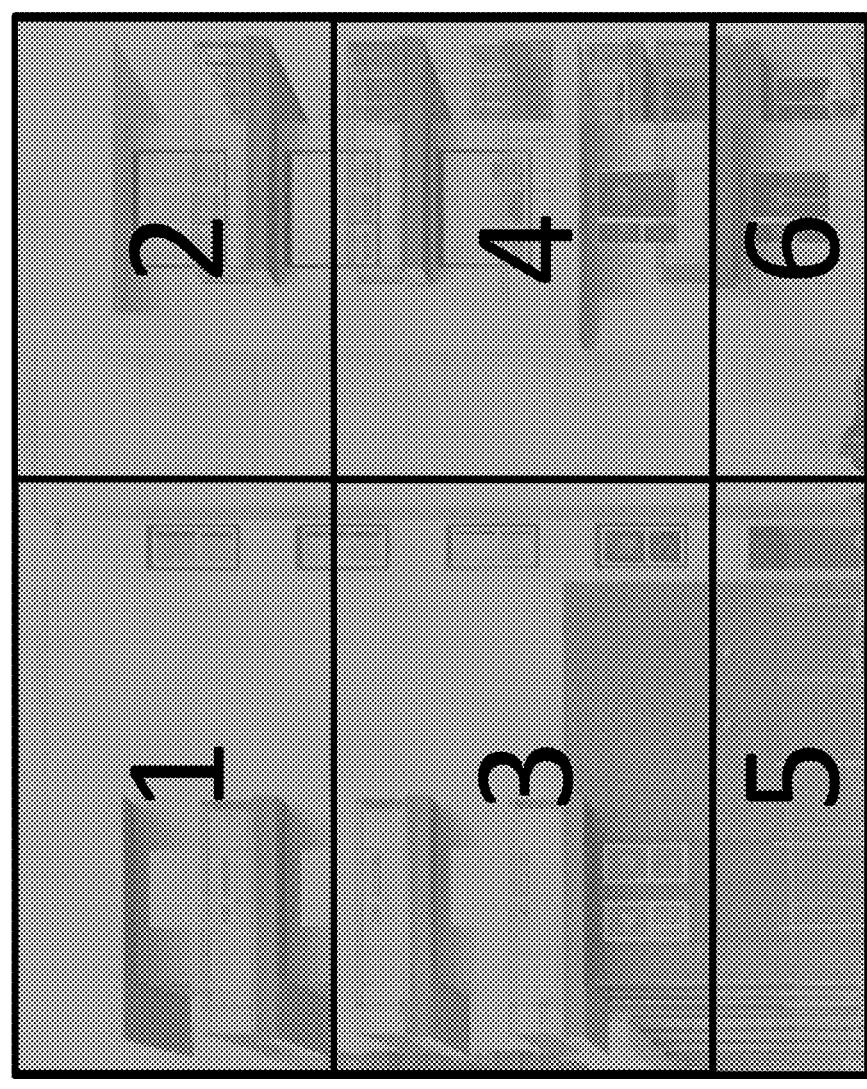
Figure 12:

In FIG. 12, a typical prior art composite image 1200 is illustrated. Six images were used to create the composite. In the example, in which all frames are of a quality defined by the application as "good", the default behavior is that most of the composite utilizes frames 3 and 4. Frames 1 and 2 were used for the upper portion. Only a small part of the frames 5 and 6 were used in the construction of the composite image.

Figure 13:
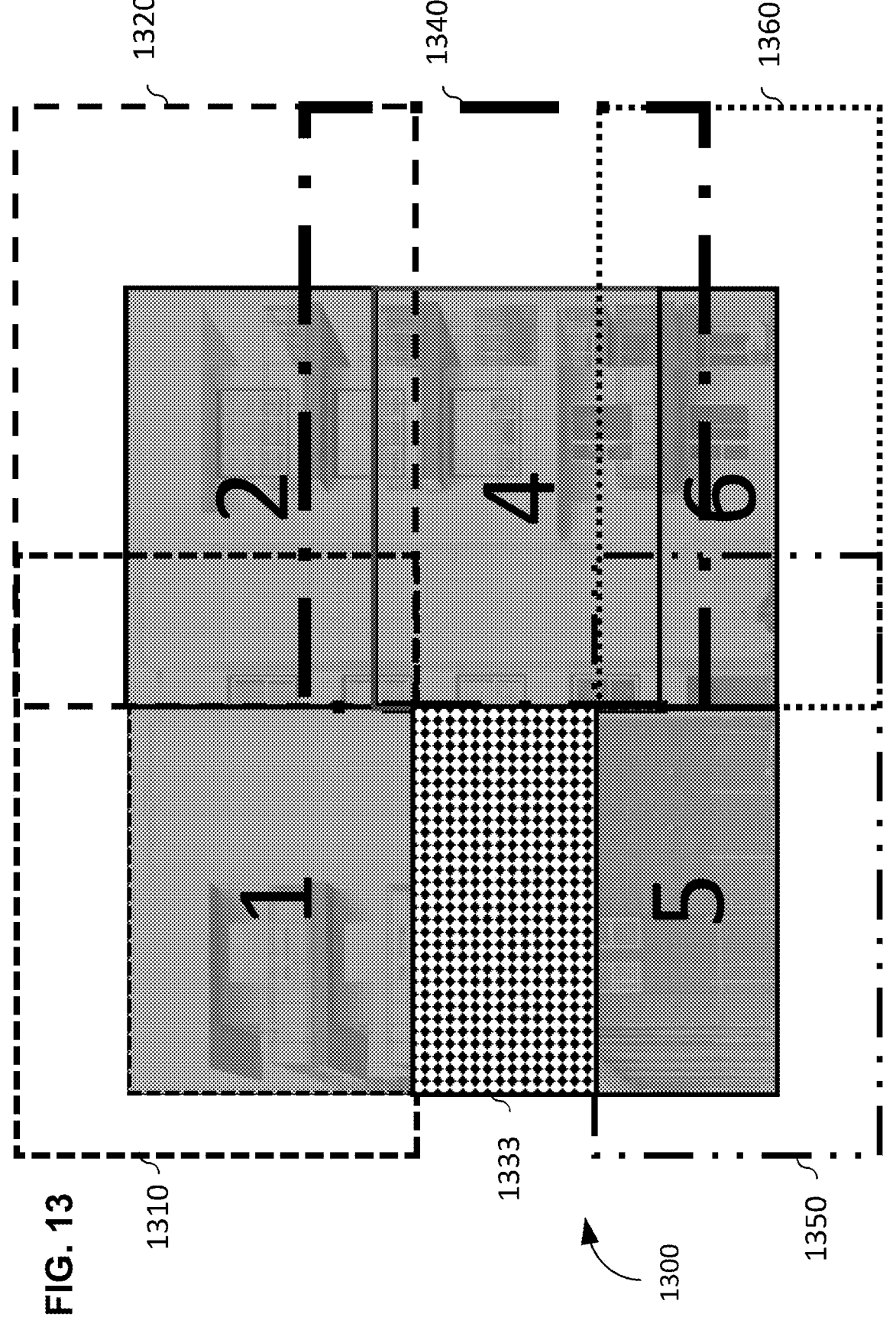

FIG. 13 illustrates a case 1300 where image frame 3 is e.g. of overall poor quality, and it should not be used at all to construct the composite image. Sections of the composite can still be constructed using e.g. parts of images 1, 4 and 6. However, due the insufficient overlap between images, even if the area from adjacent frames is maximized, to cover as much as possible, there is a portion 1333, shown with a special pattern of diagonal checkerboard, which cannot be represented in the composite. The compensation for the unusable frame is thus only partial.

Figure 14:
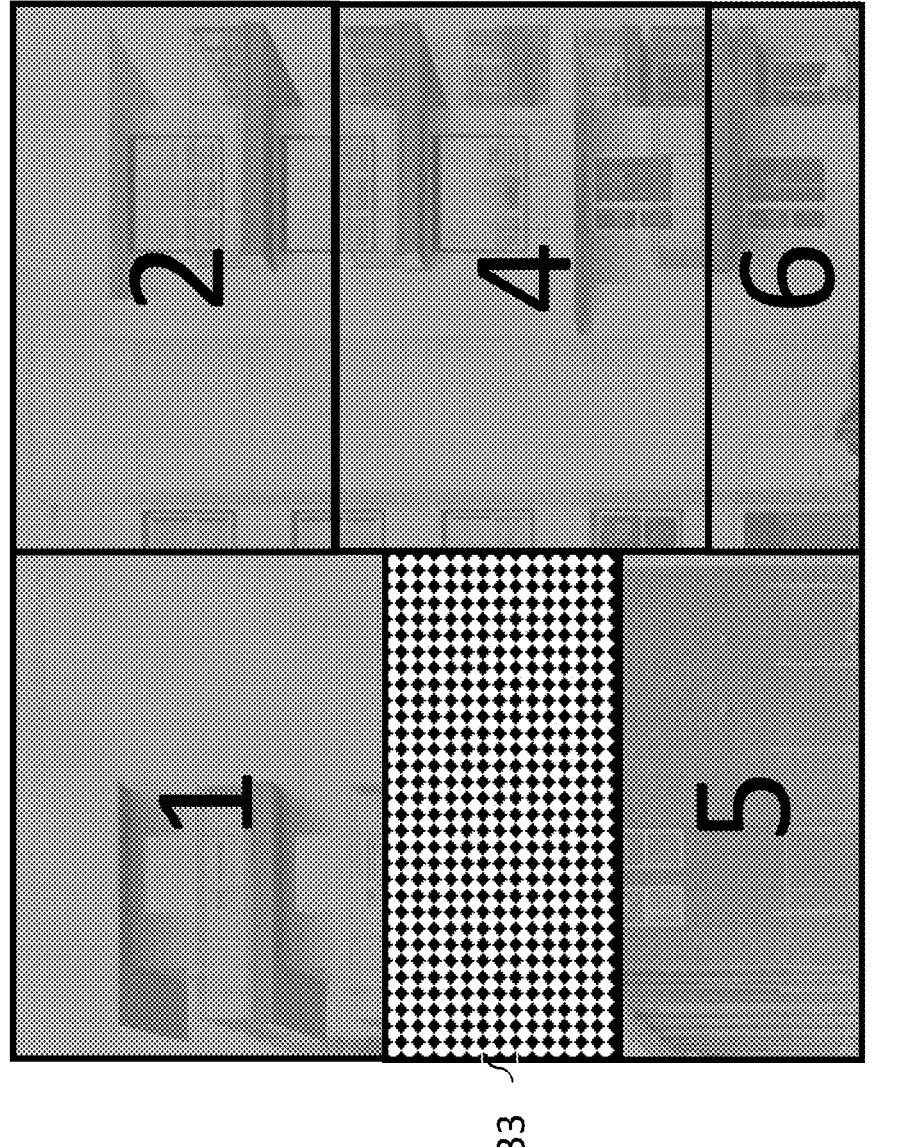

FIG. 14 illustrates the resulting composite image 1400, for the case 1200. The resultant composite image is incomplete. Due to the "gap" or missing image information 1333, the composite image is not an ideal one for e.g. high-resolution inspection purposes.

Figure 15:
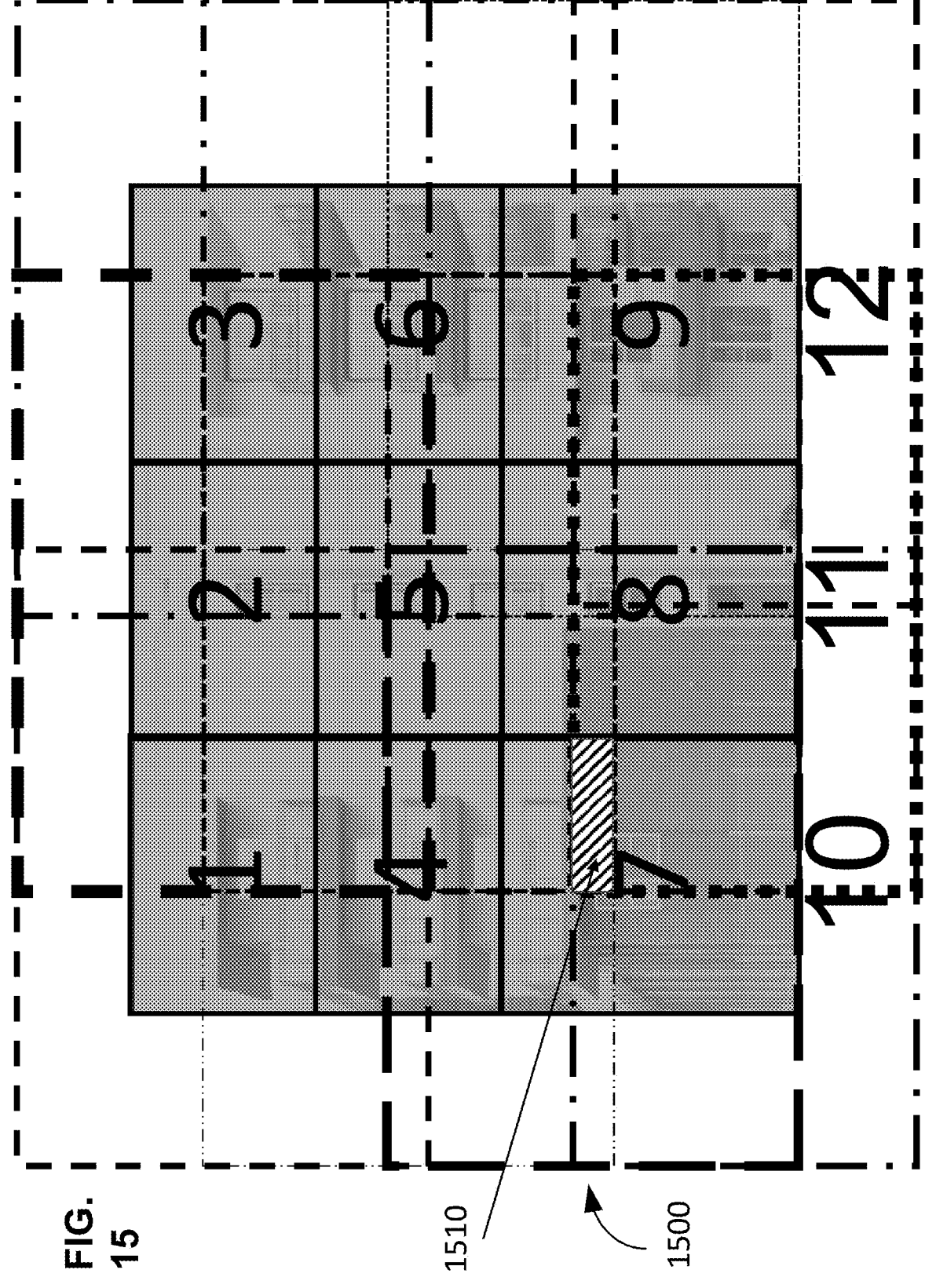

An example of capture of a composite image, per the presently disclosed subject matter, is disclosed with reference to FIGS. 15-18. Attention is drawn to FIGS. 15-18, schematically illustrating an example generalized view of image capture, in accordance with some embodiments of the presently disclosed subject matter. FIG. 15 illustrates an example 1500 of overlap, in at least one frame dimension, by an overlap amount of more than 50%. In the example, the overlap amount is 55%, and this overlap is in each of the elevation and azimuth dimensions. The example is of twelve image frames. The various dashed lines, of various weights, indicated the borders or edges of each frame. The thin solid lines indicate the parts of each frame which will be used to stitch together the composite image.

Note that the lower portion of images 10, 11 and 12 are cut off and not shown, for simplicity of the figure. This is true also for FIGS. 16-18.

A typical region or portion of the scene of the façade is shown 1510 as hatched lines. It corresponds to a portion of several image frames. It is referred to herein also as element of interest 1510. This portion 1510 appears in image frames 4, 5, 7, 8, 10, 11. These frames all include representations or depictions of portion 1510. Therefore, there are many choices of frames to represent this portion. The depictions of element 1510 by the various frames are in some cases of different qualities. the It is possible to choose or select the image frame with the best quality, e.g. with the highest quality ranking, to be used to represent that region 1510 within the composite image. Similarly, if one or more entire image frames are of insufficient quality to use, the remaining image frames can be used to stitch the entire composite image, including portion 1510 (see e.g. FIG. 18).

Portion 1510 is presented just as one exemplary illustrative portion or region of an image frame.

Figure 16:
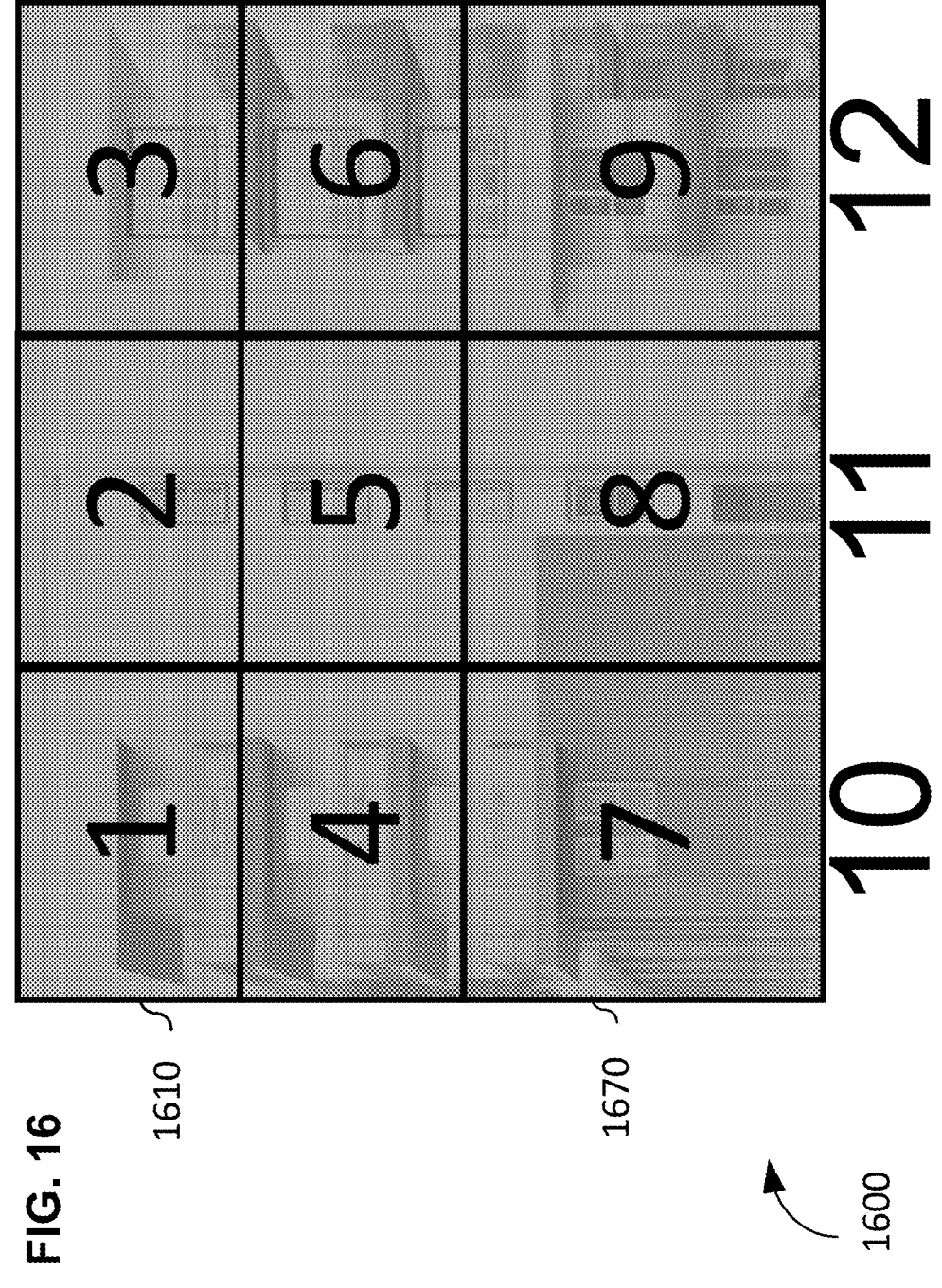

In FIG. 16, an example of a default composite image 1600 is illustrated. Nine of the twelve images were used to create the composite. In the example, in which all frames are of a quality defined by the application as "good", and thus there are no "problem" image frames, the default behavior of image construction system 2105 is that most of the composite utilizes frames 7 to 9. Frames 1 to 6 are used for the upper portions. For illustrative purposes, 1610 and 1670 indicate the sections of the composite which are composed of frames 1 and 7, correspondingly.

Images 10-12 are not necessary for the coverage of the panorama/composite image. In the example, this extra row of images is used as a redundancy to images 7-9. Note that image frames 10-12, for example, are referred to herein also as perimeter frames, edge frames and/or external frames—as disclosed further herein.

Figure 17:
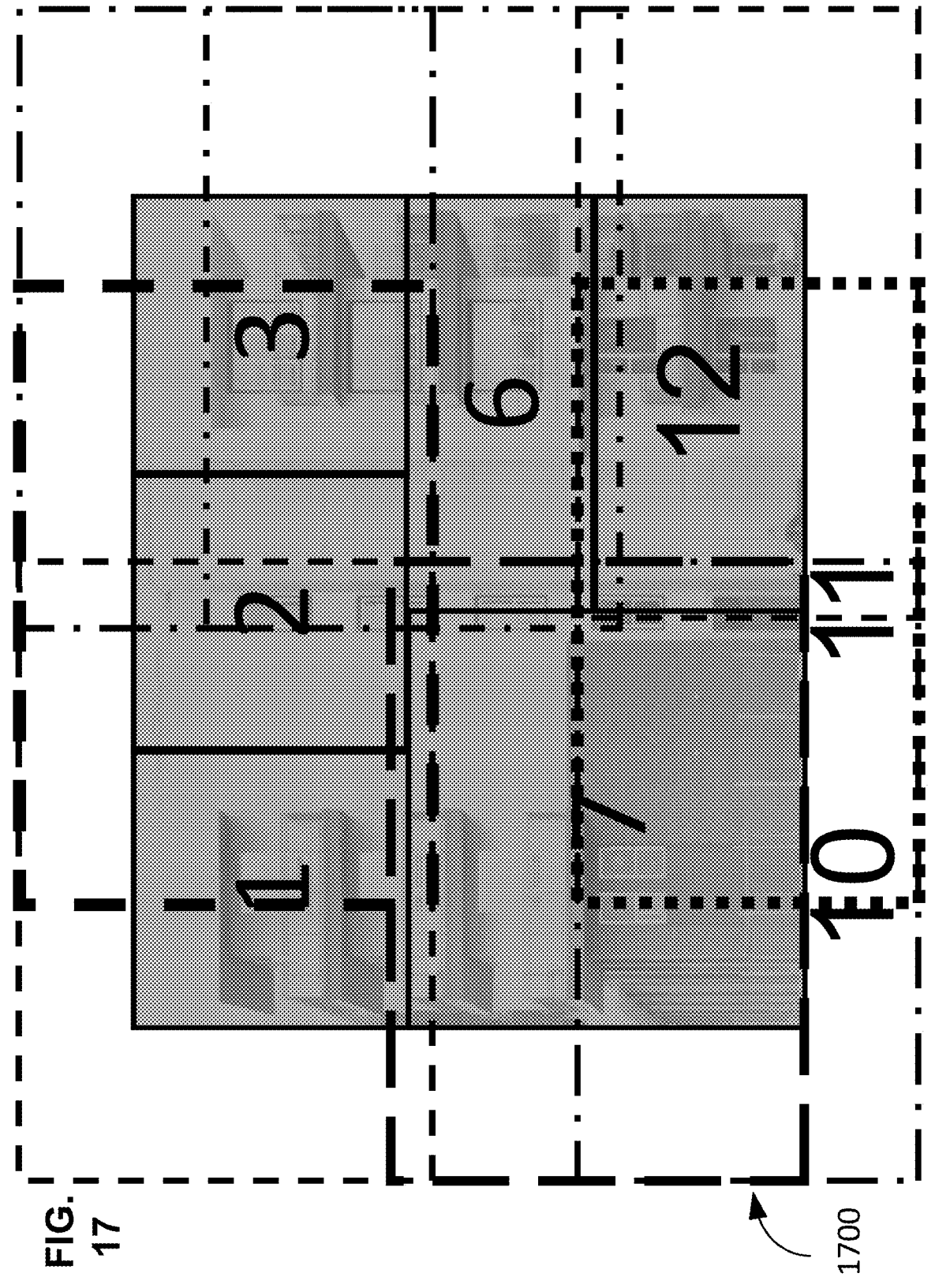

FIG. 17 illustrates the case 1700 where one or more entire image frames are of poor quality, and they should not be used to construct the composite image. Unlike in the prior art case of FIG. 13, the entire composite image, and not only part of it, can be constructed using remaining image frames. In the example, four image frames have been disqualified as being candidates for use in the composite: 4, 5, 8 and 9. Note that, not only are multiple images unsuitable for use, but that some of them are adjacent images, covering consecutive areas of the scene. Frames 4 and 5 are side by side, as are 8 and 9. Similarly, frames 5 and 8 are one above the other, vertically. Nevertheless, the solution allows construction of the entire composite image, of all portions of it. The compensation for the unusable frames is in this example complete.

The dashed/dotted lines show coverage of image frames. The solid lines indicate the part of each frame used to build the panorama/composite.

In this non-limiting example, all image portions 1510 that participate in generating the panorama are rectangular. In other examples, portions may have different shapes, and the "seams" between the portions taken from each frame can be diagonal, zigzagged, circular/rounded etc.

Figure 18:
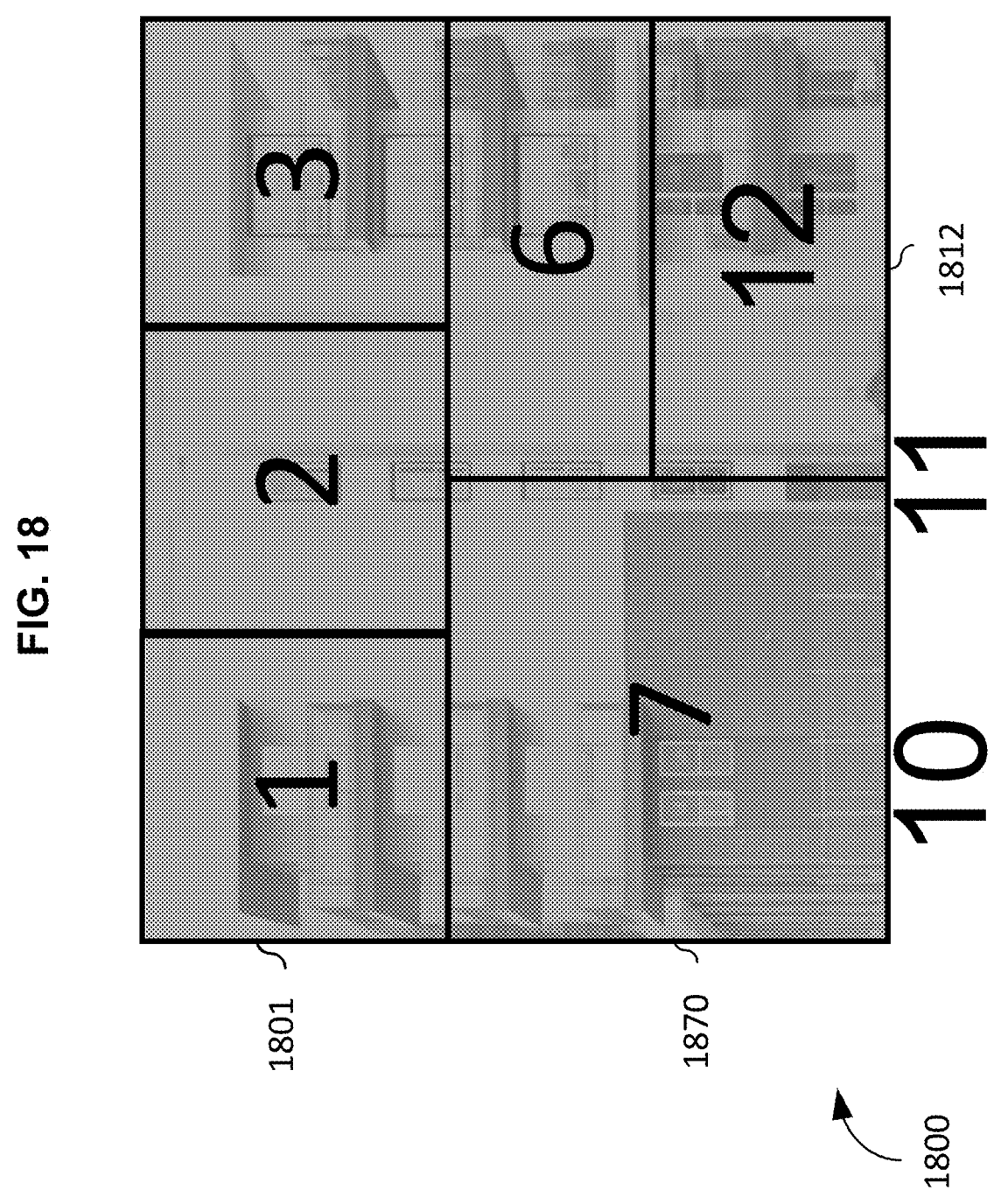

FIG. 18 illustrates the resulting composite image 1800, for the case 1500. The composite image is complete. Since there is no "gap" or missing image information, the composite is usable for e.g. high-resolution inspection purposes. The figure shows which image frames are used to represent each portion of the problem image frames, and thus each portion of the composite image. Note that comparatively large portions of images which are adjacent to poor-quality images are adopted and used, to facilitate the continuity of the resulting panorama. For example, original frame 7 provides image data for a large section 1870 of the composite, compensating e.g. for much of deleted frames 4, 5 and 8. Similarly, it is evident that the sections 1801, 1870 provided by image frames 1 and 7 are larger than the corresponding sections 1610, 1670 provided by those image frames in the "ideal" case in which all of the captured image frames are of a sufficiently high quality.

Note also that in FIG. 18, perimeter frame 12 provides a section 1812 of considerable size to the composite. Frame 12 covers much of the area which are ideally covered (per FIG. 16) by the unused frames 8 and 9. In comparison, in FIG. 16 frame 12 was not needed. Note that in the example of FIG. 18, frames 10 and 11 are still not needed.

As shown in FIGS. 15-18, in some examples the set 1500 of image frames comprises perimeter image frames and non-perimeter image frames. Considering e.g. FIG. 15, it is seen that frames such as 10, 11, 12, 9, 6, 3 etc. are referred to herein also as perimeter image frames, edge frames, or external frames, as they are on the edges (top, bottom, left, right) of the array of frames. Note that, in some cases, substantial portions of each such perimeter frame include parts of the scene that are "non-building", that is that are not part of the building façade, e.g. containing image representations of sky or ground, or perhaps of an adjoining building façade. In other cases, perimeter or edge frames fully contain façade portions. An example of such another case is where the building is very tall, and images of the bottom floors are captured from a close range. It such a case it may be decided to not capture images of the top floors, because the camera angle would be too steep.

Perimeter frames such as 1, 3, 10, 12 are also referred to herein as corner image frames, as they are in the (four) corners of the array.

Note that in some examples, outer areas of the building façade are captured only in the perimeter frames.

A frame such as Frame 5 is referred to herein as a non-perimeter image frame, a non-edge frame, or an internal frame, as it is not an edge frame of the array. Frame 5 is also a non-corner frame. Note that e.g. frame 6 is a non-corner frame, although it is a perimeter frame. In some examples, e.g. a 3×3 matrix, there is only one non-perimeter frame, the center one. Thus, in some examples, the 2-D set of image frames comprises perimeter image frames and at least one non-perimeter image frame.

Note that the perimeter image frames lack an adjacent image frame in at least one direction. For example, there is no frame to the right of Frame 6, nor is there a frame above frame 2. Similarly, a corner frame will lack an adjacent image frame in at least two directions. For example, there is no adjacent image frame to the left of Frame 1, nor above it. A non-perimeter image frame, such as Frame 5, has at least one adjacent image frame in each corresponding direction—to its left and right, and above and below it, i.e. Frames 4, 6, 2 and 8 respectively.

The use of a camera system 120 with overlap of more than 50% can thus, in some examples, facilitate capture of each point in a non-perimeter image frame (e.g. Frame 5) also in at least one adjacent captured image frame along a direction corresponding to the image frame dimension—that is, in at least Frames 4 and 6 in the azimuth direction, and/or Frames 2 and 8 in the elevation direction. Note that, in some cases, if the overlap of over 50% is in both the azimuth and elevation directions, a majority (that is most, or more than half) of non-perimeter image frames (which are also non-corner frames) of the set, and corresponding adjacent image frames, have this overlap amount of more than 50% in both frame dimensions. In some examples, this situation is true for all non-perimeter image frames.

If an internal frame 5 has overlap of over 50% in one dimension, with both adjacent captured frames 4 and 6, each point in that frame 5 will have been captured in at least two frames (in that frame 5 and at least one adjacent frame 4 or 6). Certain points near the center of the particular frame will be captured in three frames (e.g. 4, 5, 6). Note also, that if the particular frame has overlap of over 50% in both dimensions, each point captured in the frame will have been captured in more than two frames (e.g. also in frame 2). The choice of overlap of more than 50% thus enables redundancy of image frames.

Thus FIGS. 15-18 illustrate visually one example of a computerized method of image construction, comprising:

a. receiving a two-dimensional set of still image frames of a scene, e.g. a surface of body such as a façade. At least some image frames have an amount or degree of overlap in a first image frame dimension (e.g. image frame width and/or image frame height). This area of overlap is referred to herein also as an overlap area.

In some examples, image frames of the 2-D set of still image frames also have a second overlap amount of second image frame dimension. In some cases, this second overlap amount is more than 50% of the second image frame dimension. In some examples, the second overlap amount is not 100%. (A 100% overlap would in at least some cases yield e.g. a one-dimensional array of frames, rather than a two-dimensional array.) The set of image frames were captured by a camera without the camera moving in translation during the capture—e.g. as disclosed with reference to image capture system 120.

The set of image frames were captured by a camera without the camera being in angular motion during the capture, that is only when the gimbal motor(s) have stopped—e.g. as disclosed with reference to image capture system 120. This is performed at least to prevent motion blur.

Note that this is distinguished from e.g. a video panorama captured by a video camera, which by definition has captures performed while the camera is in angular motion. In some examples, this step includes identifying at least one image frame overlap area, with at least one corresponding other image frame of the set (e.g. an area overlap of frames 4 and 7).

In some examples, this received 2-D set of still image frames comprises an image array, e.g. as disclosed with reference to FIGS. 6, 19 and 20.

b. identifying corresponding tie points in pairs of image frames having overlap, of the 2-D set of image frames, wherein the corresponding tie points are located in the overlap area. In some examples, the tie points are identified in at least one overlap area of the identified image frame overlap area(s). More on identification of tie points is disclosed further herein, with reference to FIGS. 22, 23, 25. This action gives rise to a set of tie points associated with the set of image frames.

c. stitching the image frames based at least on the set of tie points, thereby generating at least one composite image 1800.

In some examples, the 2-D set of still image frames contains at least nine frames. In some examples, the set of image frames contains at least 20, 30 or 50 frames. Note that the method is more efficient and effective in arrays of comparatively larger size.

Note that the received 2-D set can include also one or more images that have no overlap with other images of the set. However, without such an overlap, an optimized alignment cannot be performed. Alignment can be performed based on the initial alignment (see block 2515 of FIG. 25A), and this can give good results if there happens to be perfect alignment with other frames. However, if that initial alignment does not yield perfect alignment, the composite image can have "holes", that is regions 1333 that cannot be depicted.

The stitching disclosed herein can in at least some cases be performed only for those image frames which have overlap with at least one other image frames in the set.

In some examples, the stitching comprises including, in at least one portion 1510 of the composite image(s), a corresponding portion 1510 of a selected image frame, e.g. frame 7. This selected image frame image frame is selected from a plurality of image frames that include image representations of the portion(s), e.g. frames 4, 5, 7, 8, 10, 11. In some examples, the selected image frame is selected based on one or more quality criteria.

In some examples, for one or more portions 1510 of composite image(s), a plurality of candidate image frames (e.g. frames 4, 5, 7, 8, 10, 11) include a plurality of depictions of the same portion 1510. Each such candidate image frame has a corresponding depiction of the region/portion. The stitching includes at least the following steps:

selecting a corresponding depiction of the plurality of depictions, based on one or more quality criteria; and utilizing the selected corresponding depiction (e.g. that depicted in frame 7) to construct the portion(s) 1510.

In some examples, the stitching comprises aligning image frames of the set, based at least on a subset of the generated set of tie points.

More details of an example of this method are disclosed further herein with reference to FIG. 25. More details of an example image construction system are disclosed further herein with reference to FIG. 21. Additional example disclosure of alignment appears with reference to FIGS. 22-23 further herein.

In some examples, the plurality of image frames 4, 5, 7, 8, 10, 11 constitute candidate image frames associated with the particular portion 1510, i.e. which depict or have image representations of that portion. In some examples, the selecting of the selected image frame, based the quality criteria, comprises ranking the candidate image frames. Thus, for portion 1510, it can be that image frame 7 has a quality score of 95, and frame 10 a score of 80 of 70. In some examples, frames 4, 5, 8 have even lower scores. In the particular example of FIGS. 17-18, the entire frames 4, 5, 8 were of poor quality, such that they were not considered candidate images, and were not included in the ranking.

Thus, in this example, frame 7 is selected to compose the portion or region 1510 in the composite. That is, frame 7's depiction or image representation, of portion 1510, is chosen, from the plurality of depictions of that portion, to construct the composite image, that is to be included in the resulting composite image.

Portions or regions of the frames are referred to herein, in some examples, as elements of interest 1510. A portion or element of interest is in, some examples, one or more of an entire image frame (e.g. frame 4), a region 1510 within an image frame, and one or more individual pixels. The term element of interest 1510 can be indicative that the relevant region 1510 represents a specific feature on the façade, e.g. a door, a door knob, a window frame or window, a particular decorative element etc. In other examples, the element of interest 1510 is indicative of splitting each frame into equally sized, or unequally sized, sections or portions, e.g. into 2, 4, 5, 6, 8, 10 etc. portions.

In still other examples, the element of interest 1510 is determined in a method such as the following: considering FIG. 6, it is seen that certain areas in the to-be-composed image have different levels of shading, which are indicative of the number of adjacent or nonadjacent captured frames which include representations of that particular area. Thus, the frames can be split into portions 1510 which are represented by the same group or sub-set of captured frames— e.g. portion A is all of those areas which appear in all of frames 1, 2 and 5; portion B is all of those areas which appear in all of frames 1, 2, 5 and 6; portion C is all of those areas which appear in all of frames 2, 5, 6 and 7, portion D is all of those areas which appear in all of frames 3, 4 and 9 etc.

In still other examples, the element of interest 1510 is indicative of a shared feature, characteristic or aspect relating to image capture, e.g. a group of adjacent pixels with similar levels of focus/clarity/blurriness/color/shading, or a group of pixels for which the façade, in a particular frame, is blocked by e.g. a passing car.

The element/portion/region 1510 is shown in the figure as a rectangle. In other examples, one or more elements of interest 1510 can be of different shapes, e.g. triangles, circles, ovals or irregular shapes.

In some examples, the stitching comprises selecting image frames (e.g. frame 7) of the set to be utilized to compose regions (e.g. portion 1510) of the composite image, based on at least a quality criterion (e.g. based on respective quality scores) of these selected image frames.

In some examples, the selecting of the image frames comprises the following steps:

(i) identifying at least two image frames (e.g. frames 7 and 10, or 7, 10 and 11) having respective overlapping areas that include an image representation of element(s) 1510 of interest;

(ii) obtaining at least one quality score associated with image frames of these at least two identified image frames;

(iii) selecting, for the composition of the region(s) 1510, an image frame (e.g. frame 7), based on at least respective quality scores of the two or more image frames; and (iv) repeat the performance of the steps (i) to (iii) for a different at least two image frames. This can thereby facilitate a second representation, of at least one different element of interest in the composite image. For example, the at least two identified frames are frames 1 and 2, while the different at least two image frames are 1, 3 and 4.

In some examples this facilitates a high-quality representation of the element(s) 1510 of interest in the composite image. More on quality problems is disclosed further herein.

Note that the particular example of FIGS. 15-18 illustrates a situation, in which adjacent image frames of the 2-D set of still image frames have an overlap amount of more than 50% in one or more image frame dimensions. In such a case, for all regions/elements of interest 1510 of the composite image (s), image frames of the set are selected to be utilized to compose regions image, based on at least a quality criterion of the selected image frames. For each portion of the composite image, the corresponding portion of the selected image frame can be included in the relevant portion of the composite image. Thus, in some examples, for every point in the composite image, the best image frame can be selected for each portion in the composite. This is because the overlap is over 50% in one or more of the dimensions.

By contrast, where the overlap in all dimensions is less than 50%, e.g. as disclosed with reference to FIGS. 11-14, e.g. 30% overlap, there will be some points in the composite image, and thus some portions 1333, where the depiction or image representation can only be selected from one image frame (e.g. frame 3 of FIG. 12). In such a case, it is not possible to select, for composition in the relevant composite image 1200, 1400, the depiction of 1333 of a selected frame from a plurality of frames, since that portion 1333 is not represented in more than one image frame.

Note that in a case of more than 50% overlap, there is also the option of deleting entire frames, that is entire frames are removed from consideration for selection for depiction in the composite image 1700, 1800. In some examples, due to quality or other problems, these frames are not considered candidate frames for inclusion in the composite 1700, 1800. There is some quality issue associated with the entire image frame (e.g. frame 4), and thus the particular frame fails at least one frame-quality criterion, which is associated with an entire frame. This is the situation exemplified in FIGS. 15-18, in which poor-quality image frames 4, 5, 8, 9 are not considered as candidate frames, and do not appear at all in the resulting composite 1800.

Note also that, due the overlap of over 50% exemplified in FIGS. 15-18, even if all of images 4, 5 and 6 were of poor quality, it is still possible to stitch the composite 1700. Thus, the stitching is capable of ignoring a row of low-quality image frames. In other examples, not shown in the figure, the stitching is capable of ignoring a column of low-quality image frames. Note that in at least some examples (not shown in FIGS. 15-18), even if a 2×2 (two by two) block of frames are not usable, the remaining neighboring frames can be used to represent all of the regions of the composite image 1500. This can be accomplished, for example, if the overlaps are more than 66.67%.

Thus, in some such examples, the plurality of image frames 4, 5, 7, 8, 10, 11 initially constitute candidate image frames associated with portion(s)/elements 1510, while frames 4, 5 are not candidate image frames. The stitching process then comprises, responsive to determining that one or more second image frames 4, 5 of the set fails one or more frame-quality criteria:

(I) determining that the second image frame(s) 4, 5 constitutes low-quality image frame(s) 4, 5; and (II) setting the relevant candidate image frames 4, 5, 7, 8, 10, 11 to exclude the low-quality image frame(s) 4, 5. The resulting relevant candidate image frames are thus only 7, 8, 10, 11.

As disclosed above, in some examples, the process selects, for a particular portion 1510, the highest ranked image of the relevant candidate frames, e.g. the one with the highest quality score.

In some non-limiting examples, in such a case the portion or element 1510 of interest is an entire image frame, rather than e.g. a sub-frame or group of individual pixels.

In some examples, a low-quality image frame, e.g. frame 4, which fails a quality criterion, is not immediately deleted from consideration. It is marked as a candidate for deletion, its quality score is noted, and it will be used for composite construction only if no better-quality frame exists for every portion/element 1510 associated with the problem frame 4. That is, the plurality of image frames comprises candidate image frames associated with the portion(s) 1510, and the stitching comprises, responsive to determining that a second image frame(s) 4, of the 2-D set of image frames, fails one more frame-quality criterion, setting the low-quality image frame(s) to constitute a deletion-candidate image frame(s) 4. The deletion-candidate image frame(s) is excluded, from selection as the selected image frame, in those cases in which each such portion 1510, represented by the deletion-candidate image frame(s) 4, is represented also in at least one other better-quality image frame (e.g. frame 7, frame 1) of the set of image frames.

Note also, that in the example FIG. 15, first low-quality image frame 4 has an adjacent neighbor frame 5, which is determined to also be a second low-quality image frame. However, frame 4 has a more distant neighbor frame 6, referred to herein also as third frame 6, which is determined to be of sufficiently good quality for use in the composite 1800. In one example, frame 6 is adjacent to frame 5, but from the side opposite to that of frame 4. Frame 6 has some overlap with the right sections of image 4. Thus frame 6 can be used to compose these portions, and the first frame 4 and the third frame 6 are stitched, while frame 5 is ignored.

In some examples, the one or more quality criteria comprise one or more of: a focus criterion, an exposure criterion, or a blocked-view criterion.

An example of a focus criterion is whether a frame, or part of frame, is in or out of focus, or to what extent/level/degree the frame/sub-frame are in focus. Recall that in some cases the 2-D set of still image frames, received by the image construction system 2105 includes image frames captured utilizing an autofocus mechanism of the camera. In some such examples, as disclosed above, the image capture system 120 is configured to capture an image frame also in a case of non-convergence of the autofocus mechanism for that image frame. Since the set may in such case include unfocussed, or relatively poorly focused, image frames, possibly in a relatively high proportion of the captured frames, the ability to select frames for composition based on focus criteria is in some examples advantageous.

A non-limiting example of an exposure criterion is the exposure level of the frame, or of parts of it, and how light/dark the frame or the sections of the frame are.

A non-limiting example of a blocked-view criterion is whether the façade, in a particular frame, is partly or fully blocked by a static object such as a tree, or by a transient object such as a vehicle or person, which are passing by.

Note that it is possible that one frame has an issue or problem, e.g. a quality issue related to a focus problem, an exposure problem or a blocked view problem etc., while another frame having overlap with the first frame will not have this issue—e.g. a vehicle blocked the view while image n was captured, but was out of the way by the time that image n+1 was captured. Another example is that image n was captured with the autofocus not converging, while image n+1 was captured with the autofocus converging. Or the breeze blew and moved the camera 250 during capture of frame n, but the breeze stopped by the time of capture of frame n+1. In some examples, such an issue is referred to herein also as a temporal or transient issue or problem.

In some cases, there are at least three different types of out-of-focus condition-motion blur, lens blur, and focus on wrong object (e.g. the camera 250 focused on the tree in front of building 110, instead of on the building.) In some such cases, each will require a different method, e.g. known per se methods, to assign the relevant quality score. Thus, multiple methods of determining quality scores can be employed.

Although the example of FIGS. 15-18 discloses a case of deleting entire frames 4, 5, in a case of over-50% overlap in both image frame dimensions, the concept can be generalized. As disclosed above, in other examples there is no need to delete an entire low-quality frame 4, and to select other frames to depict the portions 1510 of the composite that appear in the deleted frame 4. Rather, for each portion or element of interest 1510, even if they are smaller than a full frame size, a selection can be made of the image frame to be used to compose the composite image.

For example, in frame n, it can be that the lower left is blocked by the tree, while the rest of the frame is captured without blockage and with good focus. For each sub-frame, or group of pixels, of frame n, a selection can be made of the frame to use for its depiction in the composite 1500, e.g. using the best-quality depiction of each such portion.

Another example is a façade with two planes in some point. A particular captured image n focuses on either of the two planes, but not on both, so the defocus of the particular image n may only be for e.g. a half or a third of that image.

Even good frames can have problem areas on them. Therefore, in some examples, the selection from a plurality of frames is performed only for "problematic" portions 1510, that is for elements of interest 1510 for which at least one of the depicting frames has problem such as an issue of low quality. In some examples, this enables a more finely tuned selection of frames to depict each portion of the composite, compared to a case where entire frames are omitted from consideration.

In other examples, such as lens blur and motion blur, the quality of an entire image can be impacted. In some such example, as disclosed above, an entire frame can be deleted from consideration, or can be given a rank of quality and be considered a candidate for deletion.

Note that assigning a quality score per frame per region 1510, rather than deleting entire frames, can have certain example advantages. For instance, in some cases this enables use of the best frame to depict each individual region. Also, if a threshold of focus or other quality parameter is too strict, then if too many frames are deleted, there may not remain frames to depict region 1510. If instead, a ranking or other quality score is assigned per region and frame, the best-quality frame n−1 is available for use in constructing the composite, even if it is not of optimal quality. There is always a frame usable for the construction.

Another non-limiting example of a quality criterion is distance from the frame n. In some examples, preference or priority may be given to adjacent or nearer neighbors, e.g. frames n−1, n+1, or in some cases n+2, over more distant neighbors such as frames n−3, n−4, n+3 etc. In other cases, the distance of a candidate frame, from the frame of reference (e.g. frame 7) under consideration for that portion 1510, can yield a score, which is factored into the ranking of each relevant frame n−1, n−3, n+2 etc. for that portion 1510.

As indicated above, in cases where overlap is less than 50%, particularly in both dimensions, selection of frames for at least some elements of interest 1510 can still be performed. However, there will be some "gap areas" in the façade, where only one frame depicts a particular region 1510, and there is only one candidate image frame from which to choose/select. That is, selection of the frame for depiction, from a plurality of relevant frames, can be performed, for those pixels or regions for which there is frame overlap.

In still other examples, the overlap is more than 50% in one direction, and less than 50% in another. Consider an example case in which frames overlap by >50% in the X direction, but by only 30% in the Y direction. Such a case will still allow replacement of poor-quality frames by their neighbors specifically in the X dimension.

Note that at least some advantages disclosed herein, e.g. the ability to select a frame, from a plurality of frames, to compose all points and all portions of the composite, and the ability to handle poor-focus portions cause by auto-focus problems, come at the expense of other aspects of the camera system 120 design and of the stitching process design. A requirement for overlap of more than 50% introduces at least some challenges, not present in prior art systems and methods. It, for instance, requires the capture of a larger number of images, spaced closer together, than is found in at least some prior art implementations. This entails a slower process to capture images of the entire façade, requiring more time, and possibly higher costs (e.g. for technician time, for use of the equipment etc.). Similarly, the image construction system 2105 must receive, store, and handle, a comparatively larger number of image frames, again entailing e.g. greater system complexity, more processing, Input/Output and/or storage resources, and thus possibly higher costs. This is exemplified by comparing FIG. 11, with less than 50% overlap, having a set of 6 image frames, to FIG. 15, with more than 50% overlap, having a set of 12 image frames.

Attention is now drawn to FIG. 19, schematically illustrating an example generalized schematic diagram of a diagonal array of images, in accordance with some embodiments of the presently disclosed subject matter. The view 1900 illustrates a set of captured images which form a diagonal array of images, also referred to herein as a diagonal matrix, or a diagonal grid, of images. This is a non-limiting of a set of images generated by using image capture system 120, 205, 305, 405, 505. The azimuth and elevation directions are indicated by 1910 and 1920, respectively.

The figure discloses three types of axes:
A. a pair 1970 of primary axes of the captured still image frame (e.g. frame 1942), that is the axes of the pixel array of camera 250.
B. Axes 1910, 1920 of the gimbals 230, 240 of image capture system 120.
C. Primary axes 1975 of the two-dimensional arrangement of the two-dimensional set of captured still image frames, which the image capture system 120 is configured/designed to capture. In the case of this figure, the configured arrangement is a 2-D diagonal array or grid of images. By contrast, in FIG. 6 the configured arrangement is a 2-D rectangular array/grid 605 of images.

The axes 1975 of the grid/array/arrangement are based on the nearest neighbors having the most overlap. A first primary axis of such grid axes 1975, in some examples, is that which connects the center of a first frame 1940 with the center of an adjacent frame having the most overlap with the first frame 1940. The second primary axis of such grid axes 1975 is that which connects the center of first frame 1940 with the center of another adjacent frame having the second most overlap with the first frame 1940, or in some cases having the same amount of overlap with first frame 1940 as does the neighbor along the first primary axis.

Thus, for example, frames 1940 and 1942 are adjacent along grid axes 1975. But frames 1940 and 1944 have less overlap with each other, and they thus are not adjacent along grid axes 1975.

In the rectangular array of FIG. 6, all three axes (frame, gimbals, arrangement of frames) coincide, or are parallel, and are indicated by the pair 610, 620 of axes.

However, at least one primary axis, of the axes 1975 of the arrangement of the set of captured frames, in some cases does not coincide with, and are not parallel with, the either primary axis of axes 1970 of the captured frames, as in the example of FIG. 19. This is in contrast to FIG. 6.

Note also, considering the axis pair 1975 of the grid itself, it is composed of two axes (an "X" and "Y" of the pair 1975 of axes), which are in some cases not perpendicular to each other, as in the example of FIG. 19. That is, in some cases angle 1977 is not equal to 90 degrees. This too is in contrast to FIG. 6.

Note that in the case of FIG. 19, the gimbal axes, i.e. the azimuth and elevation axes 1910, 1920, and the primary frame axes 1970, coincide, or are parallel with each other.

The illustrative example of the figure is of exactly 50% overlap, but that the concepts can be extended to cases of more than 50% overlap. Consider captured image frame 1940. Its neighbor just beneath it, in the same column, is frame 1946. They exactly touch, and they have no overlap. Similarly, its neighbor just to the right of it, in the same row, is frame 1944. They too exactly touch, and they have no overlap. Its diagonal neighbor immediately to the upper left is frame 1946. They have exactly 50% overlap in both the azimuth and elevation dimensions. They have exactly a 25% area overlap.

As will now be shown, in some examples such a diagonal array arrangement of captured images provides at least some frame redundancy, using a comparatively lower use of imaging resources. Consider three captured frames 1930, 1950, 1935, located along a diagonal. Frames 1930 and 1950 are diagonally adjacent to each other, that is along grid axes 1975. Frames 1950 and 1935 are also diagonally adjacent to each other. In the example of the figure, frame 1950 has been deleted from consideration, due e.g. to its low quality or some other problem. The composite image can still be created in its absence, utilizing its four diagonally adjacent neighbors. Continuity of the composite is maintained. In this case, where diagonally adjacent neighbors overlap by exactly 50% in each of two dimensions, there is single-frame redundancy.

Note that in the non-limiting example of the figure, frames 1930 and 1935 exactly touch at their corners. Note also that if the overlap was by more than 50% in each dimension, there are more than two frames are available to represent at least some points in the composite 1600.

However, this array having only 50% overlap cannot deal with a case of elimination/deletion of two diagonally adjacent neighboring frames. Consider the elimination form consideration of both of diagonally adjacent neighboring frames 1960 and 1965. Their neighbors can be utilized to construct the composite for much of the area covered by 1960 and 1965. However, there is a region/portion 1980, for which there will be a void when constructing/stitching the composite image 1600, similar to the void 1333 disclosed with reference to e.g. FIGS. 13, 14. Thus, the composite image will not have full continuity.

In terms of the number of images utilized to compose the composite image in the case of the figure, it can be less, compared to e.g. the rectangular array of FIG. 6, in which the axes of the captured frames (not shown in FIG. 6) coincide with the axes of the array/grid of images. In the rectangular array view 605, frames 680 and 650 are in the same row, and thus have 100% overlap in elevation, while having 55% overlap in the azimuth dimension or direction. Similarly, frames 680 and 670 are in the same row, and thus have 100% overlap in azimuth, while having 55% overlap in elevation. By comparison, in a version of diagonal array view 1900 which would similarly utilize 55% overlap, adjacent neighbors 1942 and 1940 would have only 55% in both dimensions, without any dimensions of 100% overlap between them. It is evident by inspection of the two figures that the diagonal array 1900 uses considerably fewer frames, e.g. half the number of frames, to construct the composite image, than does the rectangular array 605.

Note also, that diagonally adjacent frames 650 and 670 of FIG. 6 function like a diagonal array 1900. However, rectangular array 605 contains additional frames such as 680, which not required in diagonal array 1900, and thus in some examples is considered less efficient.

Use of either array type thus involves example advantages and disadvantages. The diagonal array images the building façade using fewer image frames than does the rectangular array, in some examples having a large spacing between image frame centers than in the rectangular array. This can provide a savings in e.g. imaging time, image storage, transmission bandwidth and complexity of processing/calculations, etc. However, this comes at a cost. As was shown, the diagonal array shown has single frame redundancy, handling the case of deletion of at least a single frame 1950, but it does not sufficiently handle the case of loss of two or more diagonally adjacent frames 1960, 1965. The rectangular array 605, with a denser arrangement of frames, provides more frame redundancy.

Another example disadvantage of a diagonal array 1900 is that at least some off-the-shelf imaging systems are configured to capture only rectangular arrays of images. Thus, in at least some cases the diagonal array exemplified herein requires additional design and programming effort.

Thus, such an implementation uses, in some examples, an image capture system, comprising:

a. a camera;

b. a camera mounting, configured to provide the camera with at least two angular degrees of freedom (DOF);

c. a mount base, configured to enable a base of the camera mounting to be stationary during performance of imaging; and d. a movement controller, comprising a first processing circuitry, the first processing circuitry operatively coupled to the camera mounting and configured to repeatedly instruct the camera mounting to move the camera from a current imaging position to a next imaging position, where the repeated instructions comprise a first instruction comprising movement in at least a first angular degree of freedom and a second instruction comprising movement in at least a second angular degree of freedom, where the repeated instructions to move are configured to move the camera to a set of camera orientations which enable a capture of a corresponding two-dimensional set of still image frames of a surface of a body, where primary axes 1975 of an arrangement of the set of still image frames are not parallel to either of two primary axes 1970 of the still image frames.

An arrangement of the set of frames is exemplified by a grid or and array.

Such a system, as well as the method performed by it and a software product that is configured to run the method on a computer, is exemplified by FIG. 19, as well as by FIG. 20, disclosed further herein.

In some examples, adjacent neighbor frames, which are adjacent along the axes 1975 of the arrangement of the set, overlap more than 50% along each frame dimension, that is along the image frame width and the image frame height, that is along the pair of axes 1970. That is, they overlap more than 50% along a first frame axis, and they overlap more than 50% along a second frame axis. In some examples, this facilitates capture of each point in the at least one non-perimeter image frame also in at least one adjacent captured still image frame.

Such a system, as well as the method performed by it and a software product that is configured to run the method on a computer, is exemplified by FIG. 19, as well as by FIG. 20, disclosed further herein.

In the example of e.g. FIG. 19, the primary axes 1975 of the arrangement of the set of are not parallel to either of two primary axes 1910, 1920 associated with camera mounting 215. Similarly, in this example the two primary axes 1975 of the arrangement of the set are not parallel with each other. If they are not parallel, of course at least one such axis will not be parallel to the camera mounting axes, and thus to the frame axes.

Attention is now drawn to FIG. 20, schematically illustrating an example generalized schematic diagram of an array of images, in accordance with some embodiments of the presently disclosed subject matter. The view 2000 illustrates a two-dimensional set of captured still images, captured as a rectangular array/grid or arrangement. This is a non-limiting of a set of images generated by using image capture system 120, 205, 305, 405, 505. The azimuth and elevation directions, that is the primary gimbal axes, are indicated by 2010 and 2020, respectively. The primary axes of the rectangular arrangement are indicated by 2070. Note that in the example of this figure, the primary gimbal axes 2010, 2020 and the primary array axes 2070 coincide with, or are parallel to, each other.

The imaging system 120, in the example of the figure, is configured such that the repeated instruction to the camera mounting comprises instructions to move the optical axis (i.e. the frame axes 2090, 2095) of the camera to a rectangular array of imaging positions. However, the system is configured so that the camera 250 is mechanically rotated in roll, e.g. with roll angle 545 of FIG. 5. In another example, the camera 250 is installed within system 120, such that it has this rotation.

Thus, the primary axes 2070 of the arrangement or grid of frames are not parallel to either of the primary axes 2090, 2095 of the captured frames. The axes 2090, 2095 of the camera 250 has a rotation, e.g. in a roll direction, relative to the axes of the rectangular array.

Note that in this case, since the primary grid axes 2070, and the primary gimbal axes 2010, 2020, coincide with, or are parallel to, each other, the primary axes 2090, 2095 of the capture image frames are not parallel also to the primary gimbal axes 2010, 2020.

In the example of the figure, still image frames 2030 and 2050 are adjacent neighbors along a primary axis of array axes 2070, and image frames 2030 and 2040 are adjacent neighbors along a second primary axis of array axes 2070. In some examples, the aspect ratio of a frame is 2:3, and the configured roll rotation is 33 degrees.

The array 2000 is thus a rectangular array of captured still images, where the images are arranged in a sort of diagonal array relative to each other and the rotated axes 2090, 2095. In such an array, in the example of 2:3 aspect ratio and 33-degree rotation, two images 2030, 2050, which are captured adjacent in the azimuth direction, have an area overlap of approximately 25%. Similarly, two images 2030, 2040, which are captured adjacent to each other in the elevation direction, have an area overlap of approximately 40%. In the non-limiting example of the figure, the capture overlap, in both the elevation and azimuth directions, is exactly 50%.

Note that in the example of the figure, the elevation overlap of frames 2030 and 2040 is less than 50%, and the azimuth overlap of frames 2030 and 2050 is less than 50%-along the axes 2010 and 2020.

This example configuration provides single frame redundancy, as does the diagonal array 1900. If e.g. frame 2080 is deleted from use in constructing the composite image 1600, the remaining frames can be utilized to complete the composite with no voids. However, if two adjacent images 2060, 2065, e.g. in the elevation or azimuth directions, are deleted from use, there may be a void 2070, a region or portion 2070 of the composite which cannot be constructed.

Note also that the density of captured still frames in array 2000 is lower than in the rectangular array 605, but higher than that of diagonal array 1900. Therefore, in some cases the degree of utilization of image capturing and processing resources is between that of the other two arrays.

To distinguish it from arrays 605 and 1900, in some examples array 2000 is referred to herein also as a frame-rotated rectangular array 2000.

The configuration which yields array 2000 thus in some examples provides at least some of the advantages, and disadvantages, of e.g. diagonal array 1900, while not possibly requiring special programming and design.

As in the example of FIG. 19, also in the example of FIG. 20 adjacent neighbor frames, which are adjacent along the axes 2070 of the arrangement of the set, overlap more than 50% along each frame dimension, that is along the image frame width and the image frame height, that is along the pair of axes 2095, 2090.

The 40% overlap area illustrated in FIG. 20 represents a case where there is dimensional overlap of considerably more than 50% along one of the frame axes. In some examples, the required overlap in each dimension/axis of the array axes 2070 is a function of the roll angle and of the aspect ratio.

In the example of e.g. FIG. 20, the primary axes 2090, 2095 of the frame 2050 are not parallel to either of two primary axes 2010, 2020 associated with camera mounting 215.

The depictions 1900 and 2000 share many similar features. In both, frames axes and arrangement/array axes do not coincide, and they are not parallel. A difference between the two figures, is that in FIG. 19 the arrangement axes 1975 differ from (are not parallel to) the gimbal axes 1910, 1920, while the gimbal axes are parallel to the frame axes 1970 (i.e. no rotation of the camera). By contrast, in FIG. 20 the frame axes 2090, 2095 are not parallel (due to the camera 250 rotation) to the gimbal axes 2010, 2020, while the gimbal axes are parallel to the arrangement/array axes 2070.

One way of considering this is that in FIG. 19 the "arrangement/array" is rotated, and that the arrangement axes are not necessarily perpendicular to each other, while in FIG. 20 the frame axis/camera axis is rotated.

Note that other possible options exist to achieve a configuration of the set of frames, in which the frames axes and the arrangement/array/grid axes do not coincide, and in which they are not parallel.

Attention is now drawn to FIG. 21, schematically illustrating an example generalized schematic diagram 2100 comprising a computerized image construction system 2105, in accordance with some embodiments of the presently disclosed subject matter. In some non-limiting examples, computerized image construction system is referred to herein also as computerized image stitching system 2105. In some non-limiting examples, computerized system 2105 includes a computer. It may, by way of non-limiting example, comprise a processing circuitry 2110. This processing circuitry may comprise a processor 2130 and a memory 2120.

This processing circuitry 2110 may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, this processing circuitry 2110 may be a computer(s) specially constructed for the desired purposes.

In some examples, computerized image construction system 2105 comprises an input interface 2180, enabling communications with other devices/systems, and or providing a user interface to a human user. An example, it can interface to image capture system 120, to receive from it the 2-D set of image frames 1-12 in FIG. 15, which will be used to stitch the composite image 1600, 1800. In some examples, the set of images resides in an external storage, e.g. cloud storage (not shown).

In some examples, computerized image construction system 2105 comprises an output interface 2185, enabling communications with other devices/systems, and or providing a user interface to a human user. An example, it can interface to a display 2190, e.g. to display the resulting composite image 1600, 1800.

Turning now to processor 2110 of processing circuitry 2105, in some examples it comprises images input module 2135. In some examples, module 2135 is configured to receive input sets of image frames, e.g. from input interface 2180.

In some examples, processor 2110 comprises overlap areas determination module 2145. In some examples, module 2145 is configured to identify areas of overlap of various image frames, to determine the amount or degree of overlap for each overlap area, and to determine which portions/elements of interest 1510 have no overlap of two or more frames.

In some examples, processor 2110 comprises frame selection module 2150. In some examples, this module is referred to herein also as frame ranking module 2150, and/or frame deletion module 2150. In some examples, module 2150 is configured to select frames, for each element of interest 1510, to be used in the construction of the composite image 1800. In some examples, this module ranks frames for each portion 1510, and selects e.g. the best ranked frame per portion to be used to compose the composite image. In some examples, this module is configured to delete bad/problem/low quality frames from consideration as candidate frames, and/or to mark such problem frames as candidates for deletion. Various example implementations of frame selection are disclosed further herein. In some examples, module 2150 is part of the stitching module 2155. Note also, that in some implementations, one module performs ranking, and a separate module performs selection based on rankings.

In some examples, processor 2110 comprises frames alignment module 2140. In some examples, module 2140 is referred to also as tie points module 2140. In some examples, module 2140 is configured to find tie points in overlap areas. In some examples, the module is further configured to perform alignment of image frames. In some examples, this alignment includes determining an initial arrangement of the image frames, and optimization in which correction parameters are computed, and a correction in the alignment of the image frames. The relative location, orientation and projection of the image frames, on the plane of the composite image, is optimized. Additional examples of alignment functions are disclosed with reference to FIGS. 22-23 and 25A-25B. In some examples, module 2140 performs some of the functions of module 2170 below, or it utilizes module 2170.

In some examples, processor 2110 comprises transformation/projection module 2170. In some examples, module 2170 is configured to identify projection planes, and to project (perform homographic transformations) of individual captured image frames, and/or the composite multi-frame image 1600, 1800, to another plane(s), the projection plane. Additional examples of projection and transformation are disclosed with reference to FIGS. 24 and 25A-25B. In some examples, this module 2170 can be comprised in stitching module 2155, in implementations where the projection process is part of the more general stitching process.

In some examples, processor 2110 comprises stitching module 2155. In some examples, module 2155 is configured to stitch various image frames, to construct the composite image(s) 1600, 1800. In some examples, the module takes the selected frames depicting the various elements of interest/portions/regions 1510, and it assembles them into the composite image. Note that in some examples, not shown in the figure, this module 2155 can comprise the frames alignment module 2140, as the alignment process is part of the more general stitching process. In some examples, this includes smoothing/fading/performing transitions between depictions of various portions 1510.

In some examples, processor 2110 comprises display/output module 2175. In some examples, module 2175 is configured to display or otherwise output the resulting composite image(s) 1600, 1800, and/or partial results of the image processing, to external systems and/or human users. In some examples, module 2175 interfaces to the output interface 2185, for example to send the composite image to display 2190.

In some examples, memory 2120 of processing circuitry 2110 is configured to store data associated with the image construction process. Non-limiting examples of data stored include: received image frames, overlap areas and overlap amounts, elements of interests/portions/regions 1510, identified tie points, quality criteria, quality scores and rankings, candidate frames, deletion-candidate frames, aligned image frames, projected or transformed images, and composite image frames.

FIGS. 2-5 and 21 illustrate only general schematics of the system architecture, describing, by way of non-limiting example, certain aspects of the presently disclosed subject matter in an informative manner, merely for clarity of explanation. It will be understood that the teachings of the presently disclosed subject matter are not bound by what is described with reference to FIGS. 2-5 and 21.

Only certain components are shown, as needed, to exemplify the presently disclosed subject matter. Other components and sub-components, not shown, may exist. Systems such as those described with respect to the non-limiting examples of FIGS. 2-5 and 21 may be capable of performing all, some, or part of the methods disclosed herein.

Each system component and module in FIGS. 2-5 and 21 can be made up of any combination of software, hardware and/or firmware, as relevant, executed on a suitable device or devices, which perform the functions as defined and explained herein. The hardware can be digital and/or analog. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIGS. 2-5 and 21. To provide one non-limiting example of this, in some examples frames alignment module 2140 can be replaced with two separate modules—one for identifying tie points and one for performing alignment. In another example, there are three separate modules—for identifying tie points, for performing an initial alignment, and for correcting the alignment. Similarly, in some examples, frame selection/deletion module 2150 is comprised within stitching module 2155.

One or more of these components and modules can be centralized in one location, or dispersed and distributed over more than one location, as is relevant. In some examples, certain components utilize a cloud implementation, e.g. implemented in a private or public cloud.

Each component in FIGS. 2-5 and 21 may represent a plurality of the particular component, possibly in a distributed architecture, which are adapted to independently and/or cooperatively operate to process various data and electrical inputs, and for enabling operations related to a computerized hearing test. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

Communication between the various components of the systems of FIGS. 2-5 and 21, in cases where they are not located entirely in one location or in one physical component, can be realized by any signaling system or communication components, modules, protocols, software languages and drive signals, and can be wired and/or wireless, as appropriate. The same applies to interfaces such as modules 2180, 2185.

Figure 22:
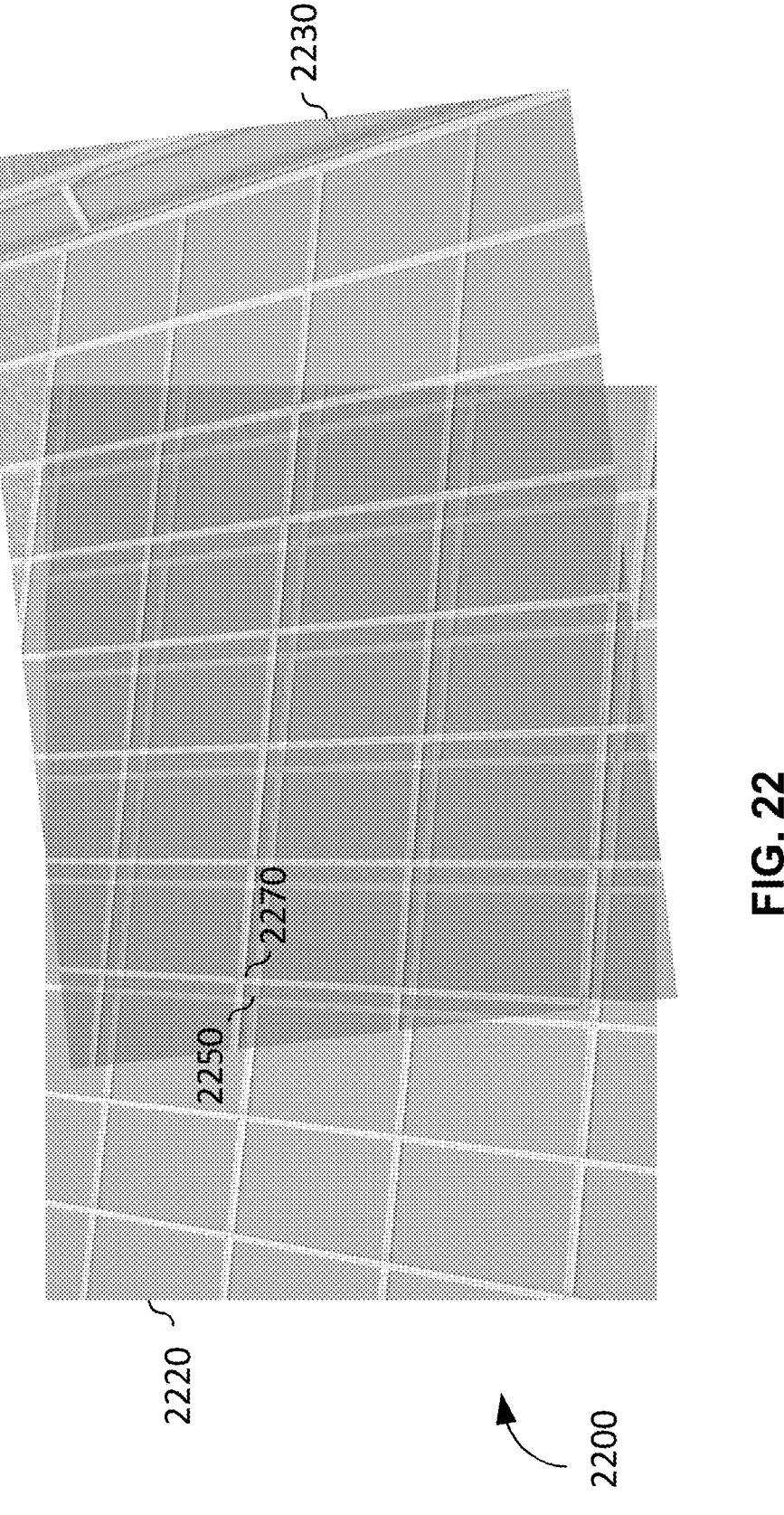
FIG. 22 schematically illustrates a generalized view of image frame alignment, in accordance with some embodiments of the presently disclosed subject matter.
Figure 23:
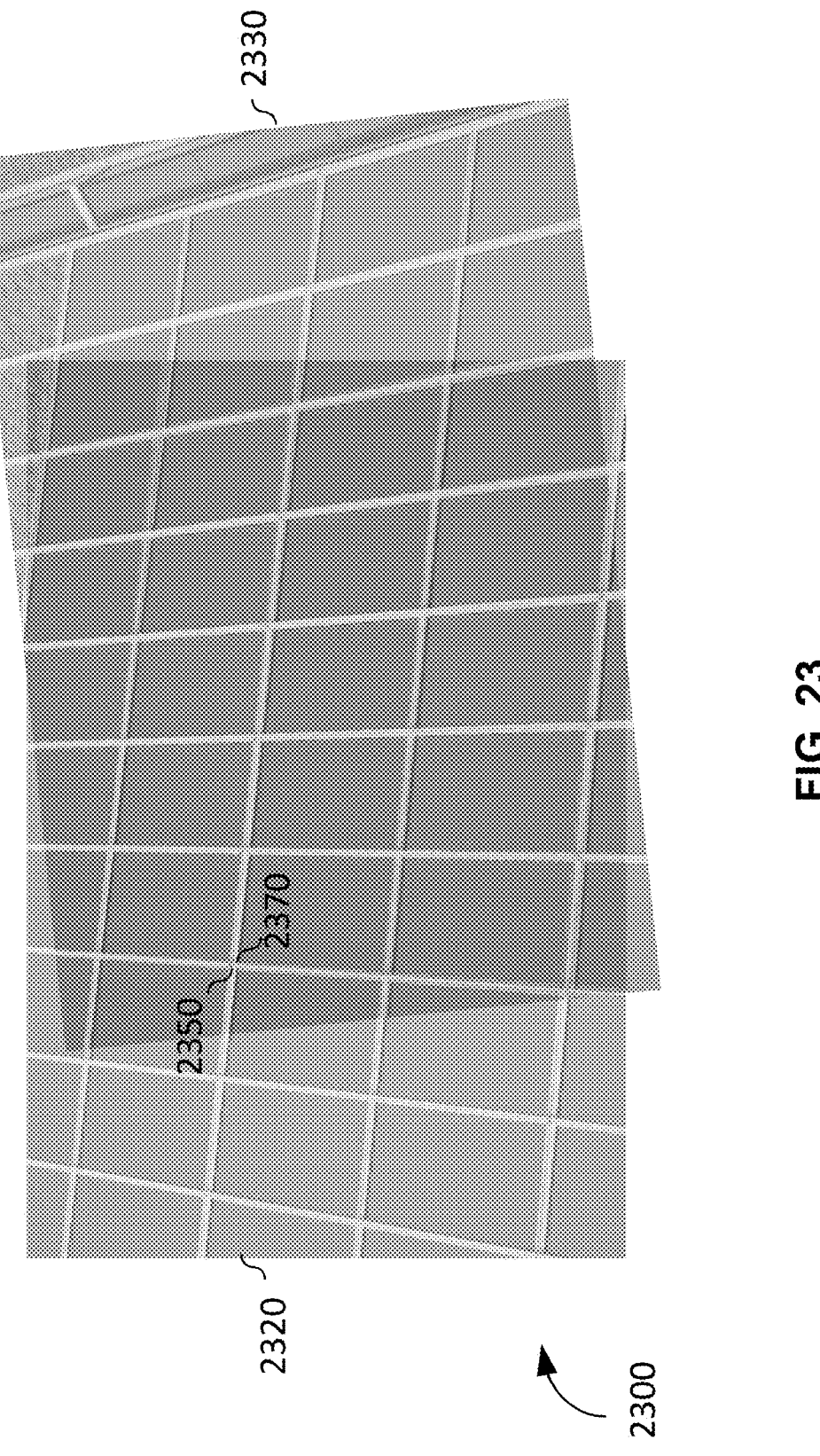
FIG. 23 schematically illustrates a generalized view of image frame alignment, in accordance with some embodiments of the presently disclosed subject matter.

Attention is now drawn to FIG. 22, schematically illustrating an example generalized view 2200 of image frame alignment, in accordance with some embodiments of the presently disclosed subject matter. FIGS. 22 and 23 give a non-limiting example illustration of technical advantages of identifying tie points when aligning image frames.

The view 2200 shows two individual frames in the large panorama—Image 1 2220 and adjacent Image 2 2230. This example panorama is created by simply positioning the images according to the intended grid positions—based on the intended/programmed camera angle differences between the two images, and the particular gimbal configuration (pan-tilt, tilt-pan etc.). Thus, for example, assuming that the camera rotated A radians between the two captures, the center of the two frames are located at a linear distance, between each other, that corresponds to A radians. In a case where there are no distortions or errors, all pixels on the camera sensor, and the two pictures would line up. That is, for example, the two points 2250, 2270 on the two frames, which correspond to the same window corner, would be the same point, and the various horizontal and vertical window edges would perfectly align.

However, there are inaccuracies in various imaging parameters—e.g. angular aiming accuracy of the gimbals, imperfect knowledge of iFOV or camera FOV, distortions of focus, tolerances on focal length (e.g. due to temperature changes). As will be disclosed further herein, in some implementations, internal parameters such as the iFOV, FOV or focal length, and external parameters such as the gimbal angles associated with each frame, are inputs to the alignment process. In some cases, these parameter values are different for some or all image frames of the set. Therefore, the "naïve" initial first guess at the placement of the two images results in misalignment. The resulting composite/panorama is thus visually problematic, as is evident from the figure.

Example reasons for inaccurate estimates of the iFOV and camera FOV include zoom errors and manufacturing tolerances of the camera or of the camera mount.

Attention is now drawn to FIG. 23, schematically illustrating an example generalized view 2300 of image frame alignment, in accordance with some embodiments of the presently disclosed subject matter. The view 2300 shows the same two frames, depicted here as 2320, 2330. In this example view, a Stitched Panorama Imagery (SPI) algorithm, which corrects the aiming tolerances etc., has been applied, and tie points have been utilized. A tie point is a feature in the scene, in the depiction of façade or other surface, that is common to the two images. Examples are disclosed further herein.

In some examples, the stitching algorithm does a best fit of all of the tie points, or as many as possible, and it calculates the required corrections to obtain this best fit. The algorithm optimizes the location of all images, or of as many as possible, with respect to each other, based on the relative location of overlapping images for which tie points were found. Information on the relative position of a pair of tie points in two frames can be used to calculate and deduce the actual relative angle of two images, and the FOV/iFOV. If there are many tie points, the system can learn about the distortion of the lens. The corrections in FOV and distortion, for example, can be utilized to correct the alignment of the frames relative to each other. In some examples, pixels can be "moved" in their position assignment, so as to aim at the correct point on façade. That is, the pixel can e.g. be associated with a different azimuth—elevation angle than was originally assigned to it. In some examples, interpolation between pixels is performed. Similarly, the calculated gimbal errors, associated with individual images, can be used to more correctly position the images one to the other.

In some examples, the larger the overlap, the better the ability to accurately compute the correction parameters of lens distortions. Note that good distortion corrections make straight lines appear straight, which is something important in façades, such as curtain walls, where typically there are many straight lines.

In view 2300, the correction of the residual alignment error, that was generated by the tie point pairs, has been accounted for, and a more accurate stitch of the two images can be generated. The stitching is smooth. The two points 2350, 2370 in the two images, associated with the two frames, are now the same point, within a small defined tolerance. The various horizontal and vertical window edges are well-aligned.

More details on example alignment processes are disclosed further herein with reference to the flow chart of FIGS. 25A-25B.

Non-limiting, illustrative, examples of tie points in a building façade include: an area of dirt on the façade, a scratch on the façade, a discoloration of the façade, a texture of a portion of the façade (e.g. in a stone face or wood façade), a corner of one or more windows on the façade, and a reflection in glass on the façade. These are visible at resolutions of e.g. 1 mm. In some examples, reflections are more likely to appear in images captured by a camera with two degrees of freedom, as opposed to a prior art camera having six DOF. This is an additional example technical advantage of 2-DOF image capture system 120, captured from a single x-y-z position, since these reflections provide additional tie points to be utilized for alignment.

In some examples, at least two tie points should be identified for pairs of overlapping frames, in order to be able to calculate the relative angular positions and alignment of the images. In at least some examples, if only one tie point is identified, a rough relative position of the two frames can be determined, but the orientation of the two frames cannot be determined. Note also, that if multiple frames overlap e.g. in region 1510, a particular identified tie point might appear in more than two frames.

One example method for identifying corresponding tie points in frames uses the Scale-Invariant Feature Transform (SIFT) algorithm.

In some examples, the more tie points that are identified, the more data there will be available for the optimization processes/algorithms, and thus the more accurate of an alignment of the set of frames can be performed.

In particular for difficult facades, such as curtain walls, constructed of smooth surfaces such as glass, with comparatively, little texture (as contrasted with e.g. stone or brick face), there are relatively few tie points available. Therefore, it is in some cases desirable to find as many tie points between pairs of frames 2220, 2230 as possible. This thus yields another example advantage of image capture system 120. System 120 captures frames with a relatively large overlap, of over 50%. The more overlap between two adjacent frames, the more potential tie points can be found. In addition, if there are very few tie points, e.g. due to a curtain wall surface, the greater overlap increases the probability that at least two tie points can be found for e.g. frames 2220 and 2230.

In addition, because of the overlap amount of over 50%, a particular image frame (e.g. frame 4 of FIG. 15) in some cases overlaps not only with adjacent frames (e.g. frames 5, 2, 8) (possibly in all directions), but also with non-adjacent neighboring frames (E.g. frame 6). This facilitates finding tie points also between non-adjacent frames which have overlap (e.g. tie points of frames 4 and 6—frames which may have e.g. a 10% overlap). This provides another example technical advantage. The optimization of the alignment can be based on tie points linking a larger number of pairs of frames. This can provide a better alignment, e.g. in cases of accumulated errors. For example, if the alignment error between two adjacent frames corresponds to e.g. the size of one pixel, then over 100 images in a row there may be 100 pixels' worth of error, a more significant amount of error. The resulting composite image 1600 in some such cases will show bowing. When measuring distances between relatively distant points on the composite, the measured distances will not be error. If the optimization algorithm considers tie points of both adjacent and non-adjacent frames, it can create a more correct alignment, which can reduce the accumulation of error and can compensate for some of these inaccuracies.

As indicated above, in order to tie two frames together, tie points are looked for, and identified, in areas where the two frames overlap, since the same feature (scratch etc.) is expected to appear in two different frames where they overlap. This is in some cases a best practice, as compared to searching for tie points far from overlap areas, as this practice can improve the probability of converging, and can require less computational effort. However, in some examples, the term "image frame overlap area" in the presently disclosed subject matter includes also areas on the margins, or in the vicinity, of the overlap area, that are located somewhat outside of the determined overlap area, that is to search also areas that are only "substantially" in the overlap area.

Thus, in some examples, identifying the corresponding tie points in the overlap area comprises also a case where one or more of the corresponding tie points are located less than 10% of an image frame dimension outside of the determined overlap area. Thus, in some examples, identifying the corresponding tie points in the overlap area comprises also a case where one or more of the corresponding tie points are located less than 5% of an image frame dimension outside of the determined overlap area. In some examples, identifying the corresponding tie points in the overlap area comprises also a case where one or more of the corresponding tie points are located less than 1% of an image frame dimension outside of the determined overlap area. Thus, the overlap area, for purposes of finding tie points, in some cases includes a region that is e.g. 1% or 5% larger than the calculated frame overlap area, in one or more directions.

This expansion of the search area for tie points, to be searched not only in the initially calculated overlap area, can have some example advantages. Recall that the image overlap area of each two frames is in some examples determined based on an estimate of the frame alignment, which is only an initial estimate. Such an initial estimate is based on e.g. the nominal camera angles for each capture, and on parameters such as iFOV and focus length. However, in some cases, it can be that this overlap estimate is inaccurate, and will be corrected during the optimization of alignment. In such a case, a shared feature in two frames will in fact appear outside of the initially identified overlap area. Therefore, in some cases it makes sense to look for tie points also in surrounding regions of the frames, which are not located in the "nominal" determined overlap area, e.g. 1%, 5% or 10% of a frame dimension outside of the initially determined overlap area.

Figure 24:
FIG. 24 schematically illustrates a generalized view projection, in accordance with some embodiments of the presently disclosed subject matter.

Attention is now drawn to FIG. 24, schematically illustrating an example generalized view 2400 of projection, in accordance with some embodiments of the presently disclosed subject matter. The view 2400 shows the example of image frame 2410 projected onto the plane 2450 of the façade 115.

The figure shows the example of image capture system 120 utilizing a pan over tilt configuration. Typically, in the case of capture of a two-dimensional image frame, using an equal angular spacing between images, the area covered 2410 by the resulting panorama is not a rectangle. Rather, it can have a pointed shape 2425 at the far end, typically with a curved shape 2420 at the top. In order to obtain e.g. a rectangular shape, a transformation of the image is performed.

Therefore, in some examples the stitching method performed by image construction system 2105, includes the following optional steps:

(A) identify a projection plane 2450; and (B) perform a projection or transformation, of the composite image 1600, 1800, onto the identified projection plane 2450.

A projected composite image is thus generated or obtained.

As will be shown in the flow chart FIGS. 25, in some other examples the projection/transformation can be performed on individual image frames of the set, before the stitching of a composite/panorama 1800 is performed.

In some non-limiting examples, the chosen projection plane is a rectilinear or planar plane 2450, e.g. for a flat façade, as illustrated in FIG. 24. In some non-limiting examples, the chosen projection plane is associated with the façade, e.g. the plane 2450 of the façade 115 itself. In some examples, the chosen projection plane is that of the first captured image, or of the center image.

In some other examples, the projection is onto e.g. a spherical or cylindrical plane. However, this is rarely relevant to buildings, which are usually planar. Also, if the buildings are cylindrical—this is typically not around the point of capture. One non-limiting example of the use of a cylindrical projection is imaging a surface of a curved dam, from the focal point of its curve.

Non-limiting example known per se methods of projection include the following:

[a] Identify in the image frames at least two lines that are horizontal in the desired plane, and two lines that are vertical in the desired plane. For example, the system is instructed that after projection, two particular points (e.g. in the first frame, such as the bottom left, or in a center frame of the composite) will be in a straight horizontal line, and that two points will be in a straight vertical line. This information can be utilized, e.g. by known per se methods, to transform the image(s).

[b] Find at least three pairs of points. Each pair identifies an element, both in the stitched image and in another image (or drawing) that is in the desired plane. In some examples, the other image is an elevation map of the building.

These methods can be performed on the frames of the set of captured image frames, and/or on the composite image 1800.

Attention is drawn to FIG. 25A, schematically illustrating a generalized flow chart diagram, of a flow of a process or method, for image construction, in accordance with some embodiments of the presently disclosed subject matter. This stitching or construction process is, in some examples, carried out by systems such as those disclosed with reference to FIGS. 21 and 2. The flow starts at 2505.

According to some examples, a 2-D set of still image frames of scene are received (block 2505). For example, the scene is of a surface of a body, e.g. a façade 115 of building 110. Recall that the set of images was captured by a camera 250, without the camera moving in translation during the capture. In some examples, the set is received from image capture system 120. In some examples, the set is received by images input module 2135 of processor 2130, e.g. utilizing the input interface 2180.

According to some examples, information indicative of camera angle(s) associated with image frame(s) is received (block 2510). In some examples, this information is received by images input module 2135. For example, the system receives the information that image (1, 1) of an array was captured at azimuth=angle-1 and elevation=angle-2, while image (1, 2) was captured at azimuth=angle-3and elevation=angle-2 etc. In some examples, the pan/tilt/roll angles, as relevant, associated with each captured frame, are provided. In some examples, the controller 270 processing circuitry, and/or the third processing circuitry of capture system 120, provide this information to system 2105.

In some examples, the system also receives the iFOV and the number of pixels, or the FOV of the camera as a whole, e.g. as an angular value (e.g. fractions of a radian). In some examples, this information is provided for each dimension, e.g. elevation and azimuth.

In some examples, the system receives the camera angles associated with one frame, the iFOV and/or FOV, and the desired degrees of overlap between the frames, e.g. between adjacent frames, e.g. in the first and second frame dimensions. Thus, in some examples, the information indicative the camera angle(s) comprises receiving one or more of: iFOV information associated with the camera 250, frame overlap information, one or more camera angles associated with one or more image frames, and an image frames order.

As will be disclosed further herein, in some cases the stitching of the composite 1600, is performed at least based on this received information indicative of at least one camera angle.

This block 2510 is an optional step.

According to some examples, an arrangement of the 2-D set of still image frames is determined (block 2515). The images are arranged in two-dimensional space, based on e.g. the pan and tilt angles of their capture, and the respective homography transformation to a plane. In some examples, this block is performed by frames alignment input module 2140 of processor 2103. In some examples, this determination is of a first guess or initial determination of the alignment, that is of their arrangement, e.g. as disclosed with reference to FIGS. 22-23. That is, in some examples, the system determines an initial estimate of a spatial arrangement of the set of image frames.

Non-limiting example known per se methods for this block include the following:

[a] Utilize the known or received information about camera angles for each frame, and about system 120 configuration (e.g. pan/tilt or tilt/pan), for example the information received in block 2505, 2510.

[b] Reconstruct the camera angles per capture frame, if they were captured in a known sequence. For example, it is known that the set of frames are 5×4 matrix, captured in order from bottom left to top right, in a particular known path. If the FOV/iFOV and the desired overlap percentage are known, e.g. per block 2510, this reconstruction can be performed.

In another example, if for example it is known that the gimbal uses pan over tilt, then if the camera angles of the first image frame, or of at least one other frame whose order in the sequence is known, and if the path of the camera from frame to frame is known, the camera angles of the other frames can be deduced, and the reconstruction can be performed.

[c] The user is presented a first guess at the frames arrangement, e.g. via display 2190. The user interacts with the display, using visual tools, to e.g. manually play with the presented arrangement (e.g. play with the overlap, or change the array from e.g. 5×4 to 4×5), until the arrangement visually looks to the user like a logical depiction of a façade.

[d] A similarity analysis is performed. Every image is compared to every image. In some examples, this method is less effective than some of the others. In some examples, this method does not work well for large arrays of images of a façade, unless the façade has many different features, e.g. as found in many old buildings. In some newer buildings, e.g. curtain wall facades, the captured image frames look too similar. Therefore, in some cases this method does not converge for façades with mostly repeating features.

Note that in some examples, methods [b] and [c] assume that the images arrive at interface 2180 in the correct, expected order. It may therefore be advantageous that the camera 250 be configured to capture the image, even in a case where the focus algorithm does not converge, and where the frame is thus of limited quality. Receiving the full sequence of captured images, even poor-quality ones, can aid in reconstruction and organization of the array, and thus aid in the alignment process. When methods [a] and [d] are used, the image array is not reconstructed based on the image sequence, and thus it is less important to capture also poor-focus frames. Even when such frames are deleted or ignored, the overlap of the other frames can in some cases compensate, when arranging the frames.

According to some examples, for image frames of the set, one or more image frame overlap areas, with at least one corresponding other image frame of the set, are identified (block 2520). In some examples, this block is performed by overlap areas determination module 2145. In some examples, based on the initial guess at frames alignment, e.g. as disclosed above with reference to FIGS. 22-23, the system knows, approximately, which are the expected "overlapping pixels" in each pair of images. In some examples, the adjacent images of a particular image are identified. Thus, one or more image frame overlap areas are identified, having overlap of the particular frame with at least one corresponding other image frame of the set. In some examples, the overlap area is associated with an image frame width 640 and/or an image frame height 645.

In some examples, this overlap area identification is performed for each image in the set. In other examples, this block is performed only for selected image frames of the set. In some examples, a particular frame is compared to adjacent frames. In some examples, a particular frame is compared to non-adjacent frames. Recall, that in some implementations it is advantageous to identify overlap in any as many frames as possible, even between non-adjacent frames. Even non-adjacent images can have overlap. This can in some cases enable continuity when building the stitched image, even when multiple images are deleted from consideration due to e.g. quality problems. See e.g. the example of FIGS. 15-18. In addition, in implementations where bad frames are deleted or omitted before identifying tie points, there may be a need to use more distant neighbor frames to find tie pts within their overlapping areas, to facilitate an optimized alignment of frames.

In some examples, in this block the system 2105 also determines the amount of overlap associated with each identified overlap area. The system determines a corresponding overlap amount for one or more of the identified pairs of image frames having overlap.

As disclosed herein, in some examples, the overlap amount, in the first frame dimension, and the second overlap amount, in the second frame dimension, are the same. Also, in some examples, there is non-uniform overlap in each frame dimension. Consider, for example, four frames along the azimuth, numbered 1, 2, 3, and 4. Frames 1 and 2 overlap by 55%, frames 2 and 3 overlap by 35%, and frames 3 and 4 overlap by 60% or 75%.

According to some examples, for portions/regions/elements of interest of image frames of the set, a determination is made, which image frames include image representations/depictions of that portion, based on the measured degrees or amounts of overlap (block 2530). In some examples, the system identifies at least two image frames, e.g. frames 4 and 5, having respective overlapping areas that include an image representation of at least one element of interest 1510. In some examples, this block is performed by overlap areas determination module 2145, and/or by frame selection/deletion module 2150.

As one example, the system determines that the element of interest 1510 is depicted in its entirety by all of frames 4, 5, 7, 8, 10, 11—as disclosed with reference to FIG. 15. In some examples, if the amounts of overlap are more than 50% for all frames, this step can be performed for all portions of the composite image, identifying multiple frames that depict these portions, and can be performed for all portions in entire frames.

In some examples, these frames, which depict portions of the composite, are considered candidate image frames.

According to some examples, for candidate image frames, one or more quality scores are determined or obtained for portions 1510 of the frame (block 2535). In some examples, this block is performed by frames selection/deletion module 2145. The quality score(s) is associated with one or more image frames of the identified image frames depicting the portion (e.g. frames 4, 5, 7, 8, 10, 11). Note that in cases of overlap of more than 50%, it is possible to assign quality scores to an entire captured image frame, and low-quality entre frames can be identified. Such actions are non-limiting examples of the system taking an action with problematic portions (e.g. 1510, image frame 4) of the composite 1800.

In some examples, the image frames are ranked, for each portion 1510.

According to some examples, the set of candidate image frames is set, or re-defined, to exclude low-quality image frame(s) (block 2540). In some examples, this block is performed by frames selection/deletion module 2145. In some examples, this block is an optional step, and can be performed only in the case of a set of image frames with over 50% overlap, allowing for deletion of entire frames (e.g. frame 4) from consideration when stitching. For example, based on the relevant quality scores, it is determined that some entire frame(s) are of low quality.

Thus, one or more image frames, from the set of frames, can be eliminated from the set, and the stitching of the images to a larger composite image will be performed without the use of that eliminated image. In one example implementation, there is a list of candidate frames to use to depict portion 1510, and frame 4 is deleted from this list (or, alternately, is marked as a candidate for deletion from the list).

The flow continues A to FIG. 25B.

According to some examples, tie points, are identified (block 2550). In some examples, this block is performed by frames alignment module 2140. In some implementations the tie points are searched for, in one or more overlap areas, e.g. the overlap areas identified in block 2520, e.g. as disclosed above with reference to FIGS. 22-23. In some examples, the overlap areas, in which the tie points are found and identified, are for overlap between adjacent frames and/or for overlap between non-adjacent frames. As disclosed above, in some examples these overlap areas include areas that are several percent of an image frame dimensions outside of the overlap area.

In some examples, this block 2550 gives rise to a set of tie points associated with the 2-D set of still image frames.

According to some examples, correction parameters for the alignment are computed (block 2560). In some examples, this block is performed by frames alignment module 2140.

As e.g. indicated further above, the initial alignment of e.g. block 2515 assumed a first guess of camera FOV and/or pixel iFOV angles (e.g a certain number of milliradians or microradians), and/or of focal lengths. However, in some cases this nominal guess or estimate is not correct, due to factors such as zoom errors, factory manufacture tolerances etc. Similarly, the gimbal angles associated with each captured frame are not necessarily what the calculation predicted them to be, due to tolerances in the angular movement, the measurement thereof, etc. Thus, errors in those estimates, as well, can be found. Camera angles for capture of frames are examples of external parameters, external to the camera itself, while FOV and distortion are examples of internal parameters, associated with phenomena located within the camera.

In some examples, the correction parameters of lens distortions are computed. For example, not all pixels on the imaging sensor have the same angle to the façade. Thus, for example, the pixels on the edges of the sensor may not see exactly the point on the façade which the nominal calculation gave. In some examples, the correction parameters, e.g. of lens distortion, are calculated based at least on two or more identified tie points.

In some examples, the system attempts to perform a best fit of all of the identified tie points, or of as many of them as possible. Based on this best fit, the errors in the positions assigned with pixels of each frame are determined, and in the relative angle associated with two images, and the system can learn about e.g. the lens distortion/aberration. Correction parameters can be derived, which can be used to compensate for such aberrations etc. and to correct the alignment.

Note that the more tie points used in this process, the more accurately the correction parameters can be determined, and thus the more accurate the optimized alignment of block 2575 can be. Recall also, that a large overlap of over 50% can provide a relatively large number of identified tie points, to be used in these optimization steps.

According to some examples, a corrected alignment of image frames is performed (block 2565). In some examples, this block is performed by frames alignment module 2140. That is, a corrected estimate of a spatial arrangement of the 2-D set of image frames is determined, based at least on the computed correction parameters. In some examples, all, or some of the frames in the received set of image frames are aligned to the corrected alignment. This block in effect aligns the geometry of the image frames of the set, based at least on a subset of the set of tie points. The relative location, orientation and projection of images, on the plane of the composite image, is optimized, based on tie points. In some examples, the corrections computed in block 2560 are used to correct the alignment. For example, the position on the façade, associated with pixels of the frames, can be changed, in effect "moving" the pixels to be associated with the correct point on façade, e.g. to associate them with a different x-y position on the façade. Each image frame is more accurately oriented within the whole arrangement of frames. In some examples, interpolation between pixels of a frame(s) is performed.

Regarding images of the set that have no overlap with other images of the set, an optimized alignment per e.g. 2560, 2565 cannot be performed. In some examples, alignment can be performed based on the initial alignment (per e.g. block 2515) and the stitching of this frame can be performed based on that. In other examples, such "no-overlap frames" are not used in the stitching process 2575.

Note that in some cases, several tie points can contradict each other, so the optimization can be configured to ignore some of them, trying to optimize the matching of as many tie points as possible. The optimization thus can consider all of the tie points of all of the frames. Thus, in some examples the system aligns two adjacent frames, e.g. 4 and 7, based not on the tie points shared by those specific frames, but rather on other identified tie points. Similarly, in some cases, two frames which do not share tie points can be stitched, once the optimization and alignment processes have been performed, and the relative location of overlapping images has been accurately determined. Thus, the stitching of the frames, e.g. in block 2575, to create the composite image, is based on the optimization of blocks 2560, 2565, which in turn is based on the identified tie points of block 2550.

According to some examples, image frames are selected, to depict or represent portions/elements of interest 1510 of the various image frames (block 2570). In some examples, this block is performed by frames selection/deletion module 2150. Image frames, of the set of frames, are selected to be utilized to compose regions or portions of the composite image, e.g. based at least on one or more quality criteria associated with the selected image frames.

As indicated above, in some cases, such a selection, of one frame from a plurality of frames, can be performed for all portions of the composite image, where the overlap is over 50%. Also, in some examples, if at this point there are insufficient remaining candidate frames from which to choose, to depict a particular region 1510, due to the marking of lower-quality frames in block 2540 for deletion as candidates, some or all of these deleted frames can be restored, e.g. as part of block 2570, to be candidate frames for the relevant regions, and they can be selected.

In some implementations, this block comprises the following:

[i] in a case where there are at least two identified image frames associated with that region, selecting, for the composition of the regions 1510, one of these identified image frames. For example, this selection can be, based on at least respective quality scores of the image frames. In some examples, this step considers the quality ranking of the relevant frames. This can facilitate a relatively high-quality representation of the at least one element of interest 1510 in the composite image; and

[ii] repeating step [i] for a different at least two image frames, thereby facilitating a second representation of at least one different element of interest in the composite image.

In some other cases, this block 2570 operates in a different manner. Instead, the system weighting of image frames, e.g. frames 1, 2 and 3, when choosing a pixel value. This can work, in cases where the alignment of the frames (e.g. per blocks 2515, 2560, 2565) is very good.

However, in other cases, even after optimization of alignment, e.g. per block 2565, there are residual alignment errors. For example, a particular circle, depicted in multiple frames, will not be perfectly aligned. Therefore, in some cases it is better to choose/select one image frame to depict element of interest 1510, and fade into the surrounding areas, rather than utilizing multiple frames to depict that element and implementing gradual/partial transparency.

According to some examples, the stitching of one or more composite images 1600, 1800, using the selected frames of the image set, is performed (block 2575). In some examples, this block is performed by stitching module 2155. The portions 1510 of the selected frames are stitched together. The larger multi-frame composite image 1600, 1800 is generated. Note that in some examples the stitching is based on at least on the corrected estimate of the spatial arrangement, determined using blocks 2560 and 2565. Thus the image frames are stitched to a larger, composite, image(s), based on their respective positions within the plane of the large composite image 1600.

In some examples, a fading algorithm is used, per known per se methods, to fade in/out the borderlines, to provide a smoother visual transition, so that seams between portions/regions are not evident.

In some examples, the stitching step comprises the alignment and/or the selection steps of blocks 2565, 2570.

According to some examples, one or more projection planes is identified (block 2580). In some examples, this block is performed by transformation/projection module 2170. In some examples the projection plane is as close as possible to the façade plane 115, 2450.

Typically, some projection is always performed. The projection plane may be randomly selected but it is typically required for initial visualization of the stitching.

According to some examples, the image(s) is projected onto the identified projection plane(s) (block 2585). In some examples, this block is performed by transformation/projection module 2170. One example of such is a rectilinear projection.

Non-limiting examples of identifying projection planes, and of projecting the image(s) onto those projection planes, are disclosed above with reference to FIG. 24.

Note that blocks 2580, 2575 can, depending on the particular implementation, apply to the composite image 1800, and/or to individual capture image frames such as frame 7.

Note that blocks 2580, 2575 are optional steps, in that in some implementations, projection is not done, or is not even needed or advantageous.

In some examples, the resulting composite image 1800 is output, e.g. to display 2190. The example flow chart does not include this step.

Based on the flowchart 2500, it can be seen that in some implementation, the process of constructing the composite image includes at least the following steps:

a. determine an initial estimate of a spatial arrangement of the two-dimensional set of still image frames;

b. determine a corresponding overlap amount of pairs of image frames;

c. compute correction parameters associated with lens distortion of the camera, based at least on the tie points; and d. determine a corrected estimate of a spatial arrangement of the set of image frames, based at least on the correction parameters, where the stitching is based on at least on the corrected estimate of the spatial arrangement.

In some embodiments, one or more steps of the flowchart exemplified herein may be performed automatically. The flow and functions illustrated in the flowchart figures may for example be implemented in systems 2105, 120 and in processing circuitries 2110 and/or the third processing circuitry of system 120, they and may make use of components described with regard to FIGS. 2 to 21. It is also noted that whilst the flowchart is described with reference to system elements that realize steps, such as for example systems 2105, 120, and processing circuitry 2110, this is by no means binding, and the operations can be carried out by elements other than those described herein.

It is noted that the teachings of the presently disclosed subject matter are not bound by the flowcharts illustrated in the various figures.

For example, some of the operations or steps can be integrated into a consolidated operation, or can be broken down into several operations, and/or other operations may be added. As a non-limiting example, in some cases blocks 2560 and 2565, and/or 2570 and 2575, and/or 2520, 2530 and 2535, can be combined.

In embodiments of the presently disclosed subject matter, fewer, more and/or different stages than those shown in the figures can be executed. As one non-limiting example, certain implementations may not include blocks 2510, 2540 and/or 2580, 2585. Recall also that block 2540 can be not relevant where frames do not have more than 50% overlap.

Similarly, in some examples, the alignment or relative positioning of the captured frames uses methods other than those of 2515, 2560, 2565.

Similarly, in some implementations, the operations can occur out of the illustrated order. One or more stages illustrated in the figures can be executed in a different order and/or one or more groups of stages may be executed simultaneously.

As one example, the deletion of low-quality frames in block 2540, and/or the determination of image frames per portion and their qualities in 2530, and 2535, can be performed after the final corrected alignment of frames in 2565. Similarly, it is possible to identify 2535 frames qualities (e.g. per portion 1510) at a relatively early stage, but to delete frames 2540 at a later stage, not immediately after block 2535.

The relative order of the alignment and the selection/deletion steps can have various advantages and disadvantages.

For example, if poor-quality frames are eliminated before looking for tie points in overlapping areas, the identification of tie points will be in only relatively higher-focus and better lighting frames, and thus the tie points will be identified with better accuracy. Defocused images may yield lower-quality tie points.

On the other hand, relatively early deletion of frames can have at least some example disadvantages. In some cases, the ability to tie the images geometrically will be weakened. For examples, in a case where the frames have exactly 50% overlap, and an image frame is removed or omitted, the remaining neighbors will actually touch, with no actual overlap, and thus with no tie pts among them. In such a case, the alignment of these two neighboring frames will rely on their ability to be positioned based on tie points on the other sides of these two frames, in directions away from the deleted frame. In such a case, the flow of error (sum of tolerances which results in cumulative error or distortion in the composite image) can build up.

A consideration of a large number of image frames, even where some are of poor quality, can in some cases help the optimization to correctly position the images with respect to the other. Deletion, in some cases, should not be done, for example, before at least an initial alignment 2515 of image frames. In cases where each frame is not received with its corresponding camera 250 angles, the system may need all or most of the captured frames, to understand the structure of the frames array, and to create an initial geometric arrangement of the frames.

As one non-limiting example of the above, consider a 5×5 matrix, with exactly 50% overlap, in which the entire third row is out of focus. There will be no overlap between rows 2 and 4. Therefore, in such a case, of a bad row, it may be preferable to identify tie points also using out of focus frames.

For such reasons, for example, it is in some cases better to use also unfocused/lower quality frames to build tie points.

In still other examples, the system can perform two methods: delete 2540 before finding tie points, and deleting 2540 after finding tie points, and can compare the results of the two methods, and choose the better result of the two.

Also, in some examples, the projection steps 2580, 2585 are performed on individual image frames, at a step that is between blocks 2570, 2575. In some implementations the projection Steps can occur at an earlier stage than that.

Thus, additional non-limiting sequences, of the blocks shown in the flowchart 2500, can be, instead of in the order of 2500, the following:

2505, 2510, 2515, 2520, 2530, 2550, 2560, 2565, 2535, 2540, 2570, 2575, 2580, 2585.

2505, 2510, 2515, 2520, 2530, 2535, 2550, 2560, 2565, 2540, 2570, 2575, 2580, 2585.

2505, 2510, 2515, 2520, 2530, 2535, 2540, 2550, 2560, 2565, 2570, 2580, 2585, 2575.

2505, 2510, 2515, 2520, 2530, 2550, 2560, 2565, 2535, 2540, 2570, 2580, 2585, 2575.

Similarly, since in some implementations blocks 2510, 2540 and/or 2580, 2585 are optional, variations of the above sequences, in which any or all of these blocks are not performed, are also possible.

In light of all of the above disclosure, some example implementations of the presently disclosed subject matter include the following:

I. An image capture system, comprising:
  a. a camera;
  b. a camera mounting, configured to provide the camera with at least two angular degrees of freedom (DOF);
  c. a mount base, configured to enable a base of the camera mounting to be substantially stationary during performance of imaging; and
  d. a movement controller, comprising a first processing circuitry, the first processing circuitry operatively coupled to the camera mounting and configured to repeatedly instruct the camera mounting to move the camera from a current imaging position to a next imaging position,
    wherein the repeated instructions comprise a first instruction comprising movement in at least a first angular degree of freedom and a second instruction comprising movement in at least a second angular degree of freedom,
    wherein the repeated instructions to move are configured to move the camera to a set of camera orientations which enable a capture of a corresponding two-dimensional set of still image frames of a surface of a body,
    wherein image frames, of the two-dimensional set of still image frames, and at least some corresponding adjacent still image frames, of the set, have an overlap amount of more than 50% of an image frame dimension,
    wherein the image frame dimension is one of an image frame width and an image frame height,
    wherein the two-dimensional set of still image frames comprises perimeter image frames and at least one non-perimeter image frame,
    the perimeter image frames lacking an adjacent still image frame in at least one direction,
    the at least one non-perimeter image frame having at least one adjacent image frame in each corresponding direction;
  thereby facilitating capture of each point in the at least one non-perimeter image frame also in at least one adjacent captured still image frame along a direction corresponding to the image frame dimension.

II. An image capture system, comprising:
  a. a camera;
  b. a camera mounting, configured to provide the camera with at least two angular degrees of freedom (DOF);

c. a mount base, configured to enable a base of the camera mounting to be substantially stationary during performance of imaging; and
  e. a movement controller, comprising a first processing circuitry, the first processing circuitry operatively coupled to the camera mounting and configured to repeatedly instruct the camera mounting to move the camera from a current imaging position to a next imaging position,
    wherein the repeated instructions comprise a first instruction comprising movement in at least a first angular degree of freedom and a second instruction comprising movement in at least a second angular degree of freedom,
    wherein the instructed movement comprises movement by multiples of an angular increment,
    the angular increment corresponding to less than 50% of an image frame dimension,
    wherein image frames, of the 2-D set of still image frames, and at least some corresponding adjacent image frames, of the set of image frames, have an overlap amount of more than 50% of an image frame dimension,
    wherein the image frame dimension is one of an image frame width and an image frame height,
    wherein the set of image frames comprises perimeter image frames and at least one non-perimeter image frame,
    the perimeter image frames lacking an adjacent image frame in at least one direction,
    the at least one non-perimeter image frame having at least one adjacent image frame in each corresponding direction;
  thereby facilitating capture of each point in the at least one non-perimeter image frame also in at least one adjacent captured image frame along a direction corresponding to the image frame dimension.

III. Methods for image capture, performed by the image capture system of either of implementations I and II above.

IV. A non-transitory computer readable storage medium tangibly embodying a program of instructions that, when executed by a processing circuitry of an image capture system, cause the processing circuitry to perform either of the methods of implementation III above.

V. A computerized method of image construction, capable of being performed by a processing circuitry, the method comprising:
  A. receiving a two-dimensional set of still image frames of a surface of a body, that were captured by a camera without the camera moving in translation during the capture;
  B. for at least some image frames in the set, performing the following:
    i. Identifying at least one image frame overlap area, with at least one corresponding other still image frame of the set; and
    ii. Identifying at least two tie points in at least one overlap area of the at least one identified image frame overlap areas. This step is performed for those image frames of the received set for which at least one image frame overlap area was identified.
    iii. The steps (B)(i) and (B)(ii) give rise to a set of tie points associated with the set of image frames; and C. stitching image frames of the set, thereby generating a composite image, wherein the stitching comprises performing:

i. aligning image frames of the 2-D set based at least on a subset of the set of tie points; and ii. selecting image frames of the set to be utilized to compose regions of the composite image, based on at least a quality criterion of the selected image frames.

VI. A computerized method of image construction, capable of being performed by a processing circuitry, the method comprising:

D. receiving a two-dimensional set of still image frames of a surface of a body, that were captured by a camera without the camera moving in translation during the capture, where image frames of the set have an overlap area with at least one other still image frame in an image frame dimension, an area of overlap of the image frames constituting an overlap area;

E. identifying at least two corresponding tie points in respective pairs of the image frames having overlap, of the set of image frames, where the at least two corresponding tie points are located in the overlap area, thereby generating a set of tie points associated with the 2-D set of still image frames; and F. stitching the image frames of the set, based at least on the set of tie points, thereby generating at least one composite image, wherein the stitching comprises the step of:

(ii) including, in at least one portion of the at least one composite image, a corresponding portion of a selected image frame of the set of image frames, wherein the selected image frame is selected from a plurality of image frames that include image representations of the at least one portion, wherein the selected image frame is selected based on at least one quality criterion.

VII. A computerized method of image construction, capable of being performed by a processing circuitry, the method comprising:

A. receiving a two-dimensional set of still image frames of a surface of a body, that were captured by a camera without the camera moving in translation during the capture;

B. for those image frames of the set of image frames that have an overlap area with at least one other image frame in an image frame dimension, the area of overlap of the image frames constituting an overlap area, identifying at least two corresponding tie points in respective pairs of the image frames having overlap, of the set of image frames, wherein the at least two corresponding tie points are located in the overlap area, thereby generating a set of tie points associated with the set of image frames; and C. stitching the image frames of the set, based at least on the set of tie points, thereby generating at least one composite image, wherein, for at least one portion of the at least one composite image, a plurality of candidate image frames include a plurality of depictions of the at least one portion, each candidate image frame of the plurality of candidate image frames having a corresponding depiction of the plurality of depictions, wherein the stitching comprises the steps of:

i. selecting a corresponding depiction of the plurality of depictions, based on at least one quality criterion; and ii. utilizing the selected corresponding depiction to construct the at least one portion.

VIII. A computerized method of image construction, capable of being performed by a processing circuitry, the method comprising:

A. receiving a two-dimensional set of still image frames of a surface of a body, that were captured by a camera without the camera moving in translation during the capture, an area of overlap of the image frames constituting an overlap area;

B. for those image frames of the set of image frames that have an overlap area with at least one other image frame in an image frame dimension, where adjacent image frames of the set of image frames have an overlap amount of more than 50% of an image frame dimension, identifying at least two corresponding tie points in respective pairs of the image frames having overlap, of the set, where the at least two corresponding tie points are located in the overlap area, thereby generating a set of tie points associated with the 2-D set of still image frames; and C. stitching the image frames of the set, based at least on the set of tie points, thereby generating at least one composite image, wherein, for portions of the at least one composite image, a plurality of candidate image frames include a plurality of depictions of the at least one portion, each candidate image frame of the plurality of candidate image frames having a corresponding depiction of the plurality of depictions, wherein the stitching comprises the steps of:

i. selecting a corresponding depiction of the plurality of depictions, based on at least one quality criterion; and ii. utilizing the selected corresponding depiction to construct the at least one portion.

IX. A non-transitory computer readable storage medium tangibly embodying a program of instructions that, when executed by a processing circuitry 2110 of an image construction system 2105, cause the processing circuitry to perform either of the methods of implementations V-VIII above.

X. An image construction system 2105, comprising a processing circuitry 2110, configured to perform the method of either of implementations V-VIII above.

In the claims that follow, alphanumeric characters and Roman numerals, used to designate claim elements such as components and steps, are provided for convenience only, and do not imply any particular order of performing the steps.

It should be noted that the word "comprising" as used throughout the appended claims, is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter, or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An image capture system for imaging a body, the system comprising:
   a. a camera configured with an imaging lens having a focal length in a range of 200-600 mm, said camera having an autofocus mechanism and being configured to capture a still image frame in a case of convergence a d non-convergence of the autofocus mechanism;
   b. a camera mounting, configured to provide the camera with at least two angular degrees of freedom (DOF), to enable image capturing by the camera with sequence of different imaging orientations of the camera;
   c. a mount base, configured to enable a base of the camera mounting to be substantially stationary; during performance of said image capturing with the sequence of different imaging orientations; and configured to be transported to thereby transporting the camera mounting with the camera through successive image capturing positions, and enabling said image capturing with the sequence of different imaging orientations at each of the image capturing positions of the camera, said image capture thereby enabling imaging, by said camera, of the body having at least 10 m height and width from a distance of at least 10 m, with a pixel instantaneous field of view (FOV) substantially not exceeding 15 micro-radians;
   d. a movement controller, comprising a first processing circuitry, the first processing circuitry operatively coupled to the camera mounting and configured to repeatedly instruct the camera mounting to move the camera according to predetermined movement data indicative of the sequence of the imaging orientation, wherein the repeated instructions comprise a first instruction comprising movement in at least a first angular degree of freedom and a second instruction of the repeated instructions comprising movement in at least a second angular degree of freedom, thereby providing said sequence of the different orientations of the camera generating a corresponding two-dimensional set of still image frames of a surface of said body being imaged, at each camera position,
wherein the still image frames, of the two-dimensional set of still image frames, and at least some corresponding adjacent still image frames, of the two-dimensional set of still image frames, have an overlap amount of more than 50 percent of an image frame dimension, the image frame dimension being one of an image frame width and an image frame height, wherein said sequence of the different orientations of the camera provides that the two-dimensional set of still image frames comprises perimeter image frames and at least one non-perimeter image frame, the perimeter image frames lacking an adjacent image frame in at least one direction, the at least one non-perimeter image frame having at least one adjacent image frame in each corresponding direction, thereby facilitating capture of each point in the at least one non-perimeter image frame also in at least one adjacent captured image frame along a direction corresponding to the image frame dimension, thereby enabling selection of the image frames satisfying a predetermined quality criterion for stitching of the image frames of each two-dimensional set into a composite image of the surface of the body.

2. The image capture system of claim 1, wherein the still image frames, of the two-dimensional set of still image frames, and the at least some corresponding adjacent still image frames, of the two-dimensional set of still image frames, have a second overlap amount of more than 50 percent of a second image frame dimension.

3. The image capture system of claim 1, wherein a majority of non-perimeter image frames, of the two-dimensional set of still image frames, and corresponding adjacent still image frames, of the two-dimensional set of still image frames, have the overlap amount of more than 50 percent in the image frame dimension and in the second image frame dimension.

4. The image capture system of claim 1, wherein the mount base is a person-transportable mount base, configured to enable transport of the image capture system by a person.

5. The image capture system of claim 4, wherein the person-transportable mount base comprises a tripod.

6. The image capture system of claim 1, wherein the camera mounting comprises a pan-tilt gimbal.

7. The image capture system of claim 1, wherein the enabling the base of the camera mounting to be stationary, during the performance of the imaging, comprises enabling the base of the camera mounting to move less than 10 centimeters (cm).

8. The image capture system of claim 1, wherein the repeated instruction to the camera mounting comprises instructions to move the camera in equally spaced increments in at least one of the first angular degree of freedom and the second angular degree of freedom.

9. The image capture system of claim 1, wherein the repeated instruction to the camera mounting comprises instructions to move the camera to capture an image array.

10. The image capture system of claim 1, wherein the body comprises a stationary artificial structure of a large size.

11. A computerized method for capturing a set of image frames of a body, the method performed by a processing circuitry of an image capture system, the method comprising:

a. providing the image capture system, the image capture system comprising:

(i) a camera configured with a n imaging lens having a focal length in a range of 200-600 mm, said camera having an autofocus mechanism and being configured to capture a still image frame in a case of convergence and non-convergence of the autofocus mechanism;

(ii) a camera mounting, configured to provide the camera with at least two angular degrees of freedom (DOF), to enable image capturing by the camera with a sequence of different imaging orientations of the camera;

(iii) a mount base, configured to enable a base of the camera mounting to be substantially stationary during performance of said image capturing with the sequences of different imaging orientations, and configured to be transported to thereby transporting the camera mounting with the camera through successive image capturing positions, and enabling said image capturing with the sequence of different imaging orientations at each of the image capturing positions of the camera, said image capture thereby enabling imaging by said camera, of the body having at least 10 m height and width from a distance of at least 10 m, with a pixel instantaneous field of view (FOV) substantially not exceeding 15 micro-radians; and (iv) a movement controller, comprising a first processing circuitry, the first processing circuitry operatively coupled to the camera mounting and configured to repeatedly instruct the camera mounting to move the camera according to predetermined movement data indicative of the sequence of the imaging orientations, wherein the repeated instructions comprise a first instruction comprising movement in at least a first angular degree of freedom and a second instruction of the repeated instructions comprising movement in at least a second angular degree of freedom thereby providing said sequence of the different orientations of the camera generating a corresponding two-dimensional set of still image frames of a surface of said body being imaged, at each camera position, wherein the still image frames, of the two-dimensional set of still image frames, and at least some corresponding adjacent still image frames, of the two-dimensional set of still image frames, have an overlap amount of more than 50 percent of an image frame dimension, the image frame dimension being one of an image frame width and an image frame height, wherein said sequence of the different orientations of the camera provides that the two-dimensional set of still image frames comprises perimeter image frames and at least one non-perimeter image frame, the perimeter image frames lacking an adjacent image frame in at least one direction, the at least one non-perimeter image frame having at least one adjacent image frame in each corresponding direction;

b. receiving information indicative of a focal length of the camera;

c. receiving the overlap amount;

d. receiving an indication of the boundaries of the scene;

e. calculating the two-dimensional set of still images, based at least on information indicative of the focal length, on the overlap amount and on the indication of the boundaries of the scene; and f. capturing the set of images, thereby facilitating capture of each point in the at least one non-perimeter image frame also in at least one adjacent captured image frame along a direction corresponding to the image frame dimension, and enabling selection of the image frames satisfying a predetermined quality criterion for stitching of the image frames of each two dimensional set into a composite image of the surface of the body.

12. A computerized method of image construction, comprising:

capturing a set of image frames of a body by carrying out the computerized method of claim 11; and utilizing a processing circuitry to perform the following:

a. receiving the two-dimensional set of still image frames of the surface of the body, that were captured by the camera without the camera moving in translation during the capture;

b. for image frames in the two-dimensional set, performing the following:

i. identifying at least one image frame overlap area, with at least one corresponding other still image frame of the two-dimensional set of still image frames, an area of overlap of the image frames constituting an overlap area; and ii. identifying at least two tie points in at least one overlap area of the at least one identified image frame overlap areas, thereby giving rise to a set of tie points associated with the two-dimensional set of still image frames; and c. stitching still image frames of the two-dimensional set, thereby generating a composite image, wherein the stitching comprises performing:

i. aligning still image frames of the two-dimensional set based at least on a subset of the set of tie points; and ii. selecting still image frames of the two-dimensional set to be utilized to compose regions of the composite image, based on at least a quality criterion of the selected still image frames.

13. The computerized method of claim 12, wherein the selecting of the still image frames in said step (ii) comprises:

(1) identifying at least two still image frames having respective overlapping areas that include an image representation of at least one element of interest;

(2) obtaining at least one quality score associated with still image frames of the identified at least two still image frames;

(3) selecting, for the composition of the regions, a still image frame of said identified at least two still image frames, based on at least respective quality scores of the at least two still image frames, thereby facilitating a representation of the at least one element of interest in the composite image;

(4) repeat the performance of said steps (1) to (3) for a different at least two still image frames, thereby facilitating a second representation of at least one different element of interest in the composite image.

14. The computerized method of claim 12, wherein the plurality of still image frames constitute candidate still image frames associated with the at least one element of interest, wherein the selecting of the selected still image frame, based on at least one quality criterion, comprises ranking the candidate still image frames.

15. The computerized method of claim 12, wherein the at least one quality criterion comprises at least one of a focus criterion, an exposure criterion, or a blocked-view criterion.

16. The computerized method of claim 12, wherein the plurality of still image frames constituting candidate still image frames associated with the at least one element of interest, wherein the stitching comprises, responsive to determining that at least one second still image frame, of the two-dimensional set of still image frames, fails at least one frame-quality criterion, the at least one second still image frame constituting at least one low-quality still image frame, setting the candidate still image frames to exclude the at least one low-quality still image frame.

17. The computerized method of claim 12, wherein the two-dimensional set of still image frames comprise an image array.

18. The computerized method of claim 12, wherein the step (a) comprises receiving information indicative of at least one camera angle associated with at least one captured still image frame of the two-dimensional set of still image frames, wherein the stitching is performed at least based on the information indicative of at least one camera angle.

\* \* \* \* \*